US009807303B2

(12) United States Patent
Ishida

(10) Patent No.: US 9,807,303 B2
(45) Date of Patent: Oct. 31, 2017

(54) INFORMATION PROCESSING APPARATUS, INFORMATION PROCESSING METHOD, AND PROGRAM

(71) Applicant: Sony Corporation, Tokyo (JP)

(72) Inventor: Minoru Ishida, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/163,373

(22) Filed: May 24, 2016

(65) Prior Publication Data

US 2016/0269633 A1  Sep. 15, 2016

Related U.S. Application Data

(63) Continuation of application No. 14/278,448, filed on May 15, 2014, now Pat. No. 9,386,218.

(30) Foreign Application Priority Data

May 22, 2013 (JP) ................ 2013-107622

(51) Int. Cl.
*H04N 5/225* (2006.01)
*H04N 5/232* (2006.01)
*G06T 5/00* (2006.01)
*H04N 5/262* (2006.01)

(52) U.S. Cl.
CPC ........ *H04N 5/23238* (2013.01); *G06T 5/006* (2013.01); *H04N 5/2252* (2013.01); *H04N 5/2258* (2013.01); *H04N 5/23219* (2013.01); *H04N 5/23222* (2013.01); *H04N 5/23235* (2013.01); *H04N 5/23293* (2013.01); *G06T 2207/20221* (2013.01)

(58) Field of Classification Search
CPC .......... H04N 5/23232; H04N 5/23238; H04N 5/3415; G03B 37/04; G06K 2009/2045
USPC ...................... 348/218.1, 239, 376
See application file for complete search history.

(56) References Cited

U.S. PATENT DOCUMENTS

| 8,542,288 | B2 | 9/2013 | Waqas |
| 9,025,038 | B2 | 5/2015 | Tsutsumi |
| 2003/0160886 | A1 | 8/2003 | Misawa |
| 2006/0187310 | A1 | 8/2006 | Janson |
| 2007/0132863 | A1 | 6/2007 | Deguchi |
| 2010/0097442 | A1 | 4/2010 | Lablans |
| 2011/0043669 | A1 | 2/2011 | Ishida |

(Continued)

FOREIGN PATENT DOCUMENTS

| JP | 2011-044837 | 3/2011 |
| JP | 2012-220942 | 11/2012 |

*Primary Examiner* — Kelly L Jerabek
(74) *Attorney, Agent, or Firm* — Michael Best & Friedrich LLP

(57) ABSTRACT

An information processing apparatus includes a first optical system, a second optical system, and a casing. The first optical system is configured to input light into a first imaging device. The second optical system is configured to input light into a second imaging device. The casing includes one surface long in a specific direction with the first optical system and the second optical system being arranged in the one surface in an orthogonal direction almost orthogonal to the specific direction. The first optical system and the second optical system are arranged such that an optical axis of the first optical system and an optical axis of the second optical system form an angle in the specific direction.

18 Claims, 29 Drawing Sheets

(56) References Cited

U.S. PATENT DOCUMENTS

2011/0234640 A1 9/2011 Ishida
2011/0234852 A1 9/2011 Ishida a b a b a b a b a b a b

INFORMATION PROCESSING APPARATUS, INFORMATION PROCESSING METHOD, AND PROGRAM

CROSS REFERENCE TO RELATED APPLICATIONS

This application is a Continuation of application Ser. No. 14/278,448, filed May 15, 2014, and claims the benefit of Japanese Priority Patent Application JP 2013-107622 filed May 22, 2013, the entire contents of which are incorporated herein by reference.

BACKGROUND

The present disclosure relates to an information processing apparatus. More particularly, the present disclosure relates to an information processing apparatus that handles a combined image, an information processing method, and a program that causes a computer to execute such a method.

Imaging apparatuses such as a digital still camera and a digital video camera (e.g., camera-integrated recorder) have prevailed in recent years. The imaging apparatus includes an imaging unit that images a subject such as a person, and records an image generated by the imaging unit as an image file.

There has been proposed a portable terminal capable of combining images generated by a plurality of imaging units to generate a combined image long in a long-side direction of a casing (e.g., see Japanese Patent Application Laid-open No. 2011-044837 (hereinafter, referred to as Patent Document 1 (e.g., FIG. 71)). In addition, there has been proposed a technique of fixing a plurality of imaging units of a portable terminal to a single holder and fixing this holder on an electronic substrate of the portable terminal (e.g., see Japanese Patent Application Laid-open No. 2012-220942 (hereinafter, referred to as Patent Document 2)).

SUMMARY

In the above-mentioned technique in the related art (e.g., Patent Document 2), a plurality of imaging systems are arranged from near the center of a side of three outer edge sides of the casing of the apparatus, which is parallel to a short side of the display unit of the apparatus, to near the center of the apparatus in a direction parallel to a long side of the display unit.

Regarding a consumer electronic apparatus in recent years, a number of electronic components are often mounted on front and back surfaces of an electronic substrate. In the case where the plurality of imaging units are arranged from the outer edge of the casing to near the center of the apparatus on such an electronic substrate, there is a fear that a degree of freedom in arranging electronic components other than the plurality of imaging units on the electronic substrate of the apparatus is reduced.

In view of the above-mentioned circumstances, it is desirable to facilitate an arrangement of electronic components other than a plurality of imaging units that generate a combined image long in a long-side direction of a casing on an electronic substrate of an information processing apparatus.

According to a first embodiment of the present disclosure, there is provided an information processing apparatus including: a first optical system configured to input light into a first imaging device; a second optical system configured to input light into a second imaging device; and a casing including one surface long in a specific direction with the first optical system and the second optical system being arranged in the one surface in an orthogonal direction almost orthogonal to the specific direction, the first optical system and the second optical system being arranged such that an optical axis of the first optical system and an optical axis of the second optical system form an angle in the specific direction. In addition, there are provided an information processing method having such a configuration and a program that causes a computer to execute such a method. This provides an effect of performing an imaging operation using the first optical system and the second optical system arranged such that the optical axis of the first optical system and the optical axis of the second optical system form the angle in the specific direction.

Further, in the first embodiment, the casing may include a display unit having a rectangular shape long in the specific direction, with a projection onto a first face that is a face that includes a long side of the display unit and is perpendicular to a display surface of the display unit, which is a projection of a normal to the display surface onto the first face, being a symmetrical axis, a first projection of the optical axis of the first optical system onto the first face and a second projection of the optical axis of the second optical system onto the first face may be axisymmetric. This provides an effect of performing an imaging operation using the first optical system and the second optical system arranged such that the first projection and the second projection are axisymmetric with the projection of the normal to the display surface onto the first face being the symmetrical axis.

Further, in the first embodiment, the information processing apparatus may further include a third optical system configured to input light into a third imaging device, the third optical system being arranged together with the first optical system and the second optical system in the one surface in the orthogonal direction such that an optical axis of the third optical system is orthogonal to the display surface. This provides an effect of performing an imaging operation using the third optical system arranged together with the first optical system and the second optical system in the one surface in the orthogonal direction such that the optical axis of the third optical system is orthogonal to the display surface.

Further, according to a second embodiment of the present disclosure, there is provided an information processing apparatus including: a first imaging device configured to receive light passing through a first optical system; a second imaging device configured to receive light passing through a second optical system; and a casing including one surface long in a specific direction with the first optical system and the second optical system being arranged in the one surface in an orthogonal direction almost orthogonal to the specific direction, the first imaging device and the second imaging device being arranged such that an imaging target area formed of an area serving as an imaging target of the first imaging device and an area serving as an imaging target of the second imaging device is larger in the specific direction than the area serving as the imaging target of each of the first imaging device and the second imaging device. In addition, there are provided an information processing method having such a configuration and a program that causes a computer to execute such a method. This provides an effect of performing an imaging operation using the first imaging device and the second imaging device arranged such that the imaging target area is larger than the area serving as the imaging target of each of the first imaging device and the second imaging device.

Further, according to a third embodiment of the present disclosure, there is provided an information processing apparatus including: a first imaging device configured to receive light passing through a first optical system; a second imaging device configured to receive light passing through a second optical system; and a casing including one surface long in a specific direction with the first optical system and the second optical system being arranged in the one surface in an orthogonal direction almost orthogonal to the specific direction, the first imaging device and the second imaging device being arranged such that an area serving as an imaging target of the first imaging device and an area serving as an imaging target of the second imaging device are arranged in the specific direction. In addition, there are provided an information processing method having such a configuration and a program that causes a computer to execute such a method. This provides an effect of performing an imaging operation using the first imaging device and the second imaging device arranged such that the area serving as the imaging target of the first imaging device and the area serving as the imaging target of the second imaging device are arranged in the specific direction.

Further, according to a fourth embodiment of the present disclosure, there is provided an information processing apparatus including: a first imaging device configured to receive light passing through a first optical system; a second imaging device configured to receive light passing through a second optical system; and a casing including one surface long in a specific direction with the first optical system and the second optical system being arranged in the one surface in an orthogonal direction almost orthogonal to the specific direction, the first imaging device and the second imaging device being arranged such that a long-side direction of the first imaging device and a long-side direction of the second imaging device almost coincide with each other in the specific direction and that an aspect ratio of an imaging target area formed of an area serving as an imaging target of the first imaging device and an area serving as an imaging target of the second imaging device is larger than an aspect ratio of the area serving as the imaging target of each of the first imaging device and the second imaging device. In addition, there are provided an information processing method having such a configuration and a program that causes a computer to execute such a method. This provides an effect of performing an imaging operation using the first imaging device and the second imaging device arranged such that the long-side direction of the first imaging device and the long-side direction of the second imaging device almost coincide with each other in the specific direction and that the aspect ratio of the imaging target area is larger than the aspect ratio of the area serving as the imaging target of each of the first imaging device and the second imaging device.

Further, in the first to fourth embodiments, the first imaging device and the second imaging device may be arranged such that an end portion in the specific direction of an area serving as an imaging target of one imaging device of the first imaging device and the second imaging device and an end portion in the specific direction of an area serving as an imaging target of the other imaging device that is adjacent to the one imaging device overlap with each other. This provides an effect of performing an imaging operation using the first imaging device and the second imaging device arranged such that the end portion in the specific direction of the area serving as the imaging target of the one imaging device and the end portion in the specific direction of the area serving as the imaging target of the other imaging device that is adjacent to the one imaging device overlap with each other.

Further, in the first to fourth embodiments, the information processing apparatus may further include a correction unit configured to correct a displacement in the orthogonal direction between a plurality of images obtained from the first imaging device and the second imaging device, which is caused due to the arrangement of the first imaging device and the second imaging device in the orthogonal direction, based on a subject distance of a subject included in an overlap region between the plurality of images. This provides an effect of correcting the displacement in the orthogonal direction between the plurality of images obtained from the first imaging device and the second imaging device, based on the subject distance of the subject included in the overlap region between the plurality of images.

Further, in the first to fourth embodiments, the information processing apparatus may further include an adjustment unit configured to adjust at least partial areas of a plurality of images obtained from the first imaging device and the second imaging device, based on a subject distance of a subject included in an overlap region between the plurality of images, the at least partial areas being used for generating a combined image by combining with each other in the specific direction. This provides an effect of adjusting the at least partial areas of the plurality of images obtained from the first imaging device and the second imaging device, based on the subject distance of the subject included in the overlap region between the plurality of images, the at least partial areas being used for generating the combined image by combining with each other in the specific direction.

Further, in the first to fourth embodiments, the information processing apparatus may further include a control unit configured to perform, if a subject distance from the information processing apparatus to a particular subject included in the overlap region between the plurality of images obtained from the first imaging device and the second imaging device is smaller than a threshold value, a notification for urging to change an arrangement of a subject included in the overlap region or a notification for indicating that the plurality of images are displaced in the combined image. This provides an effect of performing, if the subject distance to the particular subject included in the overlap region is smaller than the threshold value, the notification for urging to change the arrangement of the subject included in the overlap region or the notification for indicating that the plurality of images are displaced in the combined image.

Further, in the first to fourth embodiments, the information processing apparatus may further include an image combination unit configured to generate a combined image by combining at least partial areas of a plurality of images obtained from the first imaging device and the second imaging device with each other in the specific direction. This provides an effect of generating the combined image by combining the at least partial areas of the plurality of images obtained from the first imaging device and the second imaging device with each other in the specific direction.

Further, in the first to fourth embodiments, the image combination unit may be configured to correct a displacement in the orthogonal direction between the plurality of images obtained from the first imaging device and the second imaging device, based on a subject distance of a subject included in the combined image. This provides an effect of correcting the displacement in the orthogonal direction between the plurality of images obtained from the first imaging device and the second imaging device, based on the subject distance of the subject included in the combined image.

Further, in the first to fourth embodiments, the image combination unit may be configured to adjust the at least partial areas of the plurality of images obtained from the first imaging device and the second imaging device, which are used for the combined image, based on a subject distance of a subject included in the combined image. This provides an effect of adjusting the at least partial areas of the plurality of images obtained from the first imaging device and the second imaging device, which are used for the combined image, based on the subject distance of the subject included in the combined image.

Further, in the first to fourth embodiments, the information processing apparatus may further include a control unit configured to perform, if a subject distance from the information processing apparatus to a particular subject included in the combined image is smaller than a threshold value, a notification for urging to change an arrangement of a subject included in the combined image or a notification for indicating that the plurality of images are displaced in the combined image. This provides an effect of performing, if the subject distance to the particular subject included in the combined image is smaller than the threshold value, the notification for urging to change the arrangement of the subject included in the combined image or the notification for indicating that the plurality of images are displaced in the combined image.

Further, in the first to fourth embodiments, the particular subject may be at least one of a subject closest to the information processing apparatus, a subject set as a focus target by a focusing operation, a subject detected by a face detection unit, and a subject detected by a moving object detection unit. This provides an effect of performing the notification using, as the particular subject, the at least one of the subject closest to the information processing apparatus, the subject set as the focus target by the focusing operation, the subject detected by the face detection unit, and the subject detected by the moving object detection unit.

Further, in the first to fourth embodiments, the control unit may be configured to perform the notification by at least one of an audio output from an audio output unit and an information display on the display unit. This provides an effect of performing the notification by the at least one of the audio output from the audio output unit and the information display on the display unit.

Further, according to a fifth embodiment of the present disclosure, there is provided an information processing method including: a calculation procedure of calculating a subject distance of a subject included in an overlap region of a combined image generated by overlapping and combining end portions of images generated by a plurality of imaging units arranged in a specific direction with each other or in the combined image; and a judgment procedure of performing, based on the subject distance, a judgment as to areas of images that are used for the combined image. In addition, there is provided a program that causes a computer to execute such a method. This provides an effect of calculating the subject distance of the subject included in the overlap region of the combined image or in the combined image and performing, based on the subject distance, the judgment as to the areas of the images that are used for the combined image.

Further, according to a sixth embodiment of the present disclosure, there is provided an information processing method including: a calculation procedure of calculating a subject distance of a subject included in an overlap region of a combined image generated by overlapping and combining end portions of images generated by a plurality of imaging units arranged in a specific direction with each other or in the combined image; and a judgment procedure of performing, based on the subject distance, a judgment as to an arrangement of a subject included in the combined image. In addition, there is provided a program that causes a computer to execute such a method. This provides an effect of calculating the subject distance of the subject included in the overlap region of the combined image or in the combined image and performing, based on the subject distance, the judgment as to the arrangement of the subject included in the combined image.

According to the embodiments of the present disclosure, it is possible to exert an excellent effect that it is possible to facilitate an arrangement of electronic components other than a plurality of imaging units that generate a combined image long in a long-side direction of a casing on an electronic substrate of an information processing apparatus.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments for carrying out the present disclosure (hereinafter, referred to as embodiments) will be described. Descriptions will be made in the following order.

1. First Embodiment (panoramic image recording control: example in which panoramic image is generated using information processing apparatus including two imaging systems)

2. Second Embodiment (panoramic image recording control: example in which panoramic image is generated using information processing apparatus including three imaging systems)

3. Modified Example

1. First Embodiment

[Outer-Appearance Configuration Example of Information Processing Apparatus]

Figure 1:
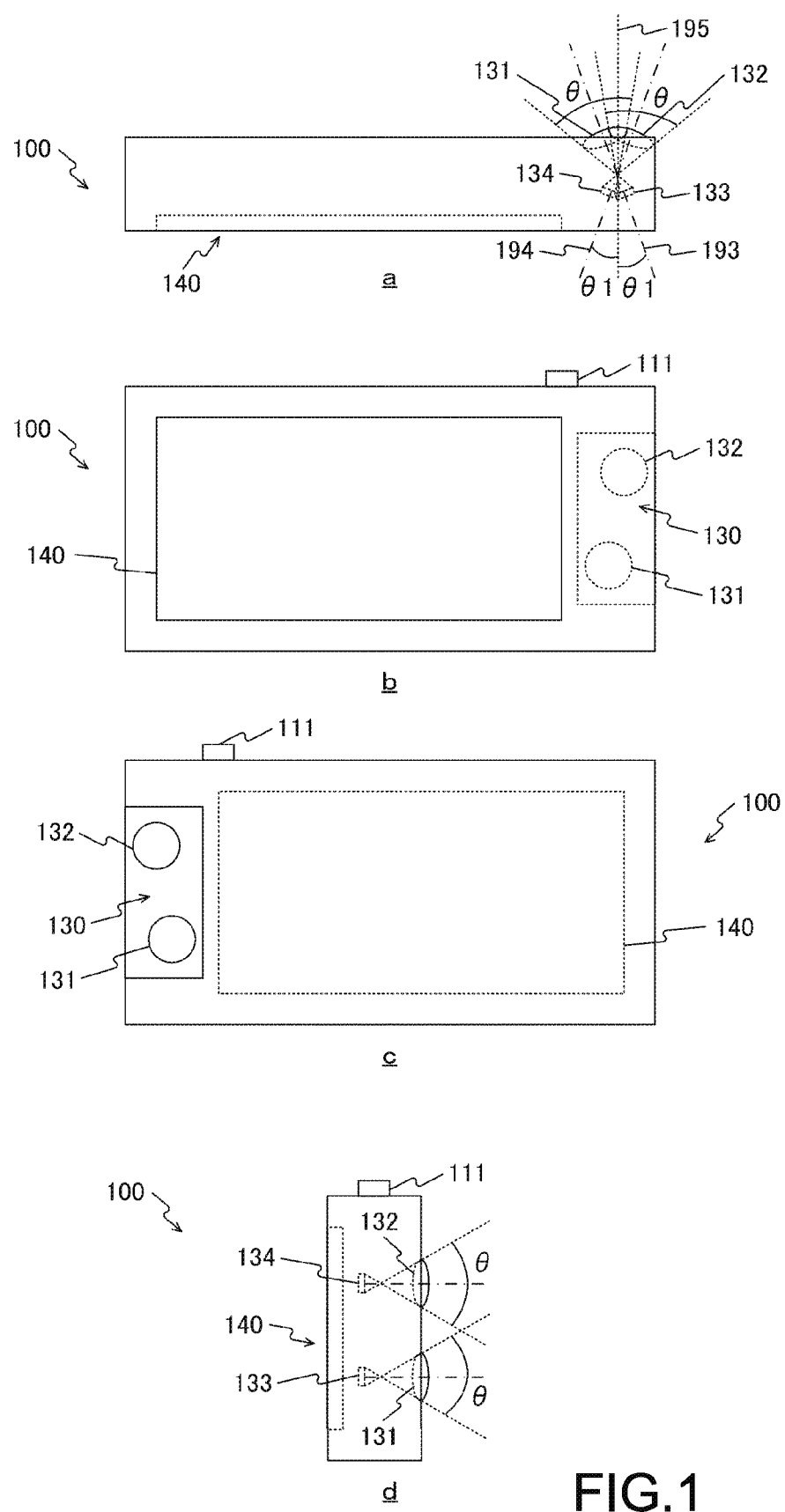
FIG. 1 is a diagram showing an outer-appearance configuration example of an information processing apparatus 100 in a first embodiment of the present disclosure.

FIG. 1 is a diagram showing an outer-appearance configuration example of an information processing apparatus 100 in a first embodiment of the present disclosure. Part "a" of FIG. 1 shows a top view of the information processing apparatus 100. Part "b" of FIG. 1 shows a front view of the information processing apparatus 100 (surface in which display unit 140 is provided). Part "c" of FIG. 1 shows a rear view of the information processing apparatus 100 (back surface of surface in which display unit 140 is provided). Part "d" of FIG. 1 shows a side view of the information processing apparatus 100.

The information processing apparatus 100 is realized by an information processing apparatus (e.g., smart phone with multi eye camera and cell phone with multi eye camera) including a plurality of imaging units, for example. Note that, for the sake of description, the information processing apparatus 100 is simplified and shown in Part "a" of FIG. 1 and an illustration of a power-supply switch and the like provided in an outer side surface of the information processing apparatus 100 is omitted. Further, illustrations of details of a circuit and the like provided within a casing of the information processing apparatus 100 are also omitted.

In the first embodiment of the present disclosure, a ratio of a horizontal size to a vertical size of an image is defined as an "aspect ratio" and described. Further, an image having an aspect ratio larger than the aspect ratio (16:9) of a digital Hi-vision image (high-definition television image) is defined as "panoramic image" and described.

In the first embodiment of the present disclosure, when the "image" is described, it involves both meanings of the image itself and image data for displaying the image.

The information processing apparatus 100 includes a determination key 111, an imaging unit 130, and the display unit 140.

In the first embodiment of the present disclosure, a plurality of imaging systems (imaging unit 130) are arranged in parallel with a short side of the casing of the information processing apparatus 100. Further, a long side of each of imaging devices of the plurality of imaging systems (imaging unit 130) is arranged in parallel with a long side of the casing of the information processing apparatus 100. Further, the plurality of imaging systems (imaging unit 130) are arranged as close as possible to a short side of the display unit 140 of the information processing apparatus 100 and an outer edge of the short side of the casing of the information processing apparatus 100. The short side of the casing of the information processing apparatus 100 means a side other than longest sides among sides of the casing. It is favorable that an electronic substrate that performs functions other than an image-capturing function and an image-displaying function (or electronic substrate that mainly performs functions other than image-capturing function) is not provided between the plurality of imaging systems (imaging unit 130) and the outer edge of the short side of the casing. Otherwise, it is favorable that the area of the electronic substrate provided between the plurality of imaging systems (imaging unit 130) and the outer edge of the short side of the casing is set to be ½ or less of the area of the electronic substrate that is arranged in the information processing apparatus 100 and performs the functions other than the image-capturing function and the image-displaying function.

Regarding a consumer electronic apparatus in recent years, a number of electronic components are often mounted on front and back surfaces of an electronic substrate. In view of this, a case where the plurality of imaging systems and other electronic components are arranged on the electronic substrate is assumed. For example, an apparatus (e.g., cell phone with camera) in which the plurality of imaging systems are arranged from the outer edge of the casing of the apparatus to near the center of the apparatus (e.g., plurality of imaging systems are arranged in parallel with long side of casing) is assumed. In other words, this apparatus is an apparatus including the casing having an almost-rectangular parallelepiped shape, in which the plurality of imaging systems are arranged from near the center of a side of three outer edge sides of the casing of the apparatus, which is parallel to a short side of the display unit of the apparatus, to near the center of the apparatus in a direction parallel to a long side of the display unit. For example, in the case where the plurality of imaging systems are arranged from the outer edge of the casing to near the center of the apparatus on the electronic substrate of such an apparatus, there is a fear that a degree of freedom in arranging electronic components other than the plurality of imaging systems on the electronic substrate of the apparatus is reduced. For example, in the case where the plurality of imaging systems are arranged from the outer edge of the casing to near the center of the apparatus, a region in which other electronic components are to be arranged is divided into right and left small regions by the plurality of imaging systems. With this, there is a fear that a degree of freedom in arranging an electronic component (e.g., semiconductor device) having a large outer area among the electronic components mounted on the electronic substrate is reduced. Further, the electronic components are separately arranged in the two right and left small regions, and hence wiring between those electronic components becomes complicated. With this, there is a fear that the arrangement of the electronic components is further limited. In contrast, in the first embodiment of the present disclosure, the plurality of imaging systems (imaging unit 130) are arranged in parallel with the short side of the casing of the information processing apparatus 100 and close to the outer edge. With this, in the electronic substrate of the information processing apparatus 100, the plurality of imaging systems can be prevented as much as possible from being arranged to extend from the outer edge of the electronic substrate to near the center. Further, it is possible to enhance the degree of freedom in arranging the electronic components other than the plurality of imaging systems on the electronic substrate of the information processing apparatus 100.

The determination key 111 is an operation member that is pressed for setting various functions by a user. For example, when being pressed on the still-image capturing mode, the determination key 111 functions as a shutter button.

Note that a numeric keypad or an arrow key is appropriately displayed on the display unit 140 according to a user operation or automatically. Then, the displayed numeric keypad or the arrow key can be operated by the user.

The imaging unit 130 serves to image a subject and generate image data. Note that, in the first embodiment of the present disclosure, a plurality of imaging units (plurality of imaging systems) will be collectively referred to as the imaging unit 130 and described. Further, the generation of the image data by the imaging unit 130 includes the meaning of imaging by the imaging unit 130. Note that circles in the imaging unit 130 shown in Part "b" of FIG. 1 schematically represent lenses of the plurality of imaging systems of the imaging unit 130. That is, in the first embodiment of the present disclosure, a long-side direction of the display unit 140 is set as a specific direction and the imaging unit 130 in which two lens groups are arranged in an orthogonal direction almost orthogonal to this specific direction is described as an example. Note that portions constituting the imaging unit 130 shown in Part "a" of FIG. 1 are simplified and shown for the sake of description.

Further, as shown in Part "a" of FIG. 1, it is assumed that optical axes of the two lens groups (optical systems 131 and 132) cross at one point. For example, the optical axes of the two imaging systems (optical systems 131 and 132 and imaging devices 133 and 134) constituting the imaging unit 130 will be referred to as optical axes 193 and 194. In this case, an angle formed by the optical axis 193 and a normal 195 orthogonal (or almost orthogonal) to the display surface of the display unit 140 is indicated by θ1 and an angle formed by the optical axis 194 and the normal 195 is indicated by θ1. That is, the two imaging systems (optical systems 131 and 132 and imaging devices 133 and 134) are arranged such that the optical axes 193 and 194 of the two imaging systems (optical systems 131 and 132 and imaging devices 133 and 134) are axisymmetric with respect to the normal 195.

Further, an imaging area of each of the two lens groups (optical systems 131 and 132) is indicated by θ. Further, the two lens groups (optical systems 131 and 132) are arranged such that at least a part of the imaging area in the long-side direction (specific direction) of the display unit 140 overlaps with the other imaging area.

In this manner, the two imaging systems (optical systems 131 and 132 and imaging devices 133 and 134) constituting the imaging unit 130 are arranged such that the optical axes form a certain angle (2*θ1) in the long-side direction of the display unit 140 (specific direction). That the optical axes form the certain angle in the specific direction means that the arrangement is performed such that the angle formed by the optical axes is a predetermined angle (2*θ1) in the specific direction. In other words, it means that the two imaging systems are arranged such that the angle formed by the optical axes 193 and 194 of the two imaging systems (optical systems 131 and 132 and imaging devices 133 and 134) is the predetermined angle (2*θ1) in the specific direction. Further, the two imaging systems (optical systems 131 and 132 and imaging devices 133 and 134) constituting the imaging unit 130 are arranged such that long sides of the imaging devices 133 and 134 having a rectangular shape are parallel to a longitudinal direction of the casing of the information processing apparatus 100. With this, each of the two imaging systems generates an image with the longitudinal direction of the casing of the information processing apparatus 100 being a long side.

Further, as viewing in a direction of subjects serving as imaging targets from a surface (front surface) in which the display unit 140 is provided, most of the subjects located on a left-hand side of the normal 195 shown in Part "a" of FIG. 1 are imaged by a left imaging system formed of the optical system 131 and the imaging device 133 as a left image. Meanwhile, most of the subjects located on a right-hand side of the normal 195 shown in Part "a" of FIG. 1 are imaged by a right imaging system formed of the optical system 132 and the imaging device 134 as the right image. Further, the two imaging systems (optical systems 131 and 132 and imaging devices 133 and 134) are arranged such that an overlap region is formed between two images (left image and right image) generated by the two imaging systems (optical systems 131 and 132 and imaging devices 133 and 134). Note that the overlap region between the two images (left image and right image) is, for example, an overlap region H2 shown in Part "a" of FIG. 15. In addition, FIG. 1 shows an example in which, when the two imaging systems are arranged in two stages in the upper and lower directions shown in Part "d" of FIG. 1, the left imaging system (optical system 131 and imaging device 133) is arranged in the lower stage in the upper and lower directions and the right imaging system (optical system 132 and imaging device 134) is arranged in the upper stage in the upper and lower directions.

It is favorable that the angle θ1 shown in Part "a" of FIG. 1 is less than 50% of θ. Further, it is favorable that an area of the overlap region H2 shown in FIG. 15 in a horizontal direction (long-side direction of imaging device) is less than 50% of an area (H1+H2 shown in FIG. 15) being an imaging target of one imaging device. Thus, an imaging target area formed of areas as imaging targets of a plurality of imaging devices can be larger by an amount corresponding to 50% or more of the area as the imaging target of the one imaging device. Further, at an aspect ratio of the imaging target area formed of the areas being the imaging targets of the plurality of imaging devices, a panoramic image is larger in size by an amount corresponding to 50% or more of that at an aspect ratio of the area as the imaging target of the one imaging device can be obtained.

In this manner, the information processing apparatus 100 includes the optical system 131 that inputs light into the imaging device 133 and the optical system 132 that inputs light into the imaging device 134. The information processing apparatus 100 includes the imaging device 133 that receives light passing through the optical system 131 and the imaging device 134 that receives light passing through the optical system 132. The information processing apparatus 100 includes the casing including one face long in the specific direction. The casing includes the optical system 131 and the optical system 132 that are arranged in this one face in the orthogonal direction almost orthogonal to the specific direction. This casing includes the display unit 140 having a rectangular shape long in the specific direction.

Further, the optical system 131 and the optical system 132 are arranged such that the optical axis 193 of the optical system 131 and the optical axis 194 of the optical system 132 form the angle (θ1*2) in the specific direction. A projection onto a face (first face) that includes the long side of the display unit 140 and is perpendicular to the display surface of the display unit 140, which is a projection of the normal to the display surface of the display unit 140 onto the first face, is set as a symmetrical axis. In this case, a first projection of the optical axis 193 of the optical system 131 onto the first face and a second projection of the optical axis 194 of the optical system 132 onto the first face are axisymmetric.

[Arrangement Example of Imaging Unit]

FIGS. 2 to 5 are diagrams each showing an arrangement example of the imaging unit of the information processing apparatus 100 in the first embodiment of the present disclosure.

Figure 2:
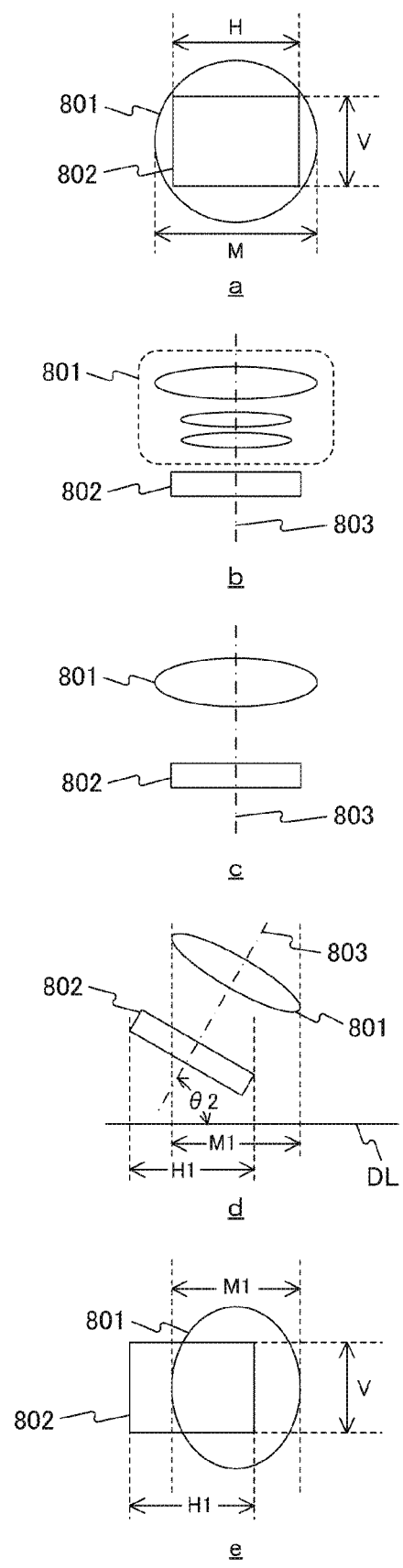
FIG. 2 is a diagram showing an arrangement example of an imaging unit of the information processing apparatus 100 in the first embodiment of the present disclosure.

Part "a" of FIG. 2 shows a plane view as one imaging system formed of one optical system (lens group) 801 and one imaging device 802 is viewed on an optical axis thereof. Note that the optical system 801 and the imaging device 802 correspond to the optical system 131 and the imaging device 133 and the optical system 132 and the imaging device 134 shown in FIG. 1.

Further, a diameter M of a lens shown in Part "a" of FIG. 2 is a value indicating a diameter of a lens arranged on an outermost side in a lens group constituting the optical system 801. A length H of a long side of an imaging device is a value indicating a length of a long side of the imaging device 802. A length V of a short side of an imaging device is a value indicating a length of a short side of the imaging device 802.

Part "b" of FIG. 2 shows a diagram as one imaging system (optical system 801 and imaging device 802) is viewed in a direction orthogonal to an optical axis 803 (direction orthogonal to long-side direction of imaging device 802). Note that Part "b" of FIG. 2 representatively shows only three lenses as the optical system 801 for the sake of description.

Further simplifying the optical system 801 shown in Part "b" of FIG. 2, the optical system 801 is schematically shown by a single lens in Part "c" of FIG. 2. Simplifying the optical system, it is schematically shown by a single lens also in Parts "d" and "e" of FIG. 2 and FIGS. 3 to 5.

Part "d" of FIG. 2 shows a diagram in the case where the imaging system (optical system 801 and imaging device 802) shown in Part "c" of FIG. 2 is arranged such that the optical axis 803 is at an angle θ2 with respect to a certain reference surface DL. Note that the angle θ2 and the angle θ1 shown in Part "a" of FIG. 1 are in a relationship of θ2=π/2−θ1.

In Part "d" of FIG. 2, a length M1 of projection of the diameter M of the lens onto the reference surface DL can be calculated by M*cos (π/2−θ2). Further, a length H1 of projection of the length H of the long side of the imaging device onto the reference surface DL can be calculated by H*cos (π/2θ2).

Part "e" of FIG. 2 shows a diagram as the optical system 801 and the imaging device 802 projected on the reference surface DL in Part "d" of FIG. 2 are viewed from a position directly facing the reference surface DL.

As shown in Part "e" of FIG. 2, the optical system (lens group) 801 becomes an ellipse on a projection surface. Further, as shown in Part "e" of FIG. 2, on the projection surface, a ratio of the length of the long side to the length of the short side of the imaging device 802 is smaller. At the same time, the imaging device 802 appears to deviate from the center of the optical system (lens group) 801 in a direction of the projection of the optical axis 803. In this manner, on the projection surface, the optical system (lens group) is the ellipse. However, in FIG. 1, for the sake of description, the optical systems (lens group) 131 and 132 are shown by not ellipses but circles.

Figure 3:
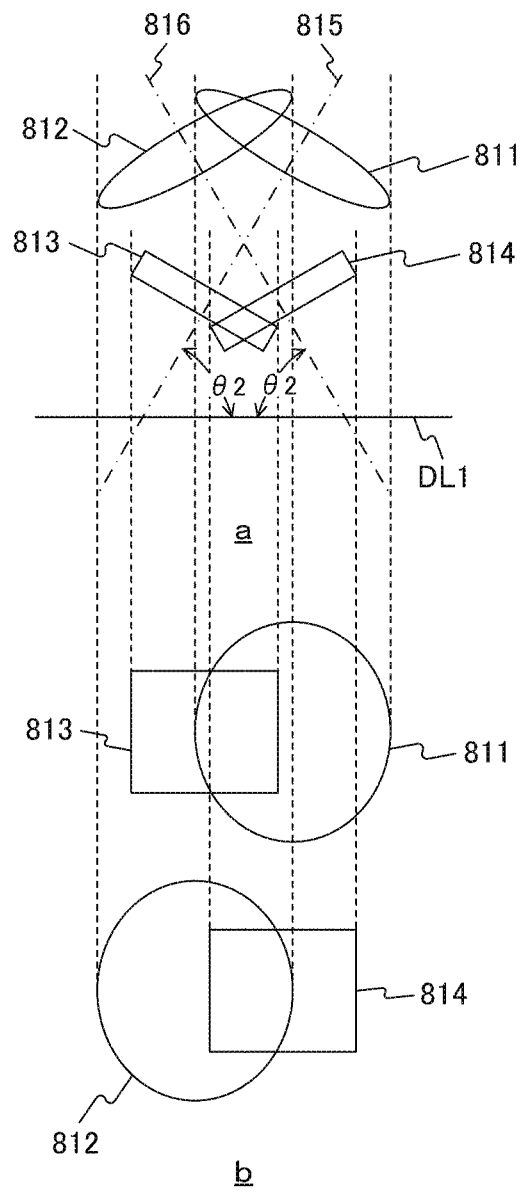
FIG. 3 is a diagram showing an arrangement example of the imaging unit of the information processing apparatus 100 in the first embodiment of the present disclosure.
Figure 4:
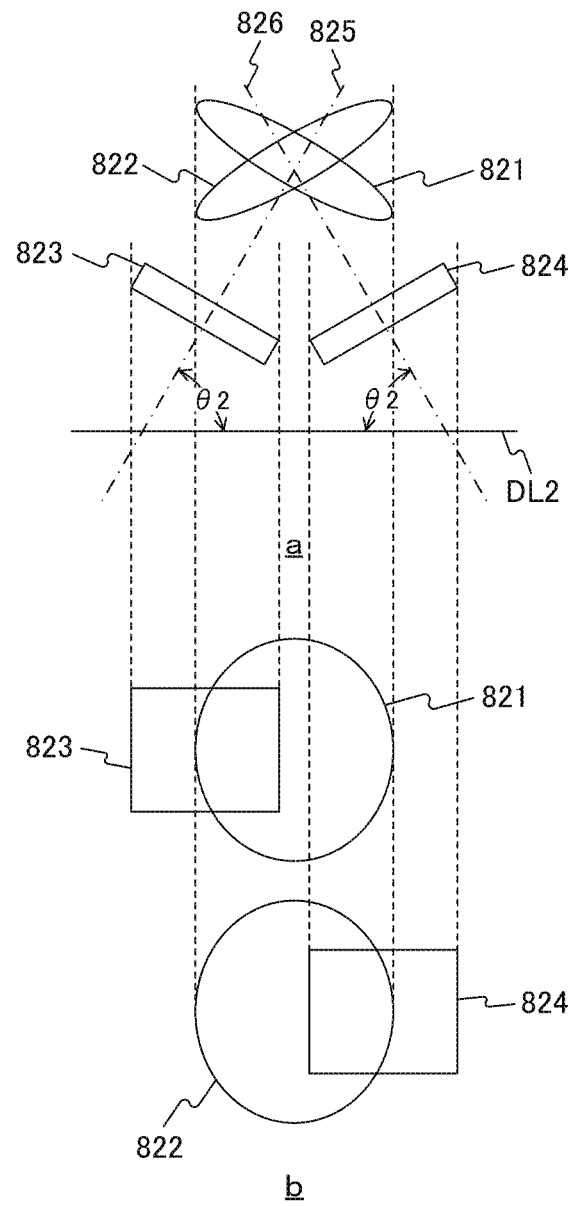
FIG. 4 is a diagram showing an arrangement example of the imaging unit of the information processing apparatus 100 in the first embodiment of the present disclosure.
Figure 5:
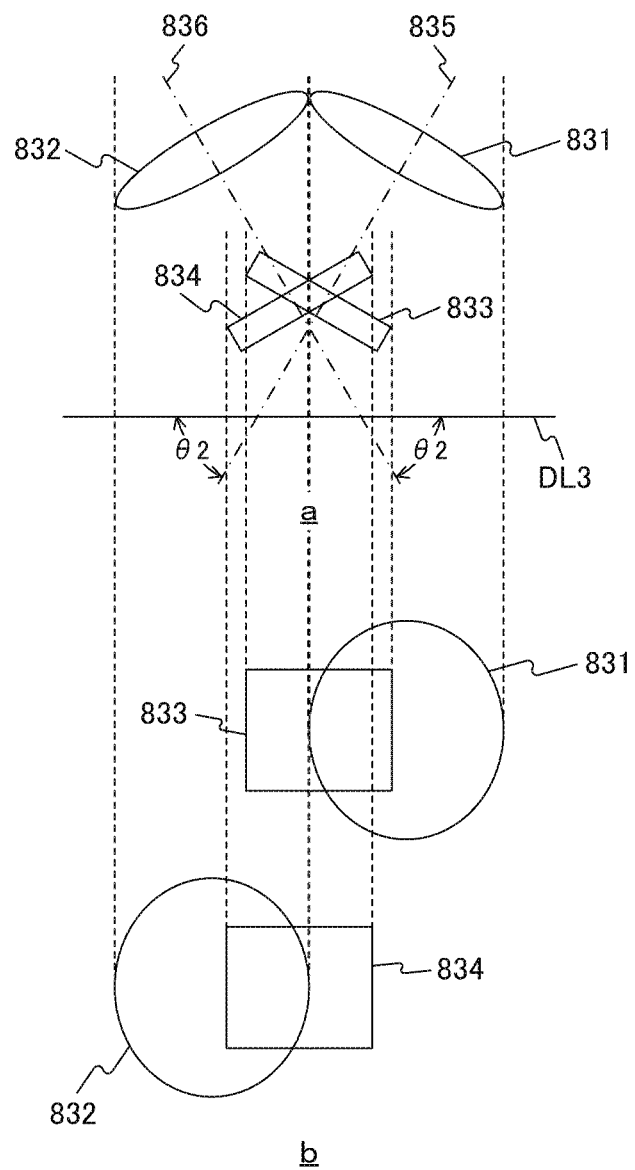
FIG. 5 is a diagram showing an arrangement example of the imaging unit of the information processing apparatus 100 in the first embodiment of the present disclosure.

FIGS. 3 to 5 show arrangement examples of the imaging system when a position at which the optical axes of the two imaging systems cross in the information processing apparatus is changed three times.

Specifically, FIG. 3 shows an arrangement example in the case where, as in Part "d" of FIG. 2, the arrangement is performed such that an angle of each of optical axes 815 and 816 with respect to a reference surface DL1 becomes the angle θ2 (angle θ1 with respect to normal on the reference surface DL1). Specifically, FIG. 3 shows the arrangement example in the case where the two imaging systems are arranged such that the two optical axes 815 and 816 cross between optical systems (lens group) 811 and 812 and imaging devices 813 and 814.

FIG. 4 shows an arrangement example in the case where the arrangement is performed such that an angle of each of optical axes 825 and 826 with respect to a reference surface DL2 becomes the angle θ2 (angle θ1 with respect to normal on reference surface DL2). Specifically, FIG. 4 shows the arrangement example in the case where the two imaging systems are arranged such that the two optical axes 825 and 826 cross at positions of optical systems (lens group) 821 and 822.

FIG. 5 shows an arrangement example in the case where the arrangement is performed such that an angle of each of optical axes 835 and 836 with respect to the reference surface DL3 becomes the angle θ2 (angle θ1 with respect to normal on reference surface DL3). Specifically, FIG. 5 shows the arrangement example in the case where the two imaging systems are arranged such that the two optical axes 835 and 836 cross on extensions respectively extending from optical systems (lens group) 831 and 832 to imaging devices 833 and 834.

Further, Part "b" of FIG. 3 shows a diagram in the case where, as in Part "e" of FIG. 2, the optical systems (lens group) 811 and 812 and the imaging devices 813 and 814 shown in Part "a" of FIG. 3 are projected on the reference surface DL1. Similarly, Part "b" of FIG. 4 shows a diagram in the case where the optical systems (lens group) 821 and 822 and imaging devices 823 and 824 shown in Part "a" of FIG. 4 are projected on the reference surface DL2. Similarly, Part "b" of FIG. 5 shows a diagram in the case where the optical systems (lens group) 831 and 832 and the imaging devices 833 and 834 shown in Part "a" of FIG. 5 are projected on the reference surface DL3.

In this manner, FIGS. 3 to 5 show the arrangement examples when the position at which the optical axes of the two imaging systems cross is changed three times in the imaging unit 130 in Part "a" of FIG. 1.

In this manner, a position relationship between the two optical systems (lens group) in the horizontal direction (e.g., long-side direction of display unit 140 and casing of information processing apparatus 100 shown in Part "b" of FIG. 1) is changed according to the position at which the two optical axes of the two imaging systems cross. For example, as shown in FIG. 4, when the two optical axes 825 and 826 cross at the positions of the optical systems (lens group) 821 and 822, the positions of the optical systems (lens group) 821 and 822 in the horizontal direction (long-side direction of casing) correspond to each other. Further, as shown in FIGS. 3 and 5, as the position at which the two optical axes cross goes from the optical systems (lens group) towards the imaging devices, the positions of the optical systems (lens group) 821 and 822 in the horizontal direction move away from each other. Note that an example of the information processing apparatus in which the positions of the optical systems (lens group) in the horizontal direction correspond to each other will be shown in Part "a" of FIG. 29.

The display unit 140 is a display apparatus that displays various images, and configured by a touch panel, for example. For example, an image generated by an imaging operation is displayed on the display unit 140. For example, a liquid crystal display (LCD) panel or an organic electro luminescence (EL) panel may be used as the display unit 140.

A state in which the longitudinal direction of the information processing apparatus 100 is set to be identical to a vertical direction (direction parallel to direction of gravitational force) will be referred to as a vertical state of the information processing apparatus 100. Further, as shown in Parts "a" to "d" of FIG. 1, a state in which the longitudinal direction of the information processing apparatus 100 is set to be identical to a horizontal direction (direction perpendicular to direction of gravitational force) will be referred to as a horizontal state of the information processing apparatus 100. Note that a state in which the longitudinal direction of the information processing apparatus 100 is set to be identical to the horizontal direction, is, for example, a state in which the information processing apparatus 100 in the vertical state is rotated by 90 degrees with an axis orthogonal to the display surface of the display unit 140 being a rotational axis.

The multi-eye information processing apparatus 100 is used as described above, and hence, for example, in the case where a panoramic image being a still image is captured, images captured by the plurality of imaging systems at the same time can be combined with each other to form the panoramic image immediately after a shutter button is pressed. Note that a single-eye imaging apparatus capable of generating a panoramic image by an operation of rotating an imaging apparatus in the horizontal direction with an imaging position (position of photographer) being a center of rotation (so-called panning operation) exists. In the case where a panoramic image is generated by the single-eye imaging apparatus, the panning operation is necessary as described above. Therefore, the panoramic image cannot be generated immediately after the shutter button is pressed. In contrast, the information processing apparatus 100 can capture a panoramic image for a shorter time in comparison with the single-eye imaging apparatus.

As described above, the information processing apparatus 100 is a multi-eye imaging apparatus capable of capturing a panoramic image extending in the long-side directions of the casing and the display unit 140 with the two imaging systems (optical systems 131 and 132 and imaging devices 133 and 134) and recording the panoramic image.

[Internal Configuration Example of Information Processing Apparatus]

Figure 6:
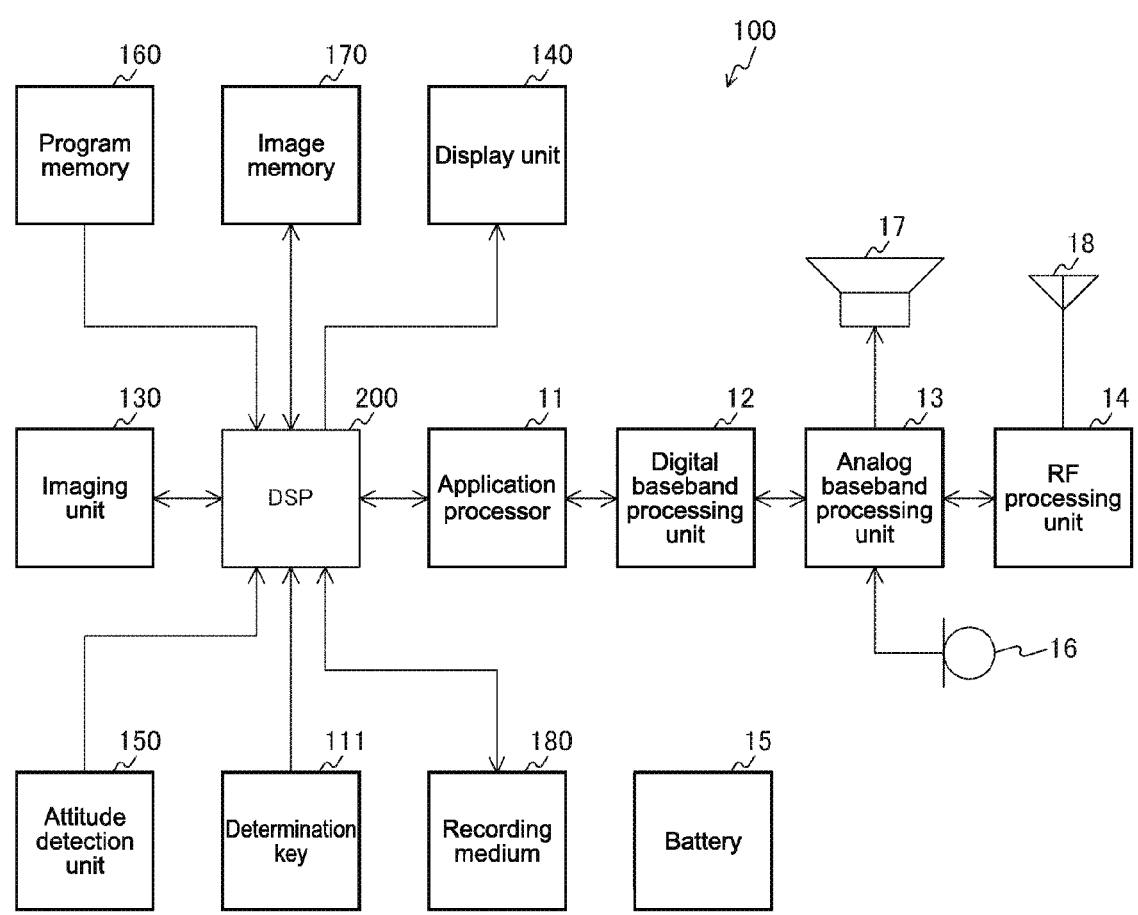
FIG. 6 is a diagram showing an internal configuration example of the information processing apparatus 100 in the first embodiment of the present disclosure.

FIG. 6 is a diagram of an internal configuration example of the information processing apparatus 100 in the first embodiment of the present disclosure.

The information processing apparatus 100 includes an application processor 11, a digital base band processing unit 12, an analog base band processing unit 13, and a radio frequency (RF) processing unit 14. The information processing apparatus 100 further includes a battery 15, a microphone 16, a speaker 17, an antenna 18, the determination key 111, the imaging unit 130, and the display unit 140. The information processing apparatus 100 further includes an attitude detection unit 150, a program memory 160, an image memory 170, a recording medium 180, and a digital signal processor (DSP) 200. Note that the RF processing unit 14 includes the antenna 18 and the analog base band processing unit 13 includes the microphone 16 and the speaker 17.

The application processor 11 controls each unit of the information processing apparatus 100 based on various programs stored in a built-in memory. The application processor 11 includes, for example, a central processing unit (CPU), a read only memory (ROM), and a random access memory (RAM).

For example, in the case where a telephone reception operation is performed, radio waves received by the antenna 18 are demodulated by the digital base band processing unit 12 through the RF processing unit 14 and the analog base band processing unit 13. Then, a demodulation result of the digital base band processing unit 12 is output from the speaker 17 through the analog base band processing unit 13.

On the other hand, in the case where a telephone transmission operation is performed, sound input from the microphone 16 is modulated by the digital base band processing unit 12 through the analog base band processing unit 13. Then, demodulated audio data is transmitted from the antenna 18 through the analog base band processing unit 13 and the RF processing unit 14.

Further, when the user performs an imaging-operation starting instruction operation, the imaging operation is performed in the information processing apparatus 100. For example, when the user performs the imaging-operation starting instruction operation, the application processor 11 instructs respective units (imaging unit 130, DSP 200, and the like) involved in the imaging operation to start the imaging operation, and activates those units. Then, the activated units perform the imaging operation and a generated image is displayed on the display unit 140. When the user performs an image recording instruction operation, the generated image is recorded on the recording medium 180. Further, when the user performs an instruction operation to wirelessly transmit an image, the generated image is wirelessly transmitted. For example, generated image data is modulated by the digital base band processing unit 12 and transmitted from the antenna 18 through the analog base band processing unit 13 and the RF processing unit 14. Note that the battery 15 is a battery that supplies power to the information processing apparatus 100.

Note that the determination key 111, the imaging unit 130, the display unit 140, the attitude detection unit 150, the program memory 160, the image memory 170, the recording medium 180, and the DSP 200 will be described in detail with reference to FIGS. 7 to 10 and the like.

[Internal Configuration Example of Imaging Unit]

Figure 7:
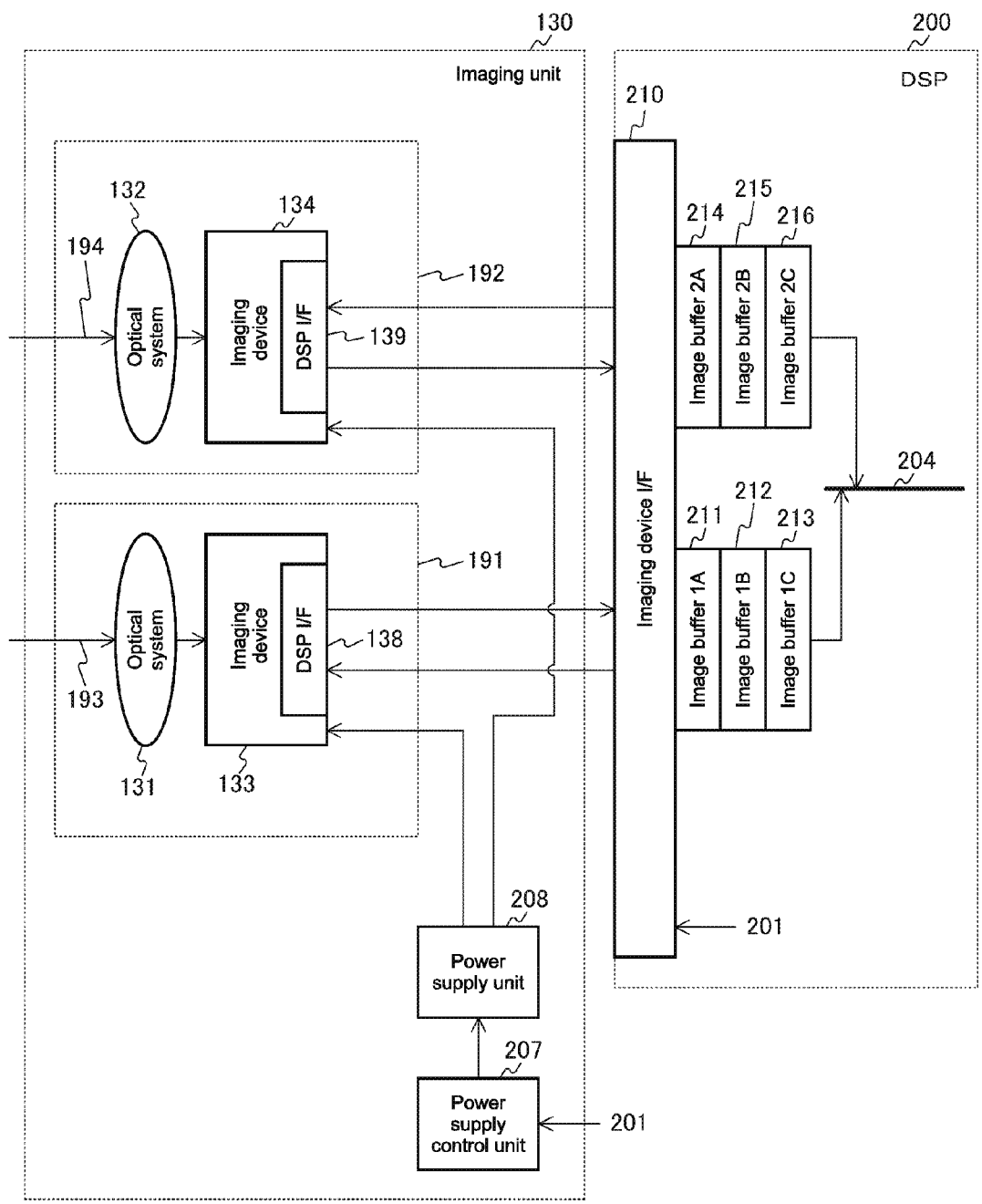
FIG. 7 is a diagram showing an internal configuration example of an imaging unit 130 in the first embodiment of the present disclosure.

FIG. 7 is a diagram of an internal configuration example of the imaging unit 130 in the first embodiment of the present disclosure. Further, FIG. 7 shows part of the DSP 200 to be connected to the imaging unit 130. Note that an entire configuration of the DSP 200 will be described in detail with reference to FIG. 8.

The imaging unit 130 includes two imaging systems (first imaging system 191 and second imaging system 192), a power-supply control unit 207, and a power-supply unit 208.

The first imaging system 191 includes the optical system 131, the imaging device 133, and an interface (I/F) 138 with the DSP. Further, the second imaging system 192 includes the optical system 132, the imaging device 134, and an I/F 139 with the DSP. Note that the configurations of the first imaging system 191 and the second imaging system 192 are almost the same. Therefore, the configuration of the first imaging system 191 is mainly described and a description of the second imaging system 192 is omitted.

The optical system 131 is constituted of a plurality of lenses (including zoom lens and focus lens) that collect light from a subject. Further, the amount of light passing through those lenses (i.e., exposure) is adjusted by a diaphragm (not shown). Then, the collected light from the subject is input into the imaging device 133.

The imaging device 133 is an imaging device that focuses a subject image input via the optical system 131 and generates an image signal. That is, the imaging device 133 receives light from the subject input via the optical system 131 and performs photoelectric conversion, to thereby generate an analog image signal depending on the amount of light received. The analog image signal thus generated by the imaging device 133 is provided to the DSP 200 via the I/F 138 with the DSP. Note that, for example, a solid-state imaging device of a charge coupled device (CCD) type or a complementary metal oxide semiconductor (CMOS) type may be used as the imaging device.

The I/F 138 with the DSP is an interface for connecting the imaging device 133 and the DSP 200 to each other.

The power-supply control unit 207 controls, based on a power-supply controlling instruction from an imaging control unit 201 (shown in FIG. 8) of the DSP 200, the power-supply units 208 and 209. That is, when receiving the power-supply controlling instruction from the imaging control unit 201, the power-supply control unit 207 creates signals according to amplitude, rate of rise, and rate of decay of signal that are demanded by the power-supply unit 208 as input specifications of control signals. Then, the power-supply control unit 207 outputs the created signals to the power-supply unit 208 to control the power-supply unit 208. Note that, if output signals of the imaging control unit 201 comply with the input specifications of the control signals for the power-supply unit 208, the output signals of the imaging control unit 201 may be directly input into the power-supply unit 208.

The power-supply unit 208 supplies power to the first imaging system 191 and the second imaging system 192 based on a control of the power-supply control unit 207. Note that the power-supply unit 208 is realized by, for example, a commercially available power-supply integrated circuit (IC).

Further, each of the first imaging system 191 and the second imaging system 192 is connected to the DSP 200 via a single data line and seven kinds of signal lines. A description is made with the single data line that connects the first imaging system 191 and the DSP 200 to each other being denoted by L1 and the seven kinds of signal lines being referred to as signal lines L2 to L8. Note that the data line and signal lines of the second imaging system 192 are almost the same as the data line and signal lines of the first imaging system 191. Therefore, the data line and signal lines of the first imaging system 191 are mainly described and a description of the second imaging system 192 is omitted.

The data line L1 is a data line for transmitting image data from the imaging device 133 to the DSP 200. This data line L1 is favorably constituted of a plurality of data lines for increasing a transmission rate of image data, for example. Further, in order to increase the transmission rate of image data and increase a noise resistance on a transmission path, a high-speed, differential-transmission data line is favorably used as the data line L1. For example, a low voltage differential signaling (LVDS) is favorably used for the data line L1.

The signal line L2 is a bi-directional communication line between the imaging device 133 and the DSP 200. For example, a four-line-structure serial communication line may be used as the signal line L2. The signal line L2 is used when various setting values necessary for using the imaging device 133 are set from a side of the DSP 200, for example. For example, setting values for thinning-out image data output from the imaging device 133 to the DSP 200 and outputting the thinned-out image data are written in registers (not shown) from the DSP 200 via the signal line L2.

The signal line L3 is a clock signal line for supplying a clock from the DSP 200 to the imaging device 133. Using a clock supplied via the signal line L3, the imaging device 133 performs an imaging operation at one pixel per clock cycle. Alternatively, a multiplier may be installed in the imaging device 133, the clock supplied from the DSP 200 may be multiplied in the imaging device 133, and the imaging operation at one pixel per clock cycle after the multiplication may be performed.

The signal line L4 is a reset signal line for supplying a reset signal from the DSP 200 to the imaging device 133.

The signal line L5 is a signal line for controlling ON and OFF of the imaging operation of the imaging device 133 from the DSP 200. That is, the signal line L5 is a signal line for notifying the stop and start of operation from the DSP 200 to each imaging device.

The signal line L6 is a vertical synchronization signal line. That is, the signal line L6 is a signal line for notifying a synchronization signal indicating imaging timing for each frame from the DSP 200 to the imaging device 133.

The signal line L7 is a horizontal synchronization signal line. That is, the signal line L7 is a signal line for notifying a synchronization signal indicating imaging timing for each line in one frame from the DSP 200 to imaging device 133.

The signal line L8 is a shutter signal line. For example, when an operation member (e.g., determination key 111) for performing captured image recording is depressed by the user in the information processing apparatus 100, a shutter signal corresponding to this depression is notified from the DSP 200 to the imaging device 133 via the signal line L8.

It is assumed that either one of a panoramic image capturing mode and a normal image capturing mode is set based on the user operation. For example, if the panoramic image capturing mode is set, image data items generated by the first imaging system 191 and the second imaging system 192 are combined with each other to generate a panoramic image. Otherwise, if the normal image capturing mode is set, partial portions (middle portions) of the image data items generated by the first imaging system 191 and the second imaging system 192 are combined with each other to generate a normal image (e.g., image at horizontal-to-vertical ratio (4:3)).

Alternatively, either one of the panoramic image capturing mode and the normal image capturing mode may be set based on a detection result (e.g., horizontal state or vertical state) by the attitude detection unit 150. For example, if the horizontal state is detected by the attitude detection unit 150, the panoramic image capturing mode is set and a panoramic image is generated by combining image data items generated by the first imaging system 191 and the second imaging system 192 with each other. Otherwise, if the vertical state is detected by the attitude detection unit 150, the normal image capturing mode is set and a normal image is generated by combining partial portions (middle portions) of the image data items generated by the first imaging system 191 and the second imaging system 192 with each other.

[Configuration Example of DSP]

Figure 8:
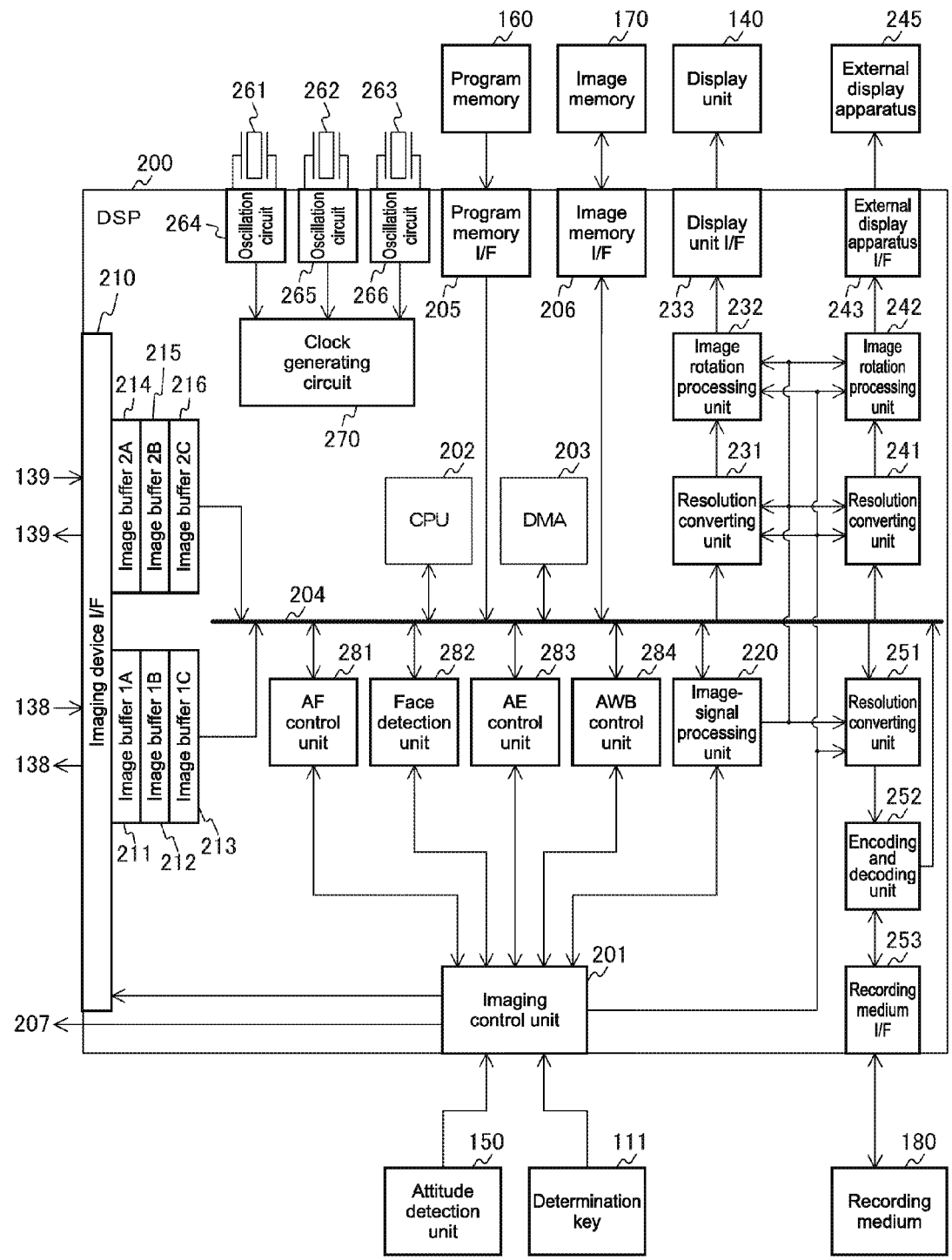
FIG. 8 is a block diagram showing an internal configuration example of a DSP 200 in the first embodiment of the present disclosure.

FIG. 8 is a block diagram of an internal configuration example of the DSP 200 in the first embodiment of the present disclosure.

The DSP 200 includes the imaging control unit 201, a CPU 202, a direct memory access (DMA) controller 203, a data bus 204, a program memory I/F 205, and an image memory I/F 206. The DSP 200 further includes an imaging device I/F 210, image buffers 211 to 216, an image-signal processing unit 220, resolution converting units 231, 241, and 251, and image rotation processing units 232 and 242. The DSP 200 further includes a display unit I/F 233, an external display device I/F 243, an encoding/decoding unit 252, a recording medium I/F 253, oscillating circuits 264 to 266, and a clock generating circuit 270. The DSP 200 further includes an auto-focus (AF) control unit 281 and a face detection unit 282. The DSP 200 further includes an automatic exposure (AE) control unit 283 and an auto white balance (AWB) control unit 284. The CPU 202, the DMA controller 203, the image memory I/F 206, the image buffers 211 to 219, the image-signal processing unit 220, and the like are connected to the data bus 204. Signals from the determination key 111 and the attitude detection unit 150 are input to the imaging control unit 201.

The attitude detection unit 150 detects a change of an attitude of the information processing apparatus 100 by detecting acceleration, motion, tilt, and the like of the information processing apparatus 100, and outputs a detection result (attitude information relating to detected attitude change) to the imaging control unit 201. For example, the attitude detection unit 150 detects, as the attitude change of the information processing apparatus 100, rotation angles about three axes (e.g., X-axis, Y-axis, and Z-axis) and outputs a detection result thereof to the imaging control unit 201. A sensor capable of detecting the rotation angles about the three axes in the information processing apparatus 100 can be used as the attitude detection unit 150. It should be noted that a sensor capable of detecting a rotation angle about at least one axis may be used. For example, a fall sensor, a gravity sensor, a gyro sensor, an acceleration sensor capable of detecting an acceleration direction, and an angular velocity sensor capable of detecting a rotational motion can be used as the attitude detection unit 150.

The imaging control unit 201 controls the units related to imaging processing. For example, the imaging control unit 201 performs an imaging control for the units based on input signals from the determination key 111. The imaging control unit 201 determines, on the basis of a detection result from the attitude detection unit 150, an attitude of the information processing apparatus 100 and performs imaging control for the units on the basis of a result of the determination.

Further, when the user sets an imaging mode, the imaging control unit 201 notifies the units in the DSP 200 and the imaging devices 133 and 134 of this set imaging mode, and causes the registers of the units to store the set imaging mode. In this manner, the setting content of the imaging mode set by the user is stored in the registers of the units, and hence a plurality of imaging conditions can be easily switched and used by the user.

The imaging control unit 201 notifies, for example, on the basis of the setting content of the imaging mode stored in the register incorporated therein, the units in the DSP 200 and the imaging devices 133 and 134 of a vertical synchronization signal, a horizontal synchronization signal, and a clock signal. The imaging control unit 201 notifies, for example, on the basis of the setting content of the imaging mode stored in the register incorporated therein, the units related to display in the DSP 200 and the display unit 140 of the vertical synchronization signal, the horizontal synchronization signal, and the clock signal. The imaging control unit

201 outputs, for example, to the power-supply control unit 207, a signal for controlling ON and OFF of a power-supply.

The CPU 202 controls the entire DSP 200 on the basis of various programs stored in the program memory 160. The control content will be described in detail with reference to FIGS. 11 and 27.

The DMA controller 203 controls transfer of data among memories on the basis of the control by the CPU 202.

The program memory I/F 205 is an interface for connecting the program memory 160 and the DSP 200.

The image memory I/F 206 is an interface for connecting the image memory 170 and the DSP 200.

The imaging device I/F 210 is an interface for connecting the imaging devices 133 and 134 and the DSP 200. Specifically, image data generated by the imaging devices 133 and 134 are input to the imaging device I/F 210. For example, when the data line L1 for transmitting the image data from the imaging devices 133 and 134 is an LVDS type having micro amplitude, the image data from the imaging devices 133 and 134 are converted into a GND potential or a power supply potential in the DSP I/Fs 138 and 139. The image buffers 211 to 216 in three systems corresponding to the imaging devices 133 and 134 are provided at a post-stage of the imaging device I/F 210.

The image buffers 211 to 216 are image buffers that store the image data output from the imaging devices 133 and 134. The stored image data are written in the image memory 170 via the data bus 204. For example, three image buffers are provided for each of the imaging devices. The image buffers are connected to the data bus 204. For example, three image buffers 211 to 213 are provided for the imaging device 133. Three image buffers 214 to 216 are provided for the imaging device 134.

In the first embodiment of the present disclosure, in order to write the image data in the image memory 170, even while the image data are read out from the image buffers 211 to 216, image data input anew from the imaging devices 133 and 134 are sequentially stored. Therefore, it is favorable to provide two or more image buffers for each of the imaging devices 133 and 134 as the image buffers 211 to 216.

It is favorable that a capacity of one of the image buffers 211 to 216 is larger than bit width of the data bus 204. For example, when the data bus 204 has 128-bit width, it is favorable that the image buffers have a capacity equal to or larger than 128 bits. It is more favorable that the capacity of one of the image buffers 211 to 216 is equal to or larger than a double of the bit width of the data bus 204. For example, when the data bus 204 has 128-bit width, it is favorable that the image buffers have a capacity equal to or larger than 256 bits.

On the other hand, the capacity of one of the image buffers 211 to 216 can be set to be equal to or smaller than an image data amount of one image generated by one imaging device. For example, it is favorable that the capacity of one of the image buffers 211 to 216 is equal to or smaller than a data amount of image data generated by pixels for one line of the imaging device 133.

In the first embodiment of the present disclosure, bit width of a data line connecting the imaging devices 133 and 134 and the DSP 200 is set to, for example, 12 bits. For example, bit width of the data bus 204 of the DSP 200 is set to 128-bit width and the capacity of one of the image buffers 211 to 216 is set to 128 bits.

The image-signal processing unit 220 applies, on the basis of the control by the imaging control unit 201, various kinds of image signal processing to image data input via the image buffers 211 to 216 and the data bus 204. Note that the internal configuration of the image-signal processing unit 220 will be described in detail with reference to FIG. 9.

The resolution converting unit 231 performs, on the basis of the control by the imaging control unit 201 or the CPU 202, resolution conversion for causing the display unit 140 to display images and outputs image data subjected to the resolution conversion to the image rotation processing unit 232.

The resolution converting unit 241 performs, on the basis of the control by the imaging control unit 201 or the CPU 202, resolution conversion for causing an external display device 245 to display images and outputs image data subjected to the resolution conversion to the image rotation processing unit 242.

The image rotation processing unit 232 applies, on the basis of the control by the imaging control unit 201 or the CPU 202, rotation processing to the image data subjected to the resolution conversion and outputs the image data subjected to the rotation processing to the display unit I/F 233.

The image rotation processing unit 242 applies, on the basis of the control by the imaging control unit 201 or the CPU 202, rotation processing to the image data subjected to the resolution conversion and outputs the image data subjected to the rotation processing to the external display device I/F 243.

The display unit I/F 233 is an interface for connecting the display unit 140 and the DSP 200.

The external display device I/F 243 is an interface for connecting the external display device 245 and the DSP 200. The external display device 245 is, for example, a television.

The resolution converting unit 251 converts, on the basis of the control by the imaging control unit 201 or the CPU 202, resolution for recording of images and outputs image data subjected to the resolution conversion to the encoding/decoding unit 252. For example, the resolution converting unit 251 performs resolution conversion processing for converting resolution to a recorded image size desired by the user and resolution conversion processing for generating a thumbnail image.

The encoding/decoding unit 252 performs, on the basis of the control by the imaging control unit 201 or the CPU 202, encoding for compressing image data output from the resolution converting unit 251, and outputs the encoded image data to the recording medium I/F 253. Further, for displaying image data recorded on the recording medium 180 on the display unit 140, the encoding/decoding unit 252 inputs and decodes the image data recorded on the recording medium 180 via the recording medium I/F 253. The decoded image data is stored in the image memory 170.

The recording medium I/F 253 is an interface for connecting the recording medium 180 and the DSP 200.

The recording medium 180 is a recording medium that records the image data supplied via the recording medium I/F 253. The recording medium 180 may be incorporated in the information processing apparatus 100 or may be detachably attached to the information processing apparatus 100. As the recording medium 180, for example, a tape (e.g., magnetic tape) or an optical disk (e.g., recordable digital versatile disc (DVD)) can be used. As the recording medium 180, for example, a magnetic disk (e.g., hard disk), a semiconductor memory (e.g., memory card), or a magneto-optical disk (e.g., mini-disc (MD)) may be used.

Oscillators 261 to 263 are oscillation sources for generating clock signals supplied into the DSP 200. For example, quartz oscillators are used.

The oscillating circuits 264 to 266 generate clock signals supplied into the DSP 200 and output the generated clock signals to the clock generating circuit 270.

The clock generating circuit 270 generates, based on clock signals generated by the oscillating circuits 264 to 266, a plurality of kinds of clocks and supplies the plurality of kinds of clocks to the units. For example, the clocks are supplied into an inside of the DSP 200 and the clocks are supplied to an outside via the inside of the DSP 200.

The AF control unit 281 performs focus control on image data input via the image buffers 211 to 216 and the data bus 204 so as to be focused on the subject included in a predetermined area in that image (captured image). Note that the predetermined area can be, for example, an area in the middle of the captured image, an area specified by the user, or an area including a position of a face detected by the face detection unit 282. Alternatively, a plurality of predetermined areas may be set and the focus control may be performed for each of the predetermined areas. Then, information (e.g., evaluation value (AF evaluation value)) on a position (focus position) focused in the captured image is output to the CPU 202 and the imaging control unit 201. Further, the information on the focus position is stored in the AF control unit 281.

The face detection unit 282 detects a face of a person included in an image (captured image) of the image data input via the image buffers 211 to 216 and the data bus 204, and outputs a detection result thereof to the CPU 202 and the imaging control unit 201. Alternatively, the face detection unit 282 may detect a face of a person included in an image of image data read out from the recording medium 180. Note that, as a method of detecting a face included in an image, for example, a face detection method by matching between a template in which luminescence distribution information of a face is recorded and a content image can be used (e.g., see Japanese Patent Application Laid-open No. 2004-133637). A face detection method based on a skin-color part or the amount of feature of a human face included in an image can also be used. Those face detection methods make it possible to determine a position and a size of a face of a person in an image. Further, a detection result of a face is stored in the face detection unit 282.

The AE control unit 283 is an automatic exposure control unit for automatically adjusting a shutter speed and a stop value with respect to the image data input via the image buffers 211 to 216 and the data bus 204, and outputs a detection result thereof to the CPU 202 and the imaging control unit 201.

The AWB control unit 284 performs automatic white balance adjustment and the like on the image data input via the image buffers 211 to 216 and the data bus 204, and outputs a detection result thereof to the CPU 202 and the imaging control unit 201.

[Internal Configuration Example of Image-Signal Processing Unit]

Figure 9:
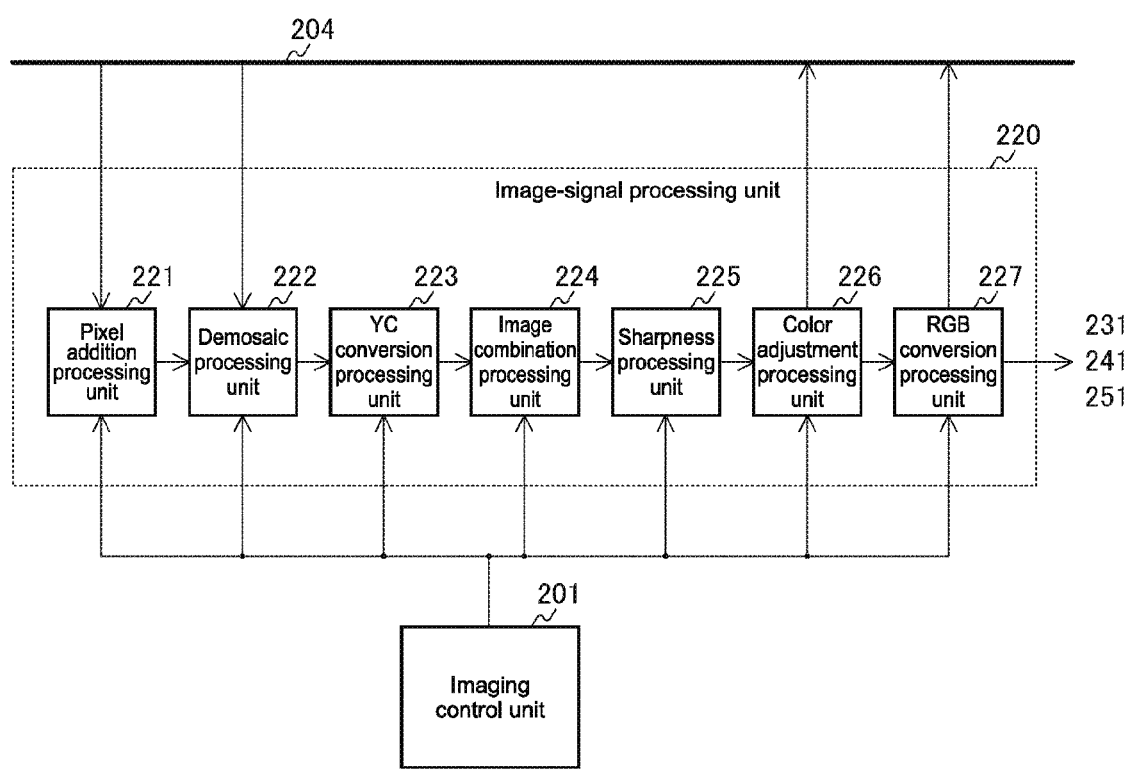
FIG. 9 is a block diagram showing an internal configuration example of an image-signal processing unit 220 in the first embodiment of the present disclosure.

FIG. 9 is a block diagram of an internal configuration example of the image-signal processing unit 220 in the first embodiment of the present disclosure.

The image-signal processing unit 220 includes a pixel addition processing unit 221, a demosaic processing unit 222, a YC conversion processing unit 223, an image combination processing unit 224, a sharpness processing unit 225, a color adjustment processing unit 226, and an RGB conversion processing unit 227.

The pixel addition processing unit 221 applies pixel addition processing and pixel thinning-out processing to the image data generated by the imaging devices 133 and 134.

The demosaic processing unit 222 performs demosaic processing (interpolation processing) such that intensities of all channels for R, G, and B are equal in pixel positions of the image data (mosaic images) generated by the imaging devices 133 and 134. The demosaic processing unit 222 supplies RGB images subjected to the demosaic processing to the YC conversion processing unit 223. Specifically, the demosaic processing unit 222 interpolates Bayer data having only pixel data for one color per one pixel and calculates three pixel data of R, G, and B for one pixel.

The YC conversion processing unit 223 applies YC matrix processing and band limitation for chroma components to the RGB images generated by the demosaic processing unit 222 to thereby generate a luminance signal (Y) and a color difference signal (Cr, Cb). The generated luminance signal (Y image) and color difference signal (C image) are supplied to the image combination processing unit 224.

The image combination processing unit 224 applies image combination to the image data generated by the YC conversion processing unit 223 and outputs the combined image data to the sharpness processing unit 225.

The sharpness processing unit 225 applies sharpness processing (processing for highlighting contour of subject) for extracting a portion with a large signal change and highlighting the portion to the image data generated by the image combination processing unit 224. The sharpness processing unit 225 supplies the image data subjected to the sharpness processing to the color adjustment processing unit 226.

The color adjustment processing unit 226 applies adjustment of a hue and chroma to the image data subjected to the sharpness processing by the sharpness processing unit 225.

The RGB conversion processing unit 227 converts the image data subjected to the adjustment of a hue and chroma by the color adjustment processing unit 226 from YCbCr data to RGB data.

A flow of image data of a signal of the image-signal processing unit 220 is described. For example, it is assumed that each of signal processing units in the image-signal processing unit 220 directly reads image data from the image memory 170 through the data bus 204 and writes the image data after signal processing into the image memory 170 through the data bus 204. This is advantageous in that the image-signal processing unit 220 can read image data in a desired position in the image data at desired timing. However, a data amount that needs to be transmitted through the data bus 204 increases, and hence it is necessary to increase an operating frequency of the data bus 204. Therefore, there is a fear that design of the data bus 204 is difficult and power consumption increases.

For example, it is assumed that each of the signal processing units in the image-signal processing unit 220 receives image data from a signal processing unit at a pre-stage not through the data bus 204 and passes the image data after the signal processing to a signal processing unit at a post-stage not through the data bus 204. In this case, the data bus 204 is not used. This is advantageous in that design of a large scale integration (LSI) is easy and power consumption can be reduced. However, there is a fear that each of the signal processing units is not able to read image data in a desired position in the image data at desired timing.

Therefore, in the first embodiment of the present disclosure, between the demosaic processing unit 222 and the color adjustment processing unit 226 having a substantially fixed image size, in order to reduce the operating frequency of the data bus 204 and power consumption, image data is directly passed among the signal processing units. At a pre-stage of a signal processing unit that uses a large amount of image data as in resolution conversion, when image data is written in the image memory 170 and the resolution conversion is performed, desired image data is read out from the image memory 170.

Further, image combination processing of combining image data items generated by the imaging devices 133 and 134 with each other is performed by the image combination processing unit 224. In this case, the image combination processing unit 224 performs trapezoidal distortion correction processing (e.g., see Japanese Patent Application Laid-open No. 2013-021730).

As the image combination processing, the image combination processing of combining two captured images with each other based on an angle of convergence, for example, can be performed (e.g., Japanese Patent Application Laid-open No. 2013-021730). Alternatively, the image combination processing may be performed by another image combination method. For example, an image combination method in which, with respect to an overlap portion of two images generated by the two imaging systems, the two images are subjected to pattern matching and the two images are combined with each other by this pattern matching can be used (e.g., see Japanese Patent Application Laid-open No. 2008-117235). Alternatively, an image combination method in which a change of a density variation in two images generated by the two imaging systems is determined and an overlap portion is determined based on the change of the density variation, to thereby combine the two images with each other may be used.

FIG. 9 shows an example in which, in the image-signal processing unit 220, the image combination processing unit 224 is provided at a post-stage of the YC conversion processing unit 223 and a pre-stage of the sharpness processing unit 225. It should be noted that the image combination processing may be performed at another stage of the image-signal processing unit 220. For example, the trapezoidal distortion correction processing and the image combination processing may be performed at the pre-stage of the demosaic processing unit 222. Alternatively, for example, the trapezoidal distortion correction processing and the image combination processing may be performed at a post-stage of the demosaic processing unit 222 and a pre-stage of the YC conversion processing unit 223. Alternatively, for example, the trapezoidal distortion correction processing and the image combination processing may be performed at a post-stage of the color adjustment processing unit 226.

Further, when such image combination processing is performed, for example, with respect to the images after the trapezoidal distortion correction, an overlap region of the images is measured in advance. Then, based on this measured value, deletion processing of the overlap region of the images can be determined in a software manner by an arithmetic apparatus such as a CPU incorporated in the information processing apparatus 100.

[Configuration Example of Imaging Device and Pixel Read-Out Example]

Figure 10:
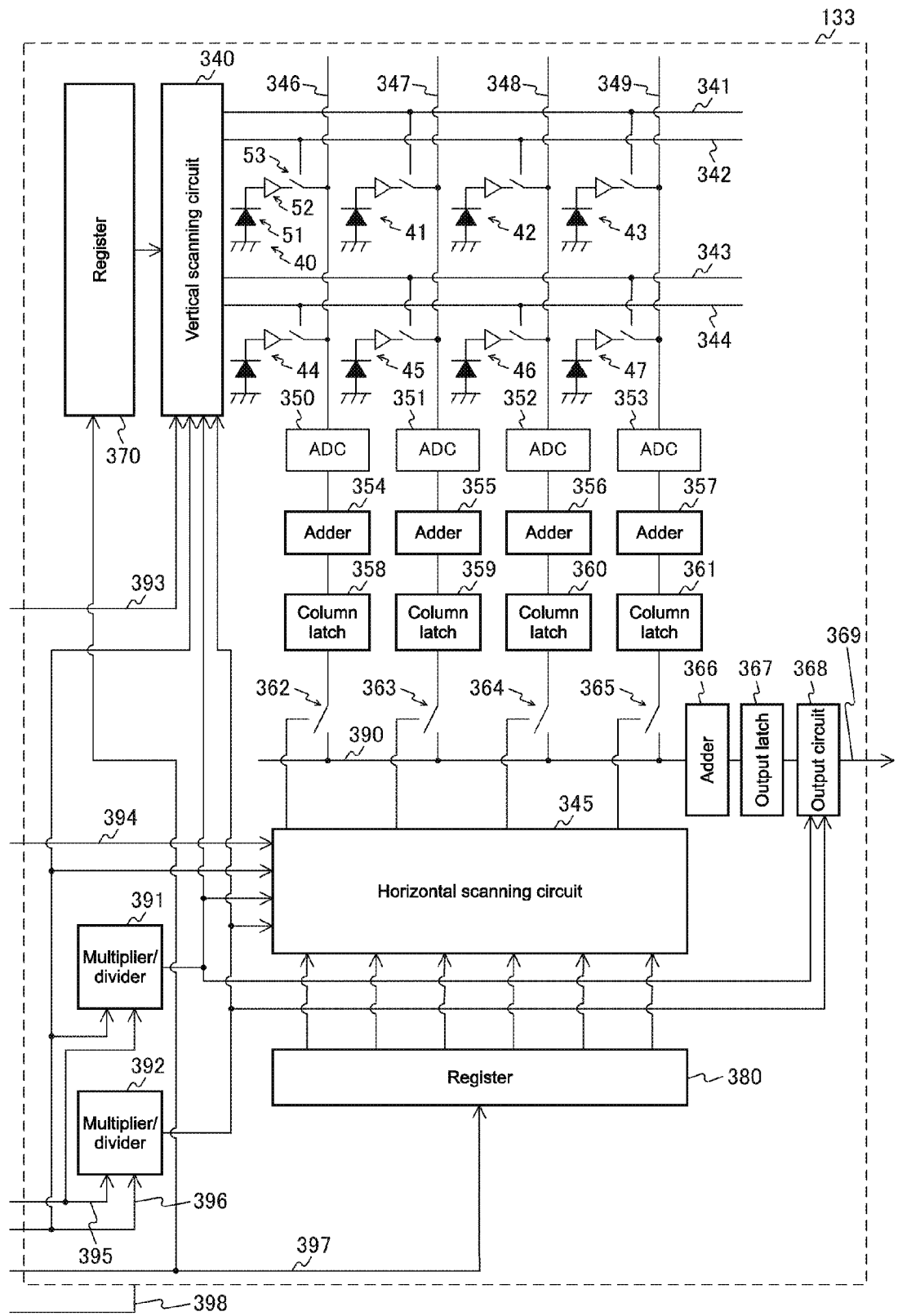
FIG. 10 is a diagram showing an internal configuration example of an imaging device in the first embodiment of the present disclosure.

FIG. 10 is a diagram showing an internal configuration example of the imaging device in the first embodiment of the present disclosure. Internal configurations of the imaging devices 133 and 134 are almost the same. Therefore, in FIG. 10, only the imaging device 133 is shown and illustration and description of the other imaging device are omitted. In FIG. 10, a CMOS imaging device is exemplified as the imaging device 133.

The imaging device 133 includes pixels 40 to 47, a vertical scanning circuit 340, and a horizontal scanning circuit 345. The imaging device 133 further includes ADCs (analog/digital (A/D) converters) 350 to 353, adders 354 to 357 and 366, and column latches 358 to 361. The imaging device 133 further includes switches 362 to 365, an output latch 367, an output circuit 368, registers 370 and 380, and multipliers/dividers 391 and 392. Note that, in general, an array of imaging devices in a longitudinal direction will be referred to as a column and an array of imaging devices in a lateral direction will be referred to as a row. Therefore, in the following description, the names of the "column" and "row" are used as appropriate. In this example, in the imaging device 133, a part of pixels (pixels 40 to 47) and units related to the pixels are representatively described. Illustration and description of other components are omitted.

In the imaging device 133, vertical control lines 341 to 344 are wired in a row direction and every other pixels present on the same line are connected to the same vertical control line. Data readout lines 346 to 349 are wired in a column direction and pixels present on the same line share one readout line.

The vertical scanning circuit 340 turns on and off switches between the pixels 40 to 47 and the data readout lines 346 to 349 through the vertical control lines 341 to 344 wired in the row direction. Specifically, in the pixels in the row direction, every other pixels among the pixels present on the same line in the row direction are turned on and off in common by the single vertical control line. Image data of the pixels 40 to 47 are output to the data readout lines 346 to 349 through switches between the pixels and the data readout lines corresponding to the pixels.

The horizontal scanning circuit 345 turns on and off the switches 362 to 365 between the column latches 358 to 361 and an output data line 369. It is possible to read out signals of all the pixels in a time division manner while sequentially selecting the pixels according to selection of ON and OFF of the switches by the vertical scanning circuit 340 and ON and OFF of the switches 362 to 365 by the horizontal scanning circuit 345. The output data line 369 is an output data line for outputting output results of the columns from the imaging devices 133.

In the imaging device 133, the pixels 40 to 47 are arranged in a two-dimensional square lattice shape. Note that the configurations of the pixels 40 to 47 are the same, and hence the pixel 40 is described as an example. The pixel 40 includes a photodiode 51 as a light receiving unit, an amplifier 52, and a switch 53. The photodiode 51 converts light irradiated on the pixel into charges corresponding to the amount of light. The amplifier 52 is an amplifier that amplifies a signal of the charges converted by the photodiode 51. The switch 53 is a switch that controls charge transfer of the pixel 40 according to ON and OFF of a vertical control line 342.

The columns include the ADCs 350 to 353, the adders 354 to 357, and the column latches 358 to 361. The ADC 350, the adder 354, and the column latch 358 connected to the data readout line 346 are described below as examples.

The ADC 350 is an AD converter that converts image data from the pixels as analog values into digital data (digital values).

The adder 354 adds, every time image data is converted into digital data by the ADC 350, the new digital data after the conversion to digital data stored in the column latch 358.

The column latch 358 is a column latch that sequentially stores the digital data converted by the ADC 350. The column latch is a name indicating a data storing circuit that stores digital data after AD conversion. As the data storing circuit, besides a latch including a linear circuit, circuits that can store digital data such as a flip-flop including a synchronization circuit can be used.

For example, image data output from the pixel 40 is output to an output data line 390 through the switch 362 connected to the data readout line 346 after passing through the ADC 350, the adder 354, and the column latch 358. In the first embodiment of the present disclosure, like the data readout lines of the columns, the output data line 390 includes the adder 366 and the output latch 367 and performs addition and storage of image data. Image data stored in the output latch 367 is output to the output data line 369 through the output circuit 368. Note that image data from the output data line 369 is output to the above-mentioned data line L1.

The multipliers/dividers 391 and 392 perform, on the basis of the control from the DSP 200, multiplication of a frequency of an input clock and dividing of the frequency of the input clock. The multipliers/dividers 391 and 392 supply a generated clock to the vertical scanning circuit 340, the horizontal scanning circuit 345, and the output circuit 368.

The signal line 393 is a vertical synchronization signal line for supplying a vertical synchronization signal from the DSP 200. The signal line 394 is a horizontal synchronization signal line for supplying a horizontal synchronization signal from the DSP 200.

The signal line 395 is a clock signal line for supplying a clock signal from the DSP 200. The signal line 396 is a signal line for controlling ON and OFF of an imaging operation from the DSP 200 and a signal line for controlling pixel thinning-out. The signal line 397 is a bi-directional communication line between the imaging device 133 and the DSP 200. The signal line 398 is a power supply line.

Note that the registers 370 and 380 are registers in which setting values concerning an imaging operation are stored.

[Functional Configuration Example of Information Processing Apparatus]

Figure 11:
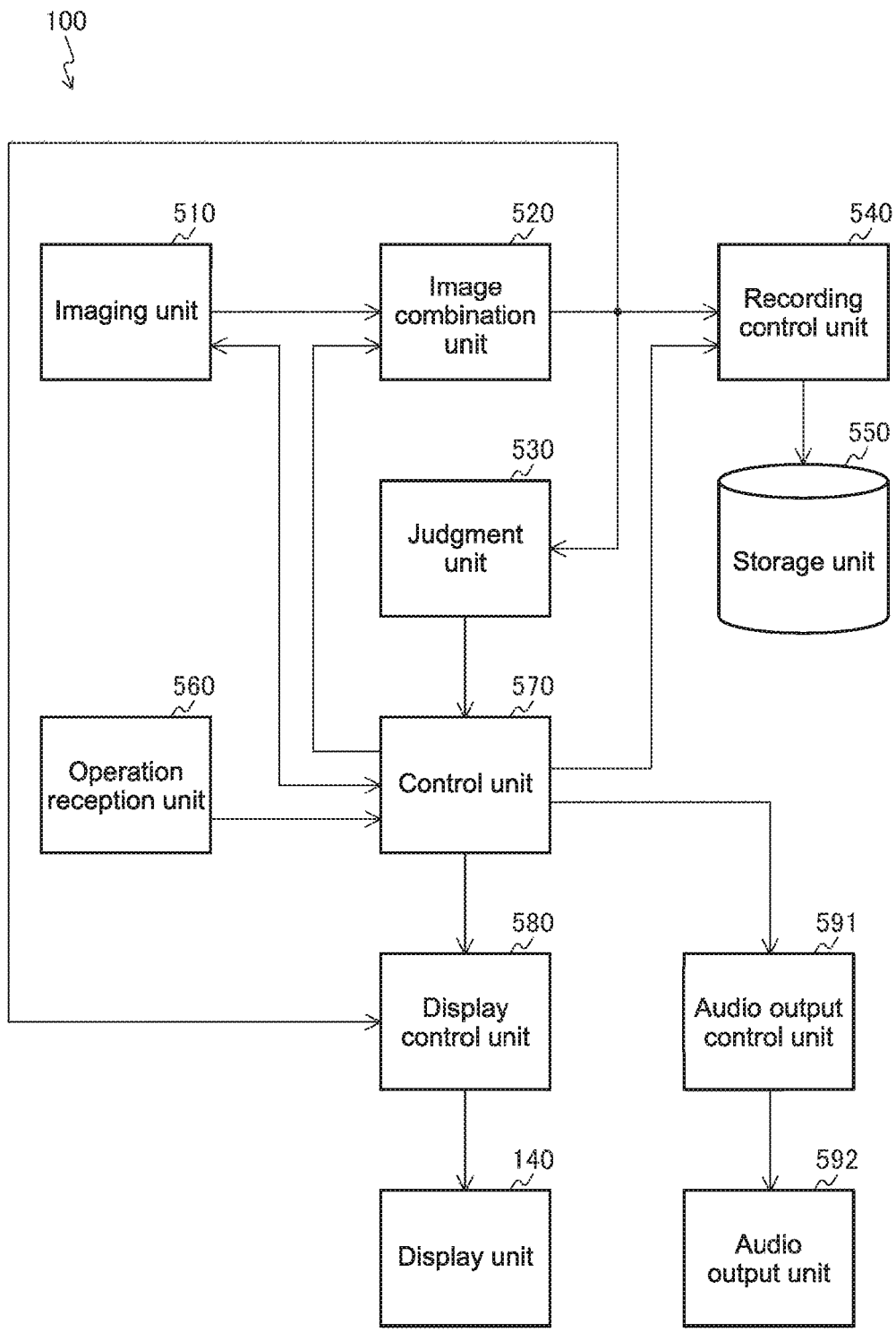
FIG. 11 is a block diagram showing a functional configuration example of the information processing apparatus 100 in the first embodiment of the present disclosure.

FIG. 11 is a block diagram showing a functional configuration example of the information processing apparatus 100 in the first embodiment of the present disclosure.

The information processing apparatus 100 includes the display unit 140, an imaging unit 510, an image combination unit 520, a judgment unit 530, a recording control unit 540, a storage unit 550, an operation reception unit 560, a control unit 570, a display control unit 580, an audio output control unit 591, and an audio output unit 592.

The imaging unit 510 images a subject and generates image data items (image data items of left image and right image for generating panoramic image). The imaging unit 510 supplies the generated image data items to the image combination unit 520 and the control unit 570. For example, the image data item of the left image is generated by the use of the imaging device 133 and the image data item of the right image is generated by the use of the imaging device 134. Note that the imaging unit 510 corresponds to, for example, the imaging unit 130 and the DSP 200 shown in FIG. 6.

The image combination unit 520 combines the image data generated by the imaging unit 510 (image data items of left image and right image) with each other with end portions of the images in the longitudinal direction overlapping with each other to generate a combined image (panoramic image). Then, the image combination unit 520 supplies the generated combined image (image data) to the judgment unit 530, the recording control unit 540, and the display control unit 580. The end portions of the images in the longitudinal direction are portions corresponding to, for example, the overlap region H2 shown in Part "a" of FIG. 15.

Further, as described above, the image combination unit 520 performs trapezoidal distortion correction processing when the combined image (panoramic image) is generated. Further, as described above, the image combination unit 520 generates the combined image (panoramic image) by the image combination processing based on the angle of convergence, the image combination processing using the pattern matching, and the like.

Further, based on a subject distance of a subject closest to the information processing apparatus 100 among subjects included in the overlap region of the combined image (panoramic image), the image combination unit 520 corrects a displacement of the images (displacement of images in orthogonal direction almost orthogonal to specific direction). The overlap region of the combined image (panoramic image) is a portion corresponding to, for example, the overlap region H2 shown in Part "a" of FIG. 15. Further, a method of correcting a displacement will be described in detail with reference to FIGS. 12 and 13. Note that the image combination unit 520 corresponds to, for example, the DSP 200 (e.g., image-signal processing unit 220) shown in FIG. 6.

Based on the subject distance of the subject included in the combined image (panoramic image) generated by the image combination unit 520, the judgment unit 530 performs a judgment as to an arrangement of a subject included in the combined image (panoramic image). The judgment as to the arrangement of the subject included in the combined image (panoramic image) is, for example, a judgment as to whether or not to change the arrangement of the subject included in the combined image (panoramic image). Note that this judgment method will be described in detail with reference to FIGS. 14 to 23 and 27. Then, the judgment unit 530 outputs a judgment result thereof to the control unit 570.

Specifically, based on the subject distance of the subject included in the combined image (panoramic image) and the subject distance of the subject included in the overlap region of the combined image (panoramic image), the judgment unit 530 performs a judgment as to the arrangement of the subject included in the combined image. For example, the judgment unit 530 calculates the subject distance (first distance) of the subject closest to the information processing apparatus 100 among the subjects included in the combined image (panoramic image). Alternatively, the judgment unit 530 calculates the subject distance (second distance) of the subject closest to the information processing apparatus 100 among the subjects included in the overlap region (e.g., overlap region H2 shown in Part "a" of FIG. 15) of the combined image (panoramic image). Note that a method of calculating the subject distance will be described in detail with respect to FIGS. 12 and 13. Then, the judgment unit 530 performs a judgment based on the second distance. Specifically, if the second distance is smaller than a threshold, the judgment unit 530 judges that the arrangement of the subject included in the combined image (panoramic image) should be changed. That is, if the subject distance of the subject closest to the information processing apparatus 100 among the subjects included in the overlap region of the combined image is smaller than the threshold, the judgment unit 530 is capable of judging that the arrangement of the subject included in that combined image should be changed. Alternatively, the judgment unit 530 may perform the judgment based on the first distance. Note that the judgment unit 530 corresponds to, for example, the DSP 200 (e.g., CPU 202 and AF control unit 281) shown in FIG. 6.

The recording control unit 540 records, based on the control of the control unit 570, the combined image (image data) generated by the imaging unit 510 and generated by the image combination unit 520 in the storage unit 550 as an image file. Note that the recording control unit 540 corresponds to, for example, the DSP 200 shown in FIG. 6.

The storage unit 550 stores the combined image (image data) generated by the imaging unit 510 and generated by the image combination unit 520 as an image file (image content). Note that the storage unit 550 corresponds to, for example, the recording medium 180 shown in FIG. 6.

The operation reception unit 560 is an operation reception unit that receives an operation input by the user, and outputs content of the received operation input to the control unit 570. Note that the operation reception unit 560 corresponds to, for example, each operation member (determination key 111 and the like) shown in FIGS. 1 and 6.

The control unit 570 performs a control for recording, in the storage unit 550, the combined image (image data) generated by the imaging unit 510 and generated by the image combination unit 520 according to the user operation received by the operation reception unit 560.

If the judgment unit 530 judges that the arrangement of the subject included in the combined image (image data) generated by the image combination unit 520 should be changed, the control unit 570 performs a control for notifying the fact. For example, the control unit 570 is capable of performing a notification by performing a display on the display unit 140 that indicates that the arrangement of the subject included in the combined image should be changed. In this case, for example, the control unit 570 performs a notification by displaying display information (warning information) for identifying the subject that should be changed in arrangement. The display information (warning information) is, for example, display information 581 to 584 and message information 585 shown in FIGS. 24 to 26.

The control unit 570 performs a notification by causing the audio output unit 592 to output audio warning information (e.g., message 586 shown in Part "b" of FIG. 26) for indicating that the arrangement of the subject included in the combined image should be changed.

Figure 24:
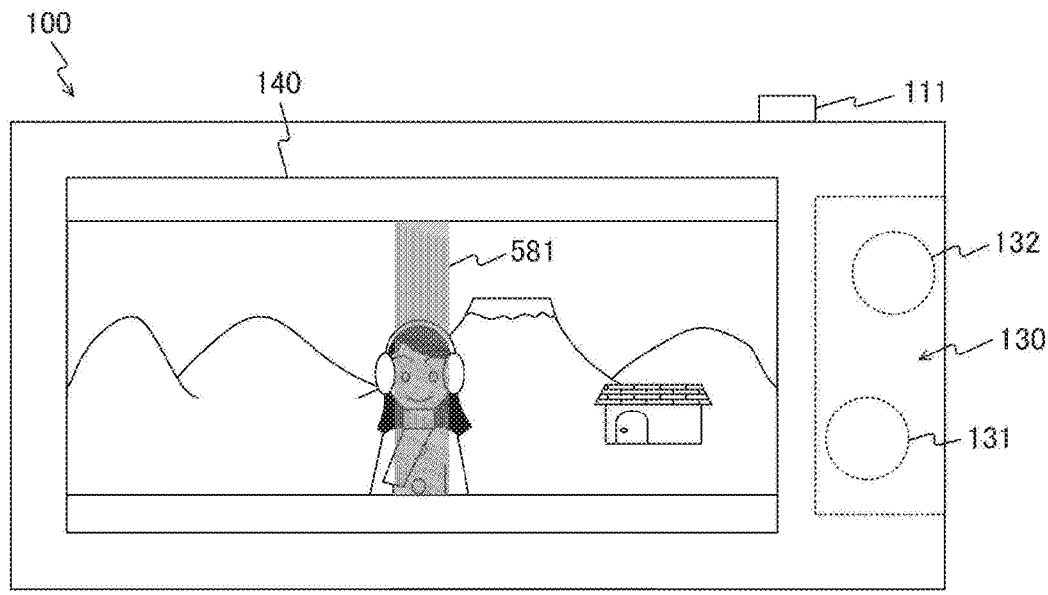
FIG. 24 is a diagram showing an example of a notification to a user by the information processing apparatus 100 in the first embodiment of the present disclosure.
Figure 24:
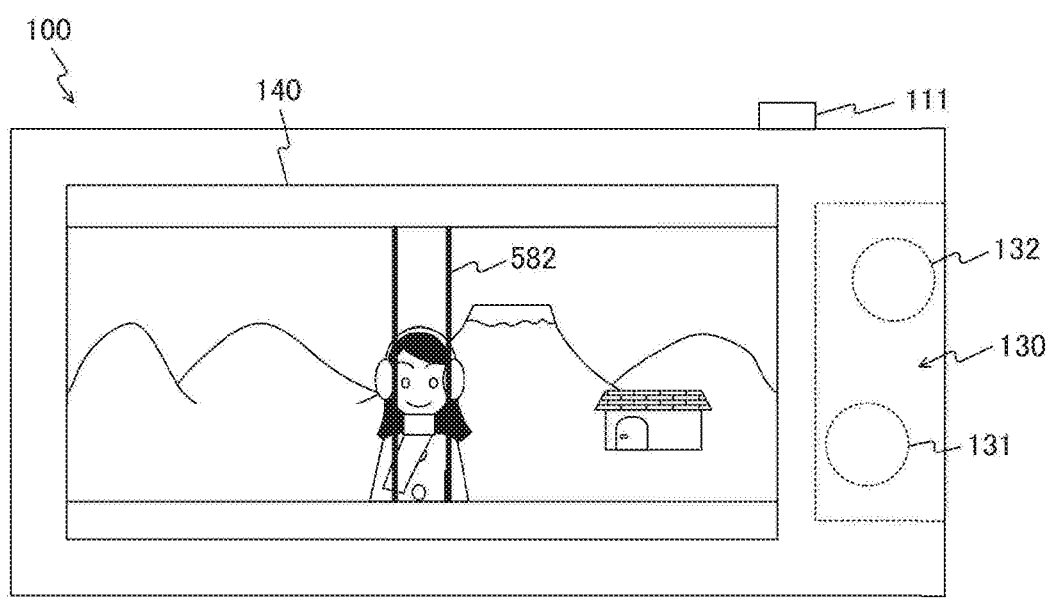
Figure 25:
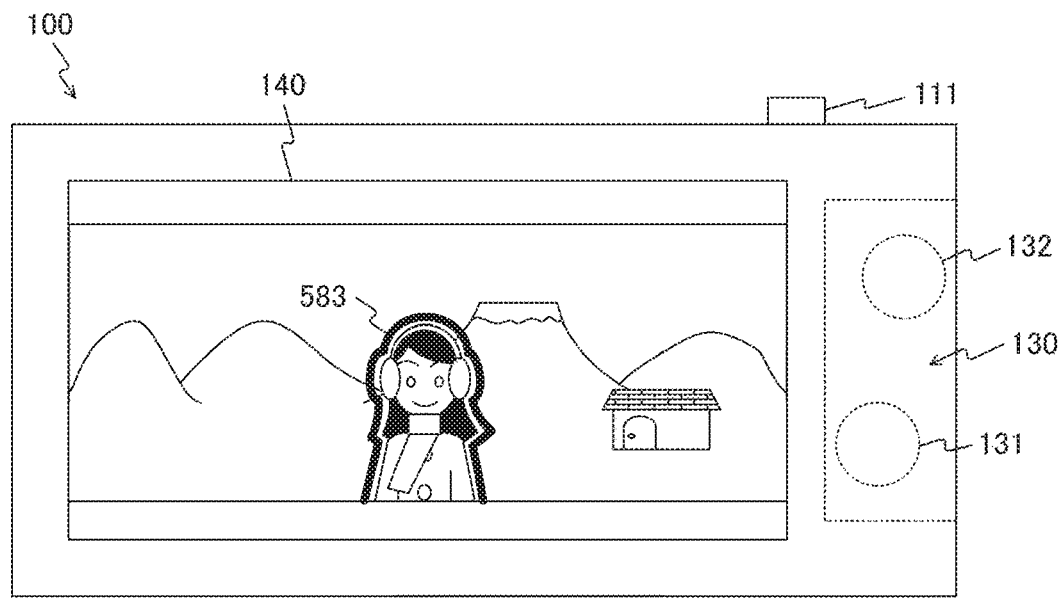
FIG. 25 is a diagram showing an example of a notification to the user by the information processing apparatus 100 in the first embodiment of the present disclosure.
Figure 25:
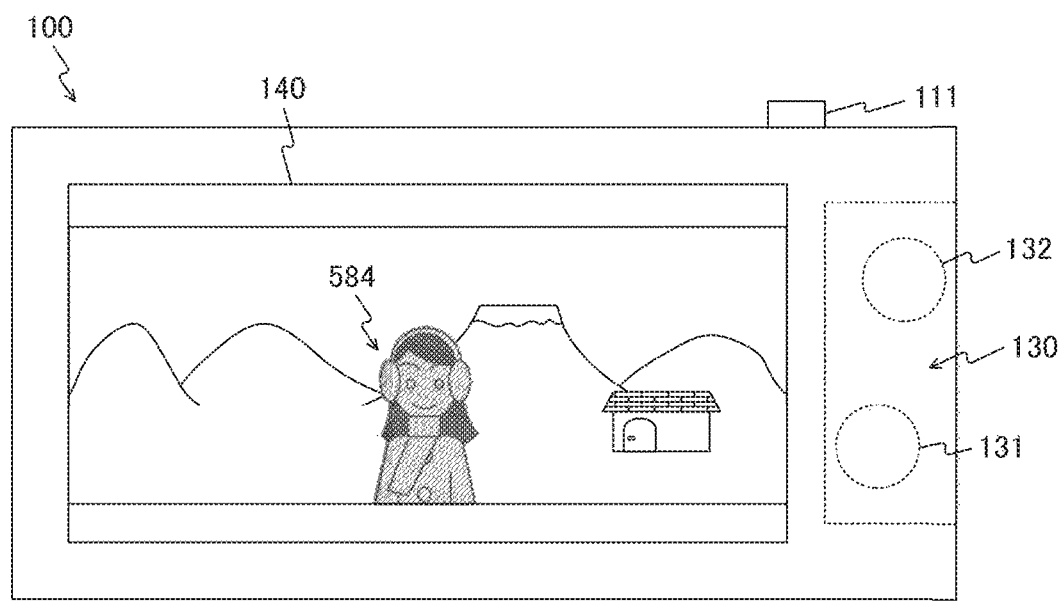
Figure 26:
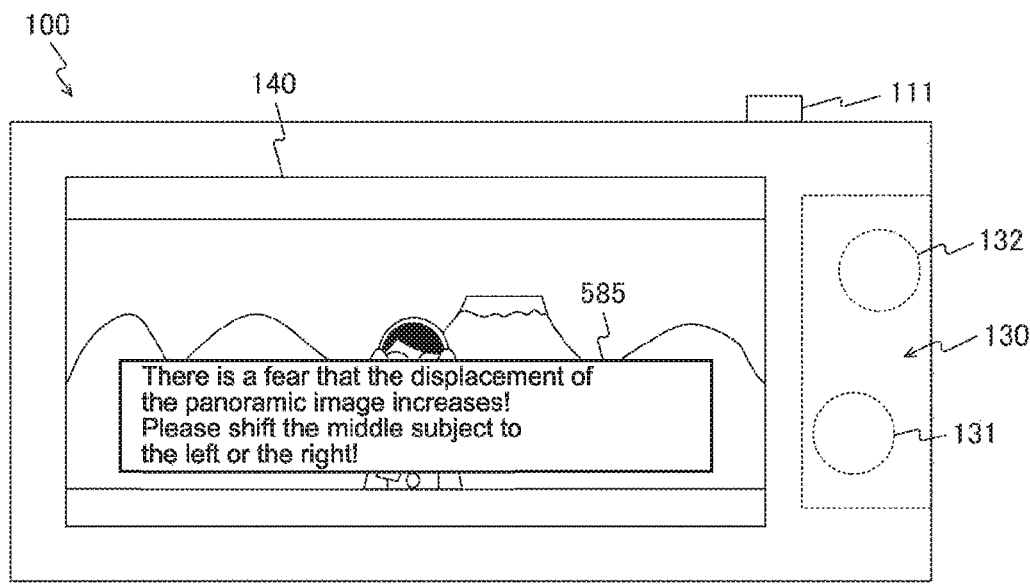
FIG. 26 is a diagram showing an example of a notification to the user by the information processing apparatus 100 in the first embodiment of the present disclosure.
Figure 26:
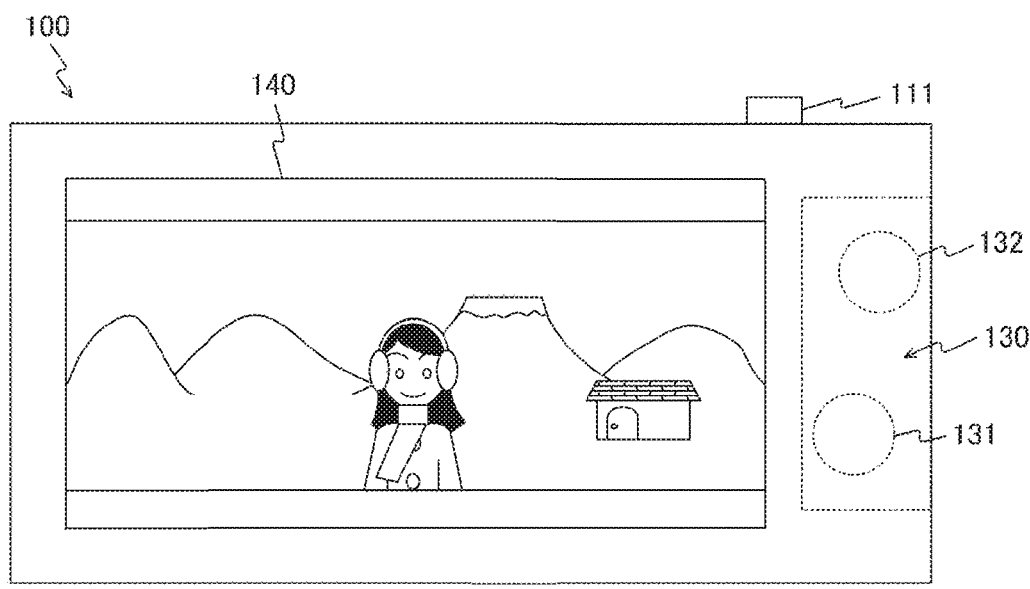

The display control unit 580 displays the combined image (image data) generated by the image combination unit 520 on the display unit 140 as a live view image. The live view image is an image displayed on the display unit 140 (combined image (image data) generated by image combination unit 520) before a recording instruction operation of a still image is performed in a state in which a still-image recording mode is set. Such display examples are shown in FIGS. 24 to 26. In a live view display of displaying the live view image, in order for the user to check the subject before a recording operation of the image (i.e., before press of shutter button), the image input in the imaging device at that point of time is continuously displayed.

Further, based on the control of the control unit 570, the display control unit 580 displays the display information (e.g., display information 581 to 584 and message information 585 shown in FIGS. 24 to 26) on the display unit 140. Note that the display control unit 580 corresponds to, for example, the DSP 200 shown in FIG. 6.

The display unit 140 displays the images based on the control of the display control unit 580. Note that the display unit 140 corresponds to, for example, the display unit 140 shown in FIG. 6.

Based on the control of the control unit 570, the audio output control unit 591 outputs each kind of audio from the audio output unit 592. For example, based on the control of the control unit 570, the audio output control unit 591 outputs the warning information from the audio output unit 592. The warning information is information for indicating that the arrangement of the subject included in the combined image should be changed and is, for example, the message 586 shown in Part "b" of FIG. 26.

Based on the control of the audio output control unit 591, the audio output unit 592 outputs each kind of audio. Note that the audio output unit 592 corresponds to, for example, the speaker 17 shown in FIG. 1.

[Correction Example of Displacement Caused Between Images]

When a plurality of images generated by the plurality of imaging systems are combined with each other in the long-side direction to generate a panoramic image, it is favorable that the plurality of imaging systems are arranged at the same position in the orthogonal direction orthogonal to the long-side direction of the panoramic image. For example, if the information processing apparatus 100 is used in the horizontal state, it is favorable that the plurality of imaging systems are arranged at the same position in a short-side direction of the casing and the display unit 140 (direction perpendicular to ground where user stands).

However, as shown in FIG. 1, in the first embodiment of the present disclosure, the plurality of imaging systems are arranged at different positions in the short-side direction. Therefore, when a plurality of images generated by the plurality of imaging systems are combined with each other in the long-side direction to generate a panoramic image, it is conceivable that, with some subjects as imaging targets, the left image and the right image forming the panoramic image are displaced in the vertical direction.

In view of this, in the first embodiment of the present disclosure, an example in which a panoramic image is suitably generated considering a displacement of an image in the vertical direction between the left image and the right image forming the panoramic image is shown.

[Example of Imaging Operation and Imaging Area]

Figure 12:
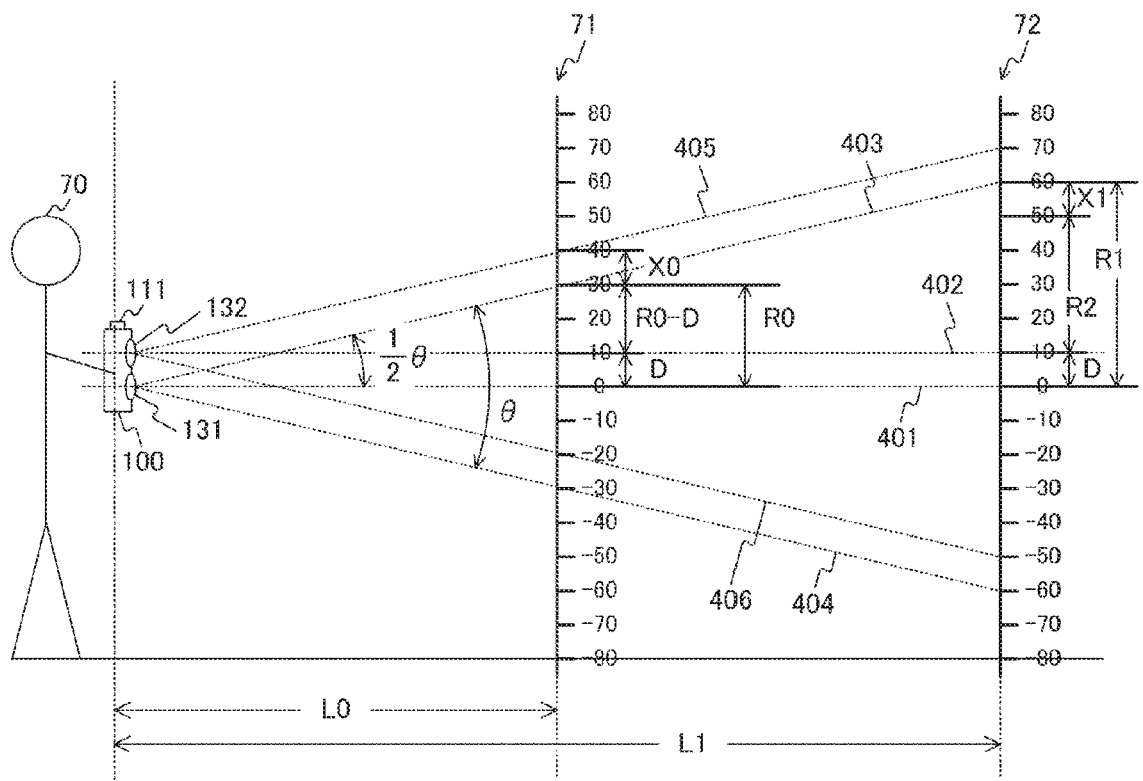
FIG. 12 is a diagram schematically showing an example of an imaging operation performed by the information processing apparatus 100 in the first embodiment of the present disclosure and an imaging area during the imaging operation.
Figure 13:
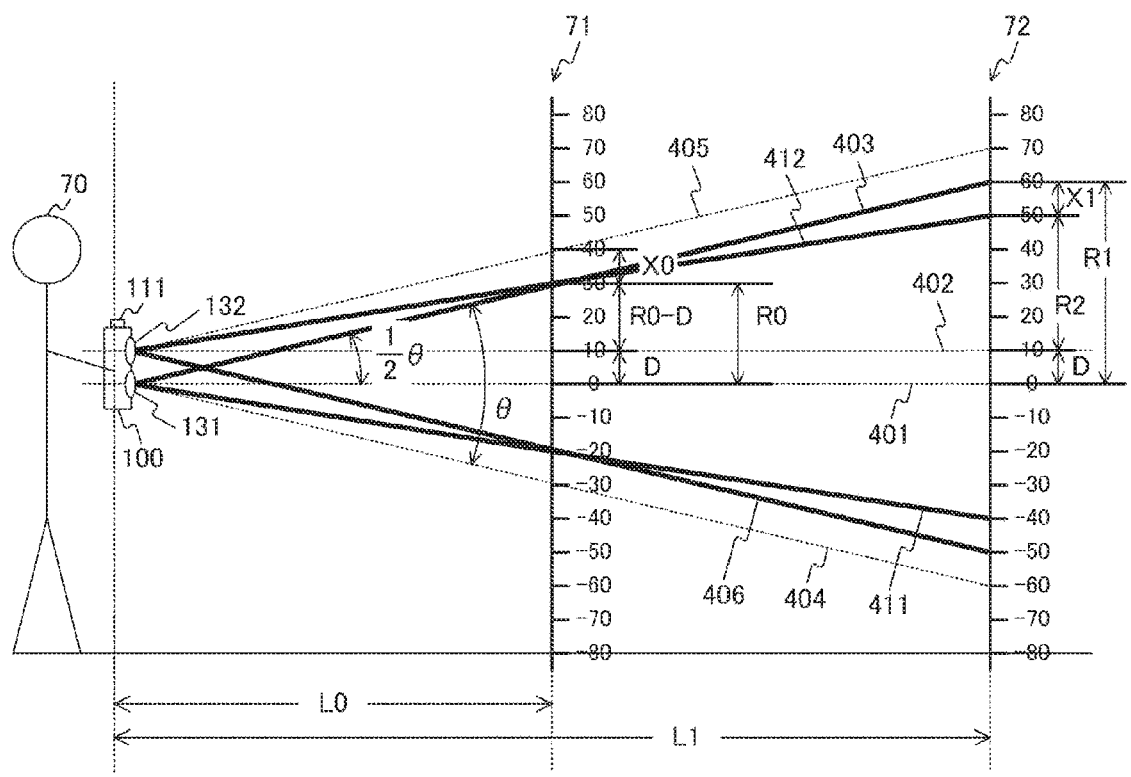
FIG. 13 is a diagram schematically showing the example of the imaging operation performed by the information processing apparatus 100 in the first embodiment of the present disclosure and the imaging area during the imaging operation.

FIGS. 12 and 13 are diagrams schematically showing an example of an imaging operation performed by the information processing apparatus 100 in the first embodiment of the present disclosure and an imaging area during the imaging operation. Note that FIGS. 12 and 13 show an example of a state in which a photographer 70 performs the imaging operation with the information processing apparatus 100 being in the horizontal state as viewed from a side thereof.

It is assumed that an arrangement in which the first imaging system 191 (including optical system 131 shown in FIG. 12) sets a left-hand side of the panoramic image as an imaging target and the second imaging system 192 (including optical system 132 shown in FIG. 12) sets a right-hand side of the panoramic image as an imaging target is performed. That is, in FIG. 12, the first imaging system 191 serves a lower imaging system and the second imaging system 192 serves an upper imaging system.

Further, in FIG. 12, an optical axis of the lower imaging system (first imaging system 191) is denoted by 401 and an optical axis of the upper imaging system (second imaging system 192) is denoted by 402. Note that, for the sake of description, it is assumed that the position of the optical axis in the imaging system coincides with a center of a lens of the imaging system and coincides with a center of an imaging region of the imaging device of the imaging system. Further, at the position at which the subject is present, a surface orthogonal to the two optical axes 401 and 402 may be simply referred to as a "subject surface" and a region in which an image is captured by the imaging system on the subject surface may be simply referred to as an "imaging area."

For the sake of description, hereinafter, unless specifically noted otherwise, the short-side direction of the casing and the display unit 140 (direction perpendicular to ground where user stands or direction parallel to gravitational force) when the information processing apparatus 100 is used in the horizontal state may be simply referred to as a "vertical direction." Similarly, the long-side direction of the casing and display unit 140 (direction horizontal to ground where user stands or direction perpendicular to gravitational force) may be simply referred to as the "horizontal direction." In addition, a surface including the normal 195 shown in Part "a" of FIG. 1, which is parallel to the vertical direction (direction parallel to direction of gravitational force), may be simply referred to as a "vertical surface." In addition, a line segment parallel to the optical axes 401 and 402 shown in FIG. 12, which is a line segment at the same distance from these two optical axes 401 and 402 may be simply referred to as an "optical axis middle line." In addition, a surface that is orthogonal to the vertical surface and includes the optical axis middle line may be simply referred to as a "horizontal surface."

Further, in FIG. 12, in the information processing apparatus 100, a vertical distance between the optical axis 401 of the first imaging system 191 and the optical axis 402 of the second imaging system 192 is denoted by D. Further, in FIG. 12, outer edges of an imaging area in the vertical direction of the lower imaging system (first imaging system 191) are shown by dotted lines 403 and 404 and outer edges of an imaging area in the vertical direction of the upper imaging system (second imaging system 192) are shown by dotted lines 405 and 406. Further, in FIG. 12, for the sake of description, two scales (virtual scales) 71 and 72 for measuring the imaging area are arranged at positions spaced apart from the information processing apparatus 100 by distances L0 and L1, respectively. Note that it is assumed that the distance L1 is twice as long as the distance L0. Further, it is assumed that intervals of the two scales 71 and 72 are equal and the height at which the two scales 71 and 72 are provided is also equal with the photographer 70 being a reference. Further, the positions of the two scales 71 and 72 that correspond to the optical axis 401 of the lower imaging system (first imaging system 191) are set to "0." Values of the scales 71 and 72 that correspond to a vertical distance D between the optical axis 401 of the first imaging system 191 and the optical axis 402 of the second imaging system 192 are set to "10." In this case, the positions of the two scales 71 and 72 that correspond to the optical axis 402 of the upper imaging system (second imaging system 192) are set to "10."

As shown in FIG. 12, regarding a subject positioned at the distance L0, an area from −30 to 30 of the scale 71 can be imaged by the lower imaging system (first imaging system 191). Further, regarding a subject positioned at the distance L1, an area from −60 to 60 of the scale 72 can be imaged by the lower imaging system (first imaging system 191).

Similarly, regarding a subject positioned at the distance L0, an area from −20 to 40 of the scale 71 can be imaged by the upper imaging system (second imaging system 192). Further, regarding a subject positioned at the distance L1, an area from −50 to 70 of the scale 72 can be imaged by the upper imaging system (second imaging system 192). In this manner, the imaging area (imaging area in vertical direction) of the subject positioned at the distance L1 is twice as large as the imaging area (imaging area in vertical direction) of the subject positioned at the distance L0.

Now, a case where an image generated by the lower imaging system (first imaging system 191) and an image generated by the upper imaging system (second imaging system 192) are combined with each other to generate a panoramic image is assumed. For example, an image generated by the first imaging system 191 can be disposed on the left-hand side of the panoramic image and an image generated by the second imaging system 192 can be disposed on the right-hand side of the panoramic image and these images can be combined with each other as they are to generate a panoramic image. In this case, the left image and the right image of the panoramic image are displaced in the vertical direction. Therefore, it is important to suitably correct the displacement caused between the left image and the right image of the panoramic image.

An example in which the amount of displacement (displacement amount) caused between the left image and the right image of the panoramic image is quantitatively determined is shown.

For example, it is assumed that an angle corresponding to the imaging area in the vertical direction of the lower imaging system (first imaging system 191) is denoted by θ. Further, in the subject surface positioned at the distance L0, a length on the scale 71, which corresponds to a portion from the optical axis 401 of the lower imaging system (first imaging system 191) to the outer edge 403 as an upper limit of the imaging area is denoted by R0. In this case, the following Expression 1 is established.

$$R0 = L0 * \tan\{(\tfrac{1}{2}) * \theta\} \quad \text{Expression 1}$$

When the displacement amount of the imaging area at the distance L0 is denoted by X0, a ratio Z0 of the displacement amount of the imaging area at the distance L0 can be determined by the following Expression 2.

$$Z0 = X0/R0 \quad \text{Expression 2}$$

In the information processing apparatus 100, the vertical distance D between the optical axis 401 of the first imaging system 191 and the optical axis 402 of the second imaging system 192 is equal to the displacement amount X0 of the imaging area at the distance L0. Therefore, provided that X0=D is established, the ratio Z0 of the displacement amount can be expressed by the following Expression 3.

$$Z0 = (D/L0) * [1/\tan\{(\tfrac{1}{2}) * \theta\}] \quad \text{Expression 3}$$

Referring to this Expression 3, if D and θ are fixed values, the ratio Z0 of the displacement amount of the imaging area at the distance L0 (provided that L0 is variable value) depends on the distance L0. Specifically, the ratio Z0 of the displacement amount increases as the distance L0 decreases and the ratio Z0 of the displacement amount decreases as the distance L0 increases. Further, as the distance L0 increases, it gradually approaches a minimum value that the ratio Z0 of the displacement amount can take. When distance L0=infinity is established, Z0 takes a minimum value (=0).

For example, in the case of observing a panoramic image with a left region and a right region of the panoramic image being displaced in the vertical direction, there is a fear that the user who observes the panoramic image is provided with a feeling of strangeness, which is considered as being unfavorable.

In view of this, with the subject present at the distance L0 being a reference, a displacement between the left and right images in the vertical direction is corrected. For example, a vertical region of the left image generated by the lower imaging system (first imaging system 191) and a vertical region of the right image generated by the upper imaging system (second imaging system 192) are set to be the same with the subject present at the distance L0 being a reference.

Specifically, with respect to the left image generated by the lower imaging system (first imaging system 191), an upper limit of an image region used for combining the panoramic image is set to be equal to or smaller than an upper limit of the image generated by the lower imaging system (first imaging system 191) at the distance L0. Further, a lower limit of the image region used for combining the panoramic image is set to be equal to or larger than a lower limit of the image generated by the upper imaging system (second imaging system 192) at the distance L0.

Note that, for the sake of description, hereinafter, using the limited image region for combining the panoramic image as well as displaying or recording the limited image region as a part of the panoramic image will be simply referred to as "using for combining the panoramic image."

In FIG. 13, outer edges of the imaging area that correspond to an upper limit and a lower limit of the left image generated by the lower imaging system (first imaging system 191) are shown by heavy lines 403 and 411. Note that the heavy line 403 is identical to the dotted line 403 indicating the outer edge of the imaging area in the vertical direction of the lower imaging system (first imaging system 191) shown in FIG. 12.

Further, with respect to the right image generated by the upper imaging system (second imaging system 192), an upper limit of an image region used for combining the panoramic image is set to be equal to or smaller than an upper limit of the image generated by the lower imaging system (first imaging system 191) at the distance L0. Further, a lower limit of the image region used for combining the panoramic image is set to be equal to or larger than a lower limit of the image generated by the upper imaging system (second imaging system 192) at the distance L0.

In FIG. 13, outer edges of an imaging area that correspond to the upper limit and the lower limit of the right image generated by the upper imaging system (second imaging system 192) are denoted by heavy lines 412 and 406. Note that the heavy line 406 is identical to the dotted line 406 indicating the outer edge of the imaging area in the vertical direction of the upper imaging system (second imaging system 192).

In this manner, at the distance L0, with respect to the left image generated by the lower imaging system (first imaging system 191), it is necessary to set the lower limit of the image region used for combining the panoramic image to be equal to or larger than the lower limit of the image generated by the upper imaging system (second imaging system 192).

In view of this, upon a focusing operation (upon so-called automatic focusing operation) of the imaging operation, among the subjects included in the overlap region (e.g., overlap region H2 shown in Part "a" of FIG. 15), a distance from the information processing apparatus 100 to the subject (subject distance) closest to the information processing apparatus 100 is determined. Then, based on the subject distance as a reference, areas of the left image and the right image forming the panoramic image are changed.

A method of obtaining information on distances from a camera (information processing apparatus 100) to subjects and distribution thereof will be described. As a method of obtaining this information, it is possible to use a method of analyzing the distribution of the distances from the camera to the subjects in automatic focusing processing of a digital still camera, for example. In the automatic focusing processing, as an example, while a focal point of the camera is continuously changed from a close side to a far side to/from the camera, an image is captured at each focal distance. Spatial frequencies of images included in those captured images are analyzed. Regarding an image captured in a state in which the focal distance of the camera coincides with the distance from the camera to the subject, contours of subjects in the image are clear. In other words, a number of images having a high spatial frequency are present in the image. On the other hand, regarding an image captured in a state in which the focal distance of the camera does not coincide with the distance from the camera to the subject, as a difference between the focal distance and the distance to the subject increases, contours of subjects in the image become unclear. In other words, few images having a high spatial frequency are present in the image. If a plurality of images are captured while changing the focal distance of the camera and the amount of components having a high spatial frequency in the image is evaluated as described above, it is possible to obtain information on the distances from the camera to the subjects and the distribution thereof.

More specifically, for example, a plurality of images captured while changing the focal distance are passed through a high pass filter (HPF) that extracts components in a high-frequency band. Then, by determining an evaluation value (AF evaluation value (e.g., number of pixel data items)) with respect to each image that has passed through the filter, the information on the distances from the camera to the subjects and the distribution thereof can be obtained.

Further, every time one AF process is performed, it is possible to grasp a distance (subject distance) from a lens to a subject. That is, when the subject distance is denoted by a, a distance from the lens to the imaging device is denoted by b, and the focal distance of the lens is denoted by f, the following Expression 4 is established.

$$(1/a)+(1/b)=1/f \qquad \text{Expression 4}$$

By this Expression 4, the subject distance $a=1/((1/f)-(1/b))$ can be determined. Further, a plurality of distance-measuring areas may be arranged in one image in advance and the subject distance of each distance-measuring area may be determined every time one AF process is performed.

Using a value of a distance obtained by such a method (e.g., distance L0 to subject closest to information processing apparatus 100 (hereinafter, referred to as closest subject), D and θ in Expression 3 are set to be fixed values and the ratio Z0 of the displacement amount of the imaging area at the subject distance L0 is calculated using Expression 3. Then, in the left image generated by the lower imaging system (first imaging system 191), an image of a region corresponding to the ratio Z0 of the displacement amount (image on lower limit side in vertical direction (image of lower region with respect to heavy line 411 of FIG. 13)) is set not to be used for combining the panoramic image. That is, combining the panoramic image is performed using an image excluding the region corresponding to the ratio Z0 of the displacement amount (region between heavy lines 403 and 411 of FIG. 13).

Similarly, it is necessary to adjust also the right image generated by the upper imaging system (second imaging system 192) at the distance L0. That is, with respect to the right image, it is necessary to set the upper limit of the image region used for combining the panoramic image to be equal to or smaller than the upper limit (heavy line 412 of FIG. 13) of the image generated by the lower imaging system (first imaging system 191).

In view of this, using a value of the distance to the subject (subject distance) L0 closest to the information processing apparatus 100 among the subjects included in the overlap region, D and θ of Expression 3 are set to be fixed values. The ratio Z9 of the displacement amount of the imaging area at the subject distance L0 is calculated using Expression 3. Then, in the right image generated by the upper imaging system (second imaging system 192), an image of a region corresponding to the ratio Z0 of the displacement amount (image on upper limit side in vertical direction (image of upper region with respect to heavy line 412 of FIG. 13)) is set not to be used for combining the panoramic image. That is, combining the panoramic image is performed using an image of a region excluding a portion corresponding to the ratio Z0 of the displacement amount (region between heavy lines 412 and 406 of FIG. 13).

In this manner, only partial images of the left image and the right image as combination targets of the panoramic image are used such that images corresponding to the subject positioned at the distance L0 coincide with each other in the vertical direction. Specifically, for the left image generated by the lower imaging system (first imaging system 191), a image region in an area from −20 to 30 of the scale 71 provided at the distance L0 is used. Further, for the right image generated by the upper imaging system (second imaging system 192), an image region in the area from −20 to 30 of the scale provided at the distance L0 is used. In this manner, the panoramic image can be generated by performing an image combination using the image regions in the area from −20 to 30 of the scale provided at the distance L0 with respect to both of the left image and the right image.

In this manner, using Expression 3, the ratio Z0 of the displacement amount of the image at the distance L0 is determined based on a value of the distance L0. Based on a value of the ratio Z0 of the displacement amount, portions of both of the left image and the right image, which correspond to the imaging area from −20 to 30 of the scale 71, are combined. With this, a panoramic image in which an image corresponding to the subject positioned at the distance L0 is not displaced in the vertical direction can be generated. Thus, a panoramic image favorable for observation can be generated.

As described above, a panoramic image in which images with respect to the subject positioned at the distance L0 are not displaced in the upper and lower directions between the left and right images can be obtained by performing the above-mentioned processing. However, there is a fear that, depending on an arrangement of a subject as a background of the subject positioned at the distance L0, an image of the subject as the background is displaced in the upper and lower directions between the left and right images. In view of this, such a displacement will be described hereinafter.

A case where an image corresponding to the imaging area from −20 to 30 of the scale 71 (shown in FIG. 13) provided at the distance L0 is extracted from the left image generated by the lower imaging system (first imaging system 191) is assumed. In this case, the extracted image includes an image corresponding to an imaging area from −40 to 60 of the scale 72 provided at the distance L1.

Further, a case where an image corresponding to the imaging area from −20 to 30 of the scale 71 (shown in FIG. 13) provided at the distance L0 is extracted from the right image generated by the upper imaging system (second imaging system 192) is assumed. In this case, the extracted image includes an area of −50 to 50 of the scale 72 provided at the distance L1. Therefore, when the panoramic image is generated by combining the left image and the right image with each other, with respect to the subject present at the distance L0, a displacement in the upper and lower directions between the left image and the right image is not caused in the panoramic image. However, there is a fear that, with respect to the background of the subject present at the distance L0 (i.e., subject present at distance L1 (L1>L0)), an image displacement in the upper and lower directions is caused in the panoramic image.

In view of this, with respect to the left image and the right image forming the panoramic image, why the image of the subject positioned at the distance L1 is displaced in the upper and lower directions and a displacement amount thereof will be quantitatively considered hereinafter.

In FIG. 13, a tilt of the heavy line 403 is denoted by K1, a distance between a contact point between the scale 71 and the heavy line 403 and the optical axis 401 is denoted by R0, and a distance between a contact point between the scale 72 and the heavy line 403 and the optical axis 401 is denoted by R1. In this case, the following Expressions 5 to 9 are established.

$$R0 = L0 * \tan((1/2) * \theta) \qquad \text{Expression 5}$$

$$K1 = R0/L0 \qquad \text{Expression 6}$$

$$R1 = K1 * L1 = R0 * (L1/L0) \qquad \text{Expression 7}$$

$$K2 = (R0-D)/L0 \qquad \text{Expression 8}$$

$$R2 = K2 * L1 = (R0-D) * (L1/L0) \qquad \text{Expression 9}$$

Further, a displacement amount X1 of the image of the subject positioned at the distance L1 can be determined by the following Expression 10.

$$\begin{aligned} X1 &= R1 - R2 - D \qquad \text{Expression 10} \\ &= R0 * (L1/L0) - (R0 - D) * (L1/L0) - D \\ &= ((L1/L0) - 1) * D \end{aligned}$$

Further, a ratio Z1 of the displacement amount of the image of the subject positioned at the distance L1 can be determined by the following Expression 11.

$$\begin{aligned} Z1 &= X/R1 \qquad \text{Expression 11} \\ &= [\{(L1/L0) - 1\} * D] / \{R0 * (L1/L0)\} \\ &= \{(L1/L0) * D\} / (R0 * L1) \\ &= \{1 - (L0/L1)\} * (D/R0) \\ &= \{(1/L0) - (1/L1)\} * D * [1/\tan\{(1/2) * \theta\}] \end{aligned}$$

Referring to this Expression 11, if D and θ are set to be fixed values, it can be seen that the ratio Z1 of the displacement amount of the image of the subject positioned at the distance L1 (L0 and L1 are set to be variable values) depends on the distances L0 and L1. If the distance L0 is constant, the ratio Z1 of the displacement amount decreases as the distance L1 decreases. For example, a case where L1 takes a minimum value (i.e., case where L1 is equal to L0) is assumed. In this case, when processing of adjusting the displacement amount of the image by an amount corresponding to the ratio Z0 of the displacement amount of the image at the distance L0 so as to eliminate the displacement amount of the image at the distance L0 is performed, the ratio Z1 of the displacement amount of the image at the distance L1 becomes 0. In contrast, the ratio Z1 of the displacement amount increases as the distance L1 increases. Then, if distance L1=infinity is established, as shown in the following Expression 12, the ratio Z1 of the displacement amount of the image at the distance L1 takes a maximum value.

$$Z1=(D/L0)*[1/\tan\{(1/2)*\theta\}] \qquad \text{Expression 12}$$

In this manner, the maximum value (Expression 12) of the ratio Z1 of the displacement amount of the image at the distance L1 is equal to the value (Expression 3) of the ratio Z0 of the displacement amount used when the displacement of the image at the distance L0 is adjusted.

Specifically, the ratio Z1 of the displacement amount of the image of the subject positioned at the distance L1 takes a minimum value, that is, 0 when L1 is equal to L0. The value of Z1 increases as L1 increases, and is maximum when L1 is infinity. Further, the value of Z1 when Z1 takes the maximum value is equal to the ratio Z0 when the displacement amount of the image at the distance L0 is adjusted.

When the maximum value is calculated using a relatively simple numerical value, for example, when θ=60(°) is established, the maximum value of Z1 is "(D/L0)*(1/n√3)."

According to the specifications of the information processing apparatus 100, a case where an allowable range of the percentage Z1 of the displacement amount of the image of the subject positioned at the distance L1 is set to be equal to or smaller than A % is assumed. In this case, in order to obtain an image with the percentage Z1 of the displacement amount of the image of the subject positioned at the distance L1 being equal to or smaller than A %, the photographer 70 needs to take a photograph under a condition in which the following Expression 13 determined from Expression 12 is satisfied.

$$L0 \geq \{D/(A/100)\}*[1/\tan\{(1/2)*\theta\}] \qquad \text{Expression 13}$$

Specifically, if the subject distance L0 of the subject closest to the information processing apparatus 100 among the subjects included in the overlap region of the left image and the right image satisfies Expression 13, the image with the percentage Z1 of the displacement amount of the image being equal to or lower than the allowable range can be obtained. More specifically, if such a distance L0 satisfies Expression 13, processing of eliminating the displacement amount of the left and right images with respect to the subject positioned at the distance L0 based on Expression 3 is performed. With the image subjected to this processing, an image in which the percentage Z1 of the displacement amount of the image of the subject (subject positioned at distance L1 (L1>L0)) as the background being equal to or lower than the allowable range can be obtained.

However, when the subject distance L0 of the subject closest to the information processing apparatus 100 among the subjects included in that overlap region does not satisfy Expression 13, an image with the percentage Z1 of the displacement amount of the image of the subject positioned at the distance L1 being beyond the allowable range is obtained. Therefore, when the subject distance L0 of the subject included in that overlap region does not satisfy Expression 13, it is important to notify the user of the fact, to thereby urge the user to change the arrangement of the subject included in the panoramic image. Such notification examples are shown in FIGS. 24 to 26. Further, FIGS. 14 to 23 show examples of a relationship between the imaging area of the left image and the right image and the subject.

[Example of Imaging Operation]

Figure 14:
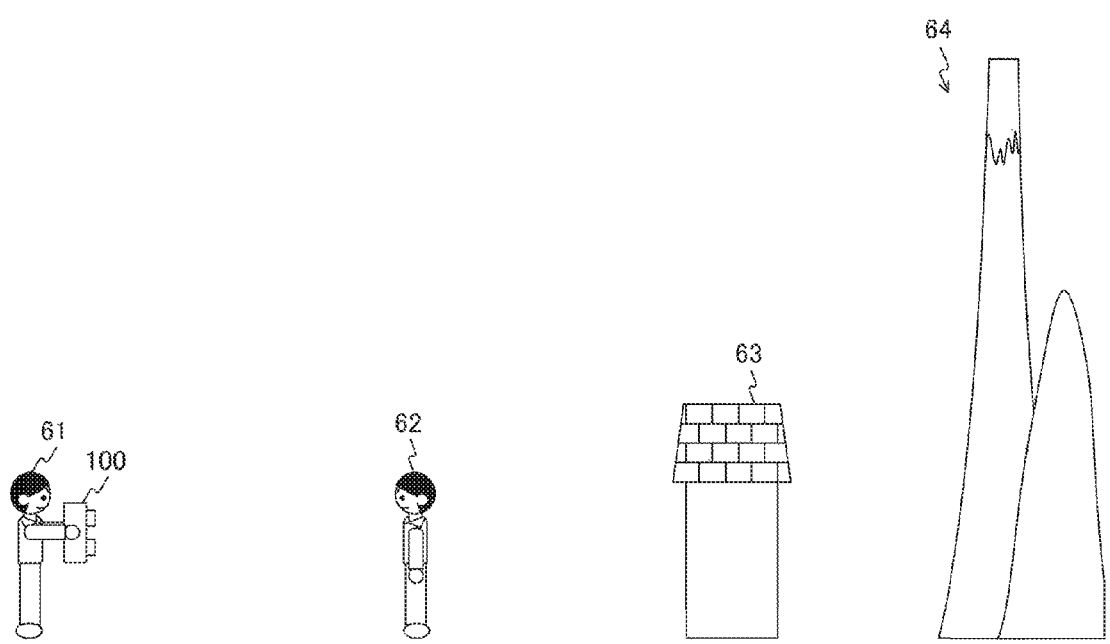
FIG. 14 is a diagram simply showing the imaging operation performed by the information processing apparatus 100 in the first embodiment of the present disclosure.

FIG. 14 is a diagram simply showing an imaging operation performed by the information processing apparatus 100 in the first embodiment of the present disclosure. FIG. 14 shows a case of the imaging operation performed by the information processing apparatus 100 as viewed from a side thereof.

Specifically, a state in which, with a person 62, a house 63, and mountains 64 being subjects, a photographer 61 performs an imaging operation with the information processing apparatus 100 is shown. In this case, it is assumed that the person 62 is at a relatively short distance (subject distance) from the information processing apparatus 100, the mountains 64 are at a relatively longer subject distance from the information processing apparatus 100, and the house 63 is located between the person 62 and the mountains 64.

[Example of Relationship Between Overlap Region and Other Regions in Imaging Area]

Figure 15:
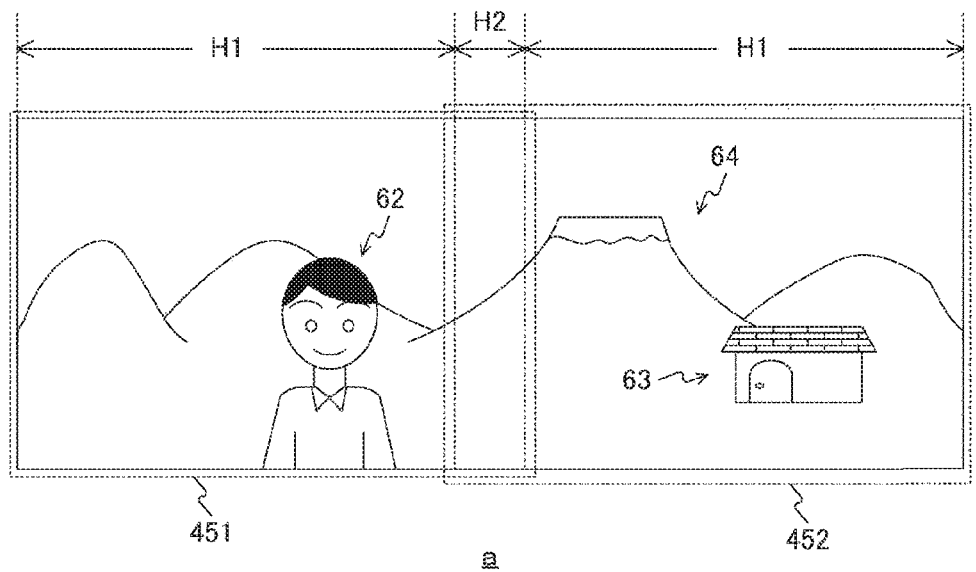
FIG. 15 is a diagram simply showing an example of a relationship between an overlap region and other regions in an imaging area as an imaging target of the imaging operation performed by the information processing apparatus 100 in the first embodiment of the present disclosure.
Figure 15:
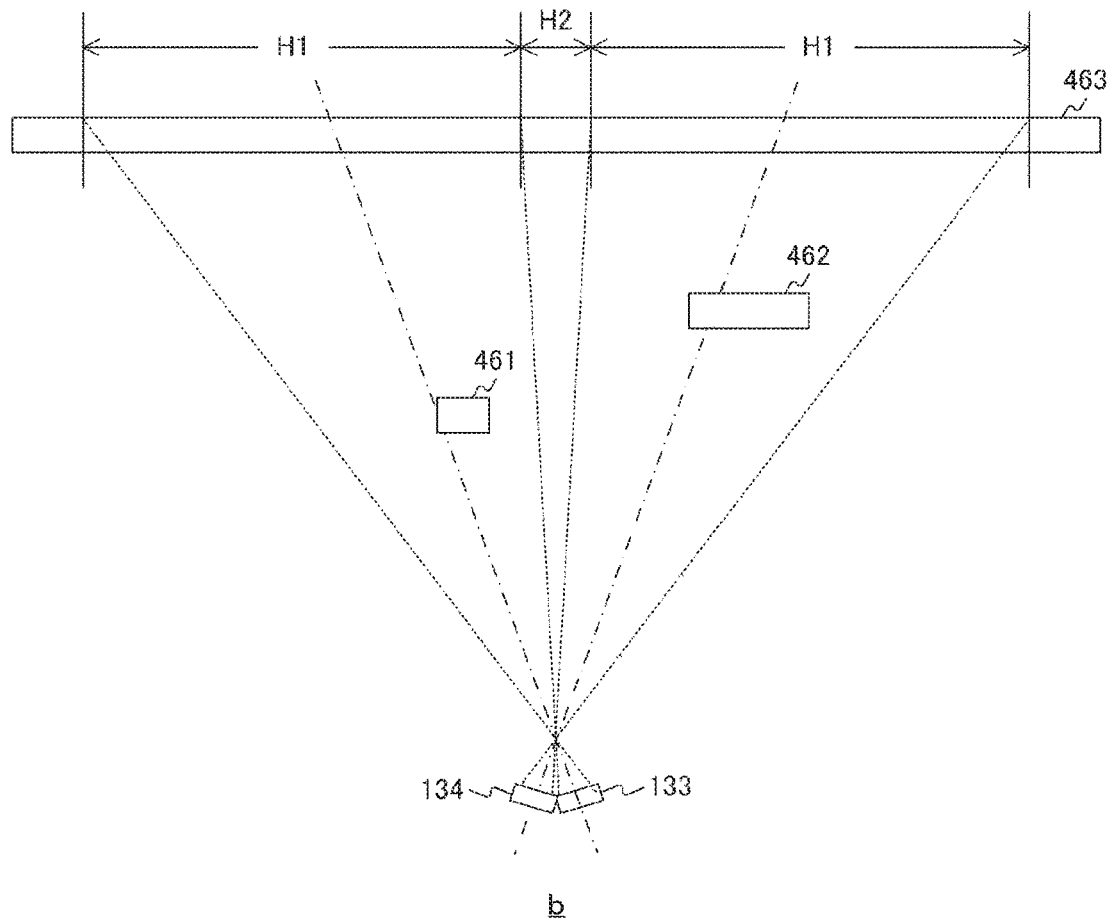

FIG. 15 is a diagram simply showing an example of a relationship between an overlap region and other regions in an imaging area as an imaging target of the imaging operation performed by the information processing apparatus 100 in the first embodiment of the present disclosure. FIG. 15 shows an example in a case where the imaging operation is performed in the state shown in FIG. 14.

Part "a" of FIG. 15 shows an imaging area as viewed from a side of the information processing apparatus 100. An imaging area surrounded with a dotted-line rectangle 451 shows an imaging area corresponding to a captured image generated by the imaging device 133. Further, an imaging area surrounded with a dotted-line rectangle 452 shows an imaging area corresponding to a captured image generated by the imaging device 134.

Further, each region H1 shows a region (region in horizontal direction) not overlapping with a region of a captured image generated by the other imaging device. Further, the overlap region H2 shows a region (region in horizontal direction) overlapping with the a region of the captured image generated by the other imaging device.

Part "b" of FIG. 15 shows an imaging area (i.e., area in horizontal surface (area corresponding to imaging area)) as viewed from an upper side of the information processing apparatus 100. It is assumed that a rectangle 461 shows a position of the person 62 shown in Part "a" of FIG. 15, a rectangle 462 shows a position of the house 63 shown in Part "a" of FIG. 15, and a rectangle 463 shows a position of the mountains 64 shown in Part "a" of FIG. 15. Note that, in Part "b" of FIG. 15, for the sake of description, the person 62, the house 63, and the mountains 64 are arranged at narrower intervals than those shown in FIG. 14.

In this manner, the imaging devices 133 and 134 are arranged such that an imaging target area formed of an area serving as an imaging target of the imaging device 133 and an area serving as an imaging target of the imaging device 134 is larger in the specific direction than the area serving as the imaging target of each of the imaging devices 133 and 134. The specific direction is the longitudinal direction of the surface in which the imaging devices 133 and 134 are arranged. Further, the imaging devices 133 and 134 are arranged such that the area serving as the imaging area of the imaging device 133 and the area serving as the imaging area of the imaging device 134 are arranged in the specific direction. Further, the imaging devices 133 and 134 are arranged such that the long-side direction of the imaging device 133 and the long-side direction of the imaging device 134 almost coincide with each other in the specific direction. In this case, the imaging devices 133 and 134 are arranged such that an aspect ratio of the imaging target area formed of the area serving as the imaging area of the imaging device 133 and the area serving as the imaging area of the imaging device 134 is larger than an aspect ratio of the area serving as the imaging target of each of the imaging devices 133 and 134. Further, the imaging devices 133 and 134 are arranged such that an end portion in the specific direction of the area serving as the imaging area of the imaging device 133 and an end portion in the specific direction of the area serving as the imaging target of the imaging device 134 provided adjacent to the imaging device 133 overlap with each other.

[Example of Evaluation Value in Imaging Area]

Figure 16:
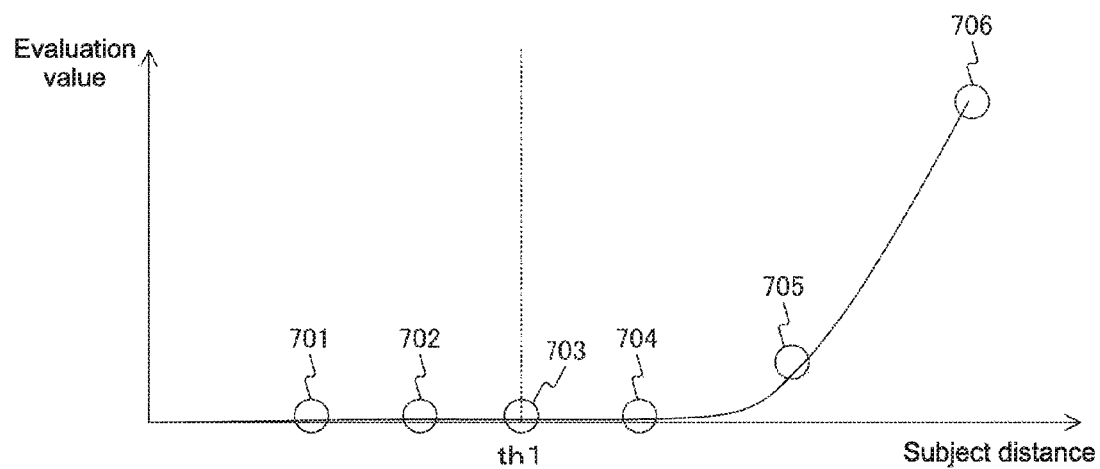
FIG. 16 is a diagram showing an example of an evaluation value in the imaging area as the imaging target of the imaging operation performed by the information processing apparatus 100 in the first embodiment of the present disclosure.
Figure 16:
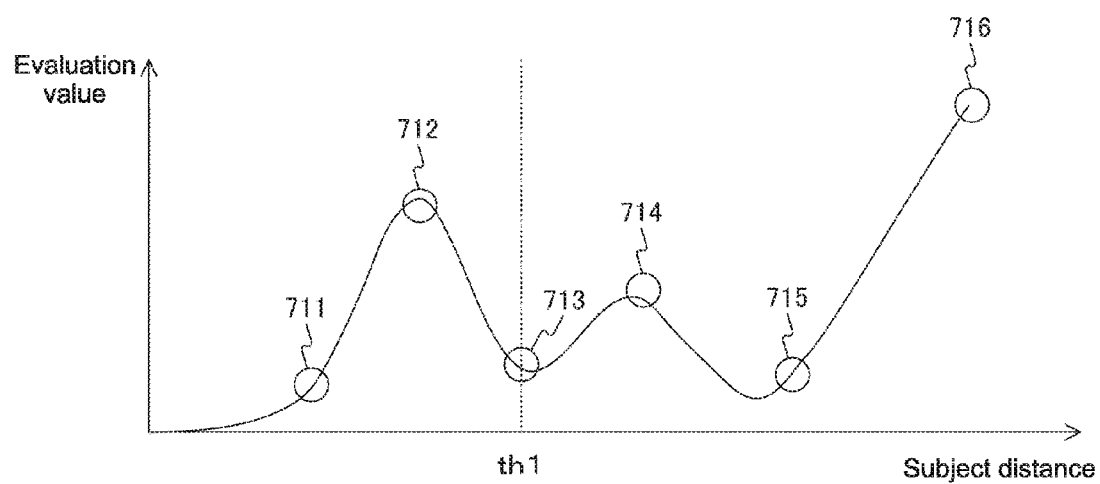

FIG. 16 is a diagram showing an example of an evaluation value in an imaging area set at an imaging target of the imaging operation performed by the information processing apparatus 100 in the first embodiment of the present disclosure. In graphs shown in Part "a" and "b" of FIG. 16, a vertical axis indicates an evaluation value (e.g., number of pixel data items having high spatial frequency value) obtained when the distances to the subjects and the distribution thereof are examined. Further, the horizontal axis indicates a distance (subject distance) from the information processing apparatus 100 to the subject (focused subject).

Part "a" of FIG. 16 shows an evaluation value in the overlap region H2 in the imaging area shown in FIG. 15. Further, Part "b" of FIG. 16 shows an evaluation value in the regions H1 other than the overlap region H2 in the imaging area shown in FIG. 15.

Further, it is assumed that a circle 701 shown in Part "a" of FIG. 16 and a circle 711 shown in Part "b" of FIG. 16 indicate evaluation values at the same distance. Further, a circle 702 shown in Part "a" of FIG. 16 and a circle 712 shown in Part "b" of FIG. 16 indicate evaluation values at the same distance. Similarly, circles 703 to 706 shown in Part "a" of FIG. 16 and circles 713 to 716 shown in Part "b" of FIG. 16 indicate evaluation values at the same distance, respectively.

The circle 706 shown in Part "a" of FIG. 16 and the circle 716 shown in Part "b" of FIG. 16 indicate the position of the mountains 64. In other words, the circle 706 shown in Part "a" of FIG. 16 and the circle 716 shown in Part "b" of FIG. 16 indicate the number of pixel data items of an image in which the mountains 64 are in focus. Further, the circle 712 shown in Part "b" of FIG. 16 indicates the position of the person 62. In other words, the circle 712 shown in Part "b" of FIG. 16 indicates the number of pixel data items of an image in which the person 62 is in focus. Further, the circle 714 shown in Part "b" of FIG. 16 indicates the position of the house 63. In other words, the circle 714 shown in Part "b" of FIG. 16 indicates the number of pixel data items of an image in which the house 63 is in focus.

Further, in the above-mentioned Expression 13, the minimum value of the distance L0 satisfying the relationship that the percentage Z1 of the displacement amount of the image of the subject positioned at the distance L1 is equal to or lower than A % is set as a threshold value th1.

For example, the vertical distance D between the optical axis 401 of the first imaging system 191 and the optical axis 402 of the second imaging system 192 in the information processing apparatus 100 is set to 10 mm. Further, an angle θ corresponding to the imaging area in the vertical direction of the lower imaging system (first imaging system 191) and the upper imaging system (second imaging system 192) is set to 60 degrees. Further, an allowable range A of a percentage Z of the displacement amount of the image of the subject positioned at the distance L1 is set to be equal to or lower than 0.5%, for example. This displacement amount corresponds to a displacement of about 0.45 mm in a photograph typically called L-size photograph (horizontal 89 mm, vertical 127 mm), for example. Provided that D=10 (mm), θ=60(°), and Z=0.005 (0.5%) are established, the threshold value th1 for L0 determined from Expression 13 equals 3.4 (m). That is, when the distance L0 to the closest subject in the overlap region H2 is equal to or larger than 3.4 (m), an image with the displacement amount of the background being equal to or lower than a predetermined allowable range can be obtained. More specifically, when the distance L0 is equal to or larger than 3.4 (m), with an image subjected to processing of eliminating the displacement amount of the left and right images with respect to the subject positioned at the distance L0 based on Expression 3, an image with the displacement amount of the background being equal to or lower than the predetermined allowable range can be obtained.

As shown in FIG. 15, the subject included in the overlap region H2 is only the mountains 64. Therefore, the closest subject among the subjects included in the overlap region H2 is also the mountains 64. In this case, the distance L0 to the closest subject in the overlap region H2 can be considered as the infinity.

In this manner, when the distance L0 can be considered as the infinity, the percentage Z0 of the displacement amount of the left and right images that should be adjusted based on Expression 3 equals 0. That is, without performing an adjustment in the left- and right-hand directions based on Expression 3, an image with the displacement amount of the image of the subject positioned at the distance L0 being eliminated can be obtained.

Further, in this case, the value of the distance L0 is larger than a threshold value of 3.4 m with respect to the distance L0 determined based on Expression 13. Therefore, an image with the displacement amount of the background being also equal to or lower than the predetermined allowable range can be obtained. That is, the closest subject coincides with the background, and hence the displacement amount of the background is equal to the displacement amount of the closest subject, that is, 0. Further, also in calculation, a maximum value of the displacement amount of the background is Z0, and hence, when L0=∞ is established, Z0=0 is established and the displacement amount of the background becomes 0.

Further, as shown in FIG. 15, subjects included in the regions H1 other than the overlap region H2 are the person 62, the house 63, and the mountains 64. Therefore, the closest subject among the subjects included in the regions H1 other than the overlap region H2 is the person 62. This person 62 is present at a distance smaller than the threshold value th1 as shown in Part "b" of FIG. 16. The person 62 is included in the region H1 other than the overlap region H2. Thus, it is not necessary to correct the left image and the right image forming the panoramic image on the basis of the subject distance of the person 62.

In this manner, even if the distance of the subject closest to the information processing apparatus 100 is smaller than the threshold value th1, when that subject is not included in the overlap region H2, the subject distance does not need to be used for correcting the left image and the right image forming the panoramic image. Therefore, in such a case, without changing the arrangement of the subject such that the distance of the subject included in the panoramic image is equal to or larger than the threshold value th1, an adjustment of the left and right images based on the distance L0 to the subject included in the overlap region H2 and Expression 3 is performed. In this manner, even without changing the arrangement of the subject, it is possible to obtain the panoramic image without the displacement of the image of the subject positioned at the distance L0 with the displacement amount of the image of the subject as the background being equal to or lower than the predetermined allowable range.

In the above, an example in the case where the subject positioned at the subject distance smaller than the threshold value th1 is not included in the overlap region H2 has been shown. Next, an example in the case where the subject positioned at the subject distance equal to or larger than the threshold value th1 is included in the overlap region H2 and an example in the case where the subject positioned at the subject distance smaller than the threshold value th1 is included in the overlap region H2 will be shown.

First, a case where a subject (close-distance subject) close to the information processing apparatus 100 and a subject (long-distance subject) far from the information processing apparatus 100 are mixed will be described. More specifically, a case where the close-distance subject is in the overlap region of the imaging area and the subject distance L0 to the close-distance subject is equal to or larger than the threshold value th1 of the distance L0 determined based on Expression 13 will be described.

[Example of Relationship Between Overlap Region and Other Regions in Imaging Area]

Figure 17:
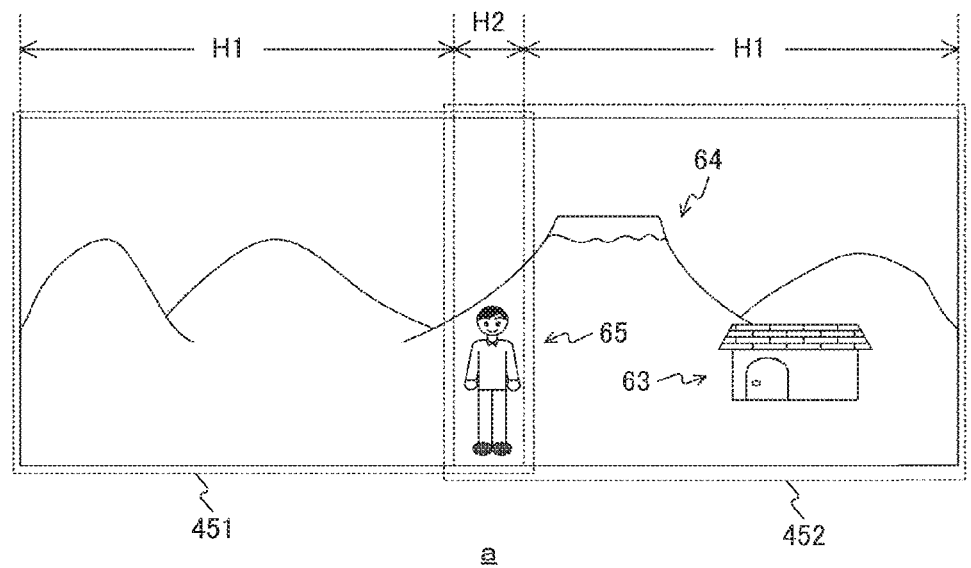
FIG. 17 is a diagram simply showing an example of a relationship between an overlap region and other regions in an imaging area as the imaging target of the imaging operation performed by the information processing apparatus 100 in the first embodiment of the present disclosure.
Figure 17:
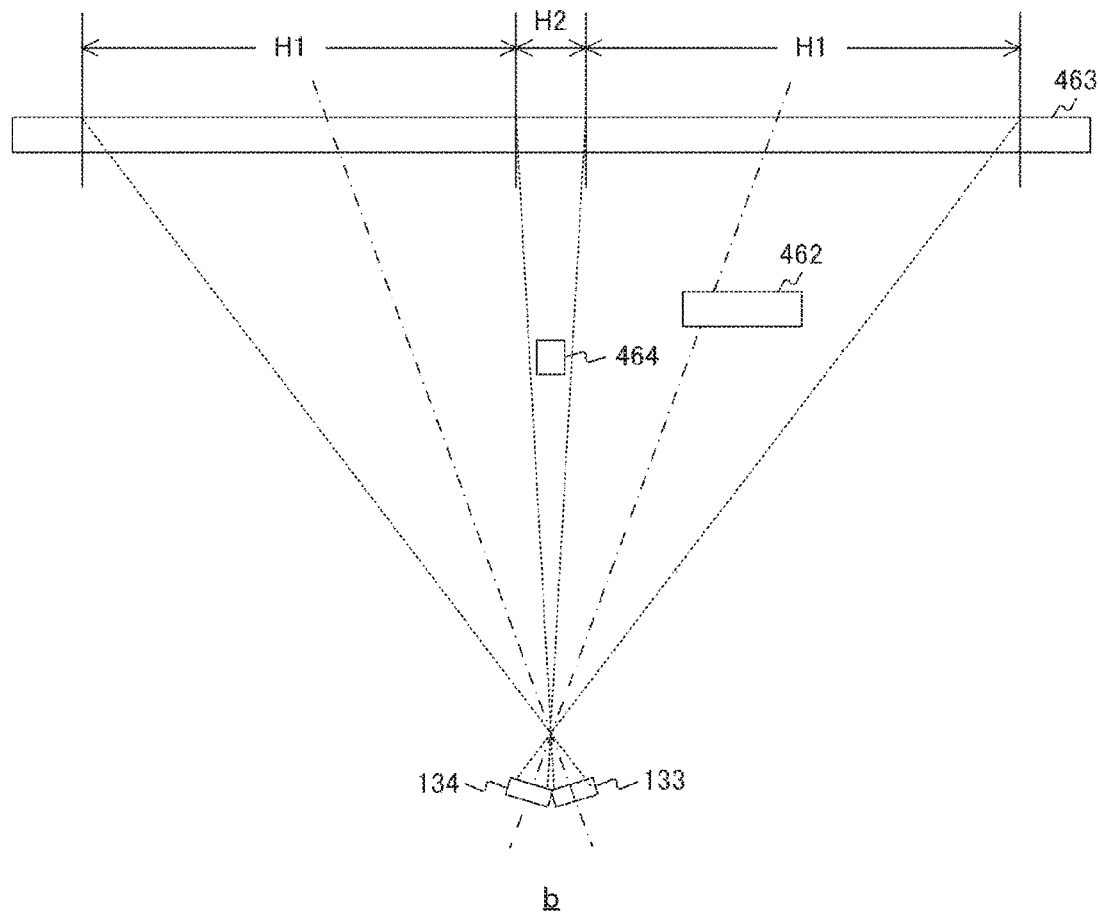

FIG. 17 is a diagram simply showing an example of a relationship between the overlap region and other regions in the imaging area set as the imaging target of the imaging operation performed by the information processing apparatus 100 in the first embodiment of the present disclosure. Note that a relationship shown in Part "a" and "b" of FIG. 17 is the same as Part "a" and "b" of FIG. 15. Therefore, portions common to those in FIG. 15 are denoted by the same reference symbols and some descriptions thereof are omitted.

A rectangle 464 shown in Part "b" of FIG. 17 indicates a position of a person 65 shown in Part "a" of FIG. 17.

[Example of Evaluation Value in Imaging Area]

Figure 18:
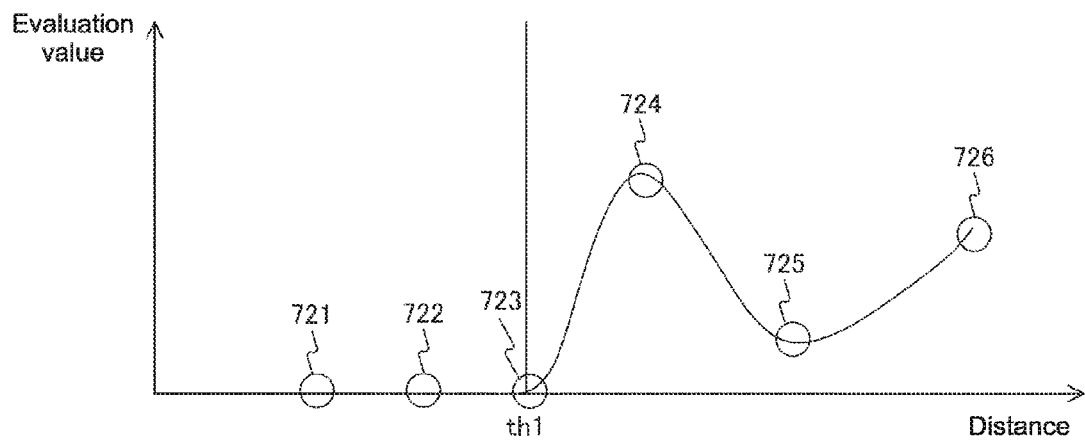
FIG. 18 is a diagram showing an example of an evaluation value in the imaging area as the imaging target of the imaging operation performed by the information processing apparatus 100 in the first embodiment of the present disclosure.
Figure 18:
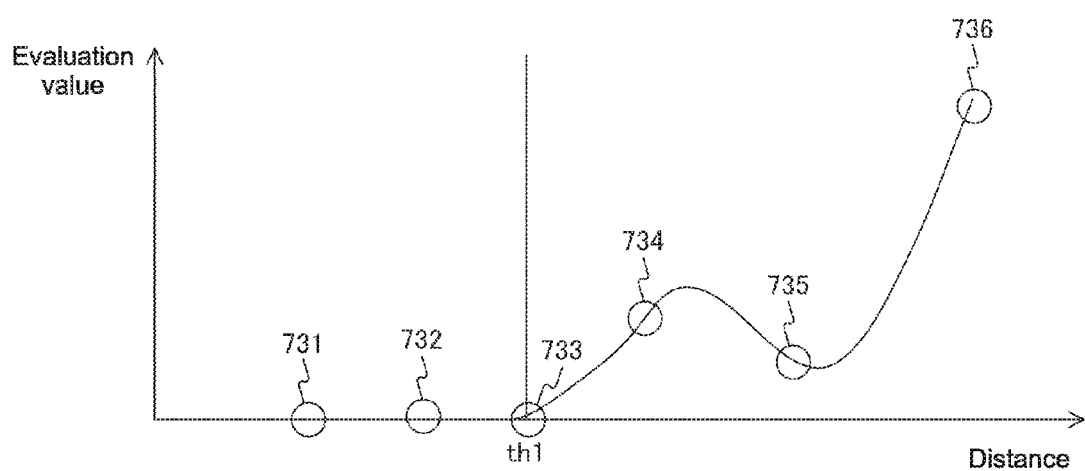

FIG. 18 is a diagram showing an example of the evaluation value of the imaging area as the imaging target of the imaging operation performed by the information processing apparatus 100 in the first embodiment of the present disclosure. Note that a graph shown in Part "a" and "b" of FIG. 18 is the same as the graph shown in Part "a" and "b" of FIG. 16. Further, a relationship shown in Part "a" and "b" of FIG. 18 is the same as Part "a" and "b" of FIG. 16. That is, it is assumed that circles 721 and 726 shown in Part "a" of FIG. 18 and circles 731 to 736 shown in Part "b" of FIG. 18 indicate evaluation values at the same distance, respectively.

The circle 724 shown in Part "a" of FIG. 18 indicates a position of the person 65 shown in Part "a" of FIG. 17. That is, the circle 724 shown in Part "a" of FIG. 18 indicates the number of pixel data items of an image in which the person 65 is in focus. Further, a proximity of the circle 734 shown in Part "b" of FIG. 18 indicates a position of the house 63 shown in Part "a" of FIG. 17. That is, the proximity of the circle 734 shown in Part "b" of FIG. 18 indicates the number of pixel data items of an image in which the house 63 is in focus. Further, the circle 736 shown in Part "b" of FIG. 18 indicates a position of the mountains 64 shown in Part "a" of FIG. 17. That is, the circle 736 shown in Part "b" of FIG. 18 indicates the number of pixel data items of an image in which the mountains 64 are in focus.

As shown in FIG. 17, the subject included in the overlap region H2 is only the person 65. Therefore, the closest subject among the subjects included in the overlap region H2 is also the person 65. In this case, as shown in Part "a" of FIG. 18, the subject distance of the person 65 is equal to or larger than the threshold value th1, and hence satisfies the above-mentioned Expression 13.

In this case, the left and right images are adjusted based on the subject distance L0 to the closest subject (person 65) among the subjects included in the overlap region H2 and the percentage Z0 of the displacement amount determined from Expression 3. The panoramic image in which the image of the person 65 positioned at the subject distance L0 is not displaced in the upper and lower directions between the left image and the right image can be obtained by this processing.

Further, in the case of the subject arrangement shown in FIGS. 17 and 18, a value of the distance L0 to the person 65 is larger than the threshold value th1 with respect to the distance L0 determined based on Expression 13. Therefore, the panoramic image with the displacement amount of the subject (mountains 64) as the background of the person 65 being also equal to or lower than the predetermined allowable range can be obtained. Here, a case where D=10 (mm), θ=60(°), the distance L0 to the closest subject (person 65) in the overlap region H2 equals 3.4 m, and the distance L1 to the subject (mountains 64) as the background of the person 65 becomes infinity is shown. In the subject arrangement in this case, the displacement amount of the subject (mountains 64) as the background is maximum and the percentage of the displacement amount is 0.5% (about 0.45 mm in L-size photograph). For example, a case where the background of the person 65 is covered with a subject positioned in front of the mountains 64 (e.g., subject positioned at L1=7.2 m) is assumed. In this case, the percentage of the displacement amount of the subject serving as the background is 0.25% (about 0.23 mm in L-size photograph).

Next, in the case where the close-distance subject and the long-distance subject are mixed, when the close-distance subject is in the overlap region of the imaging area and the subject distance L0 to the close-distance subject is smaller than the threshold value th1 of the distance L0 determined based on Expression 13 will be described.

[Example of Relationship Between Overlap Region and Other Regions in Imaging Area]

Figure 19:
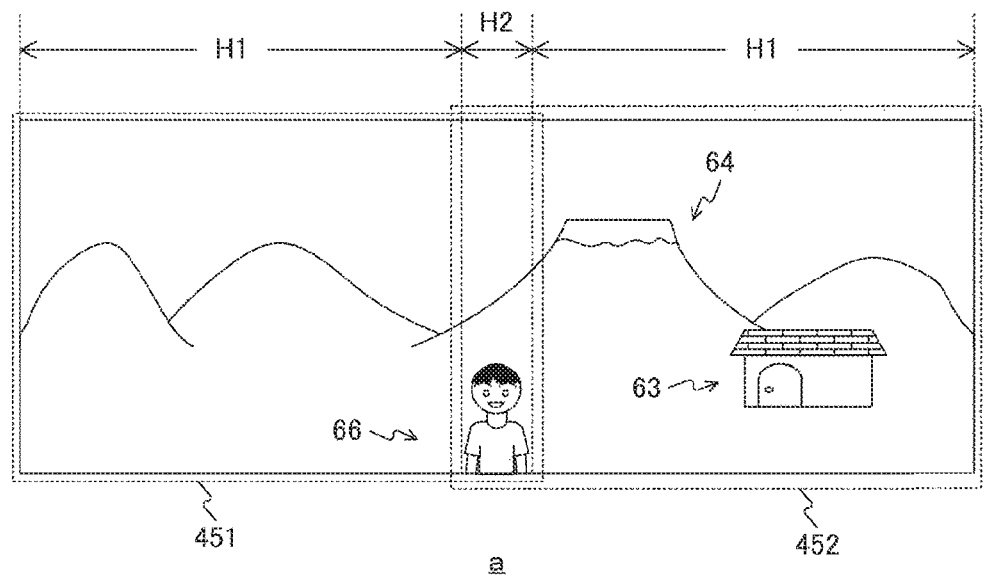
FIG. 19 is a diagram simply showing an example of a relationship between an overlap region and other regions in an imaging area as the imaging target of the imaging operation performed by the information processing apparatus 100 in the first embodiment of the present disclosure.
Figure 19:
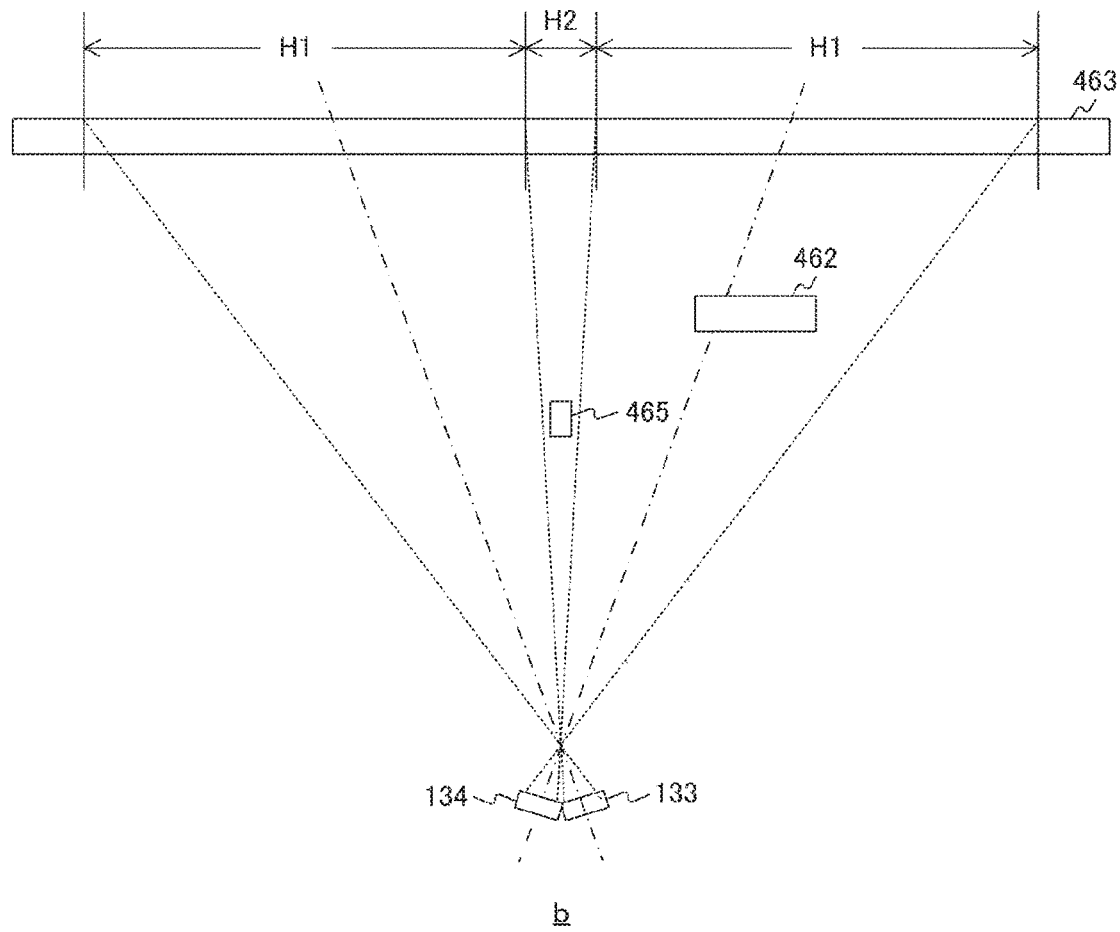

FIG. 19 is a diagram simply showing an example of a relationship between the overlap region and other regions in the imaging area as the imaging target of the imaging operation performed by the information processing apparatus 100 in the first embodiment of the present disclosure. Note that a relationship shown in Part "a" and "b" of FIG. 19 is the same as Part "a" and "b" of FIG. 15. Therefore, portions common to those in FIG. 15 are denoted by the same reference symbols and some descriptions thereof are omitted.

A rectangle 465 shown in Part "b" of FIG. 19 indicates a position of a person 66 shown in Part "a" of FIG. 19.

[Example of Evaluation Value in Imaging Area]

Figure 20:
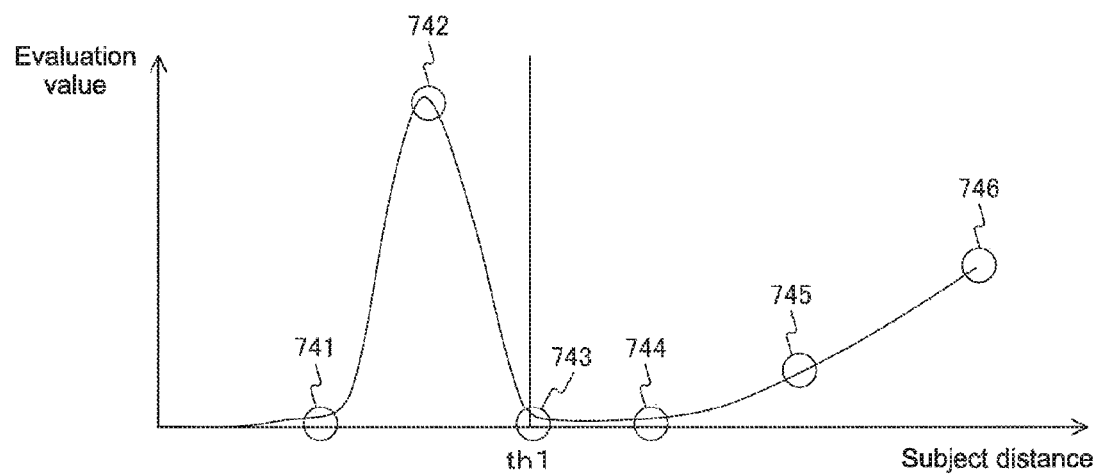
FIG. 20 is a diagram showing an example of an evaluation value in the imaging area as the imaging target of the imaging operation performed by the information processing apparatus 100 in the first embodiment of the present disclosure.
Figure 20:
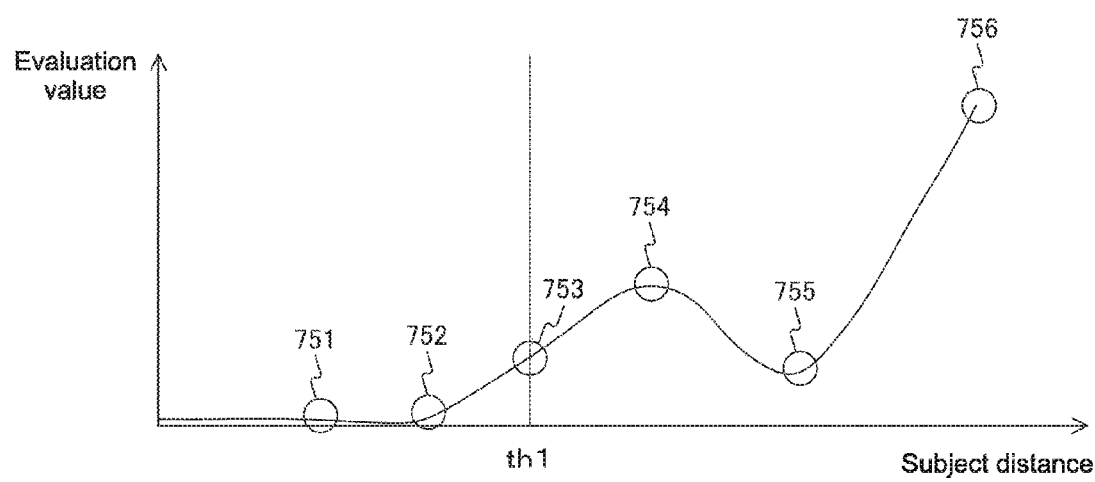

FIG. 20 is a diagram showing an example of an evaluation value of the imaging area as the imaging target of the imaging operation performed by the information processing apparatus 100 in the first embodiment of the present disclosure. Note that a graph shown in Part "a" and "b" of FIG. 20 is the same as the graph shown in Part "a" and "b" of FIG. 16. Further, a relationship shown in Part "a" and "b" of FIG. 20 is the same as Part "a" and "b" of FIG. 16. That is, circles 741 to 746 shown in Part "a" of FIG. 20 and circles 751 to 756 shown in Part "b" of FIG. 20 indicate evaluation values at the same distance, respectively.

The circle 742 shown in Part "a" of FIG. 20 indicates the position of the person 66. That is, the circle 742 shown in Part "a" of FIG. 20 indicates the number of pixel data items of an image in which the person 66 is in focus. Further, the circle 754 shown in Part "b" of FIG. 20 indicates the position of the house 63. That is, the circle 754 shown in Part "b" of FIG. 20 indicates the number of pixel data items of an image in which the house 63 is in focus. Further, the circle 746 shown in Part "a" of FIG. 20 and the circle 756 shown in Part "b" of FIG. 20 indicate the position of the mountains 64. That is, the circle 746 shown in Part "a" of FIG. 20 and the circle 756 shown in Part "b" of FIG. 20 indicate the number of pixel data items of an image in which the mountains 64 are in focus.

As shown in FIG. 19, the subjects included in the overlap region H2 are the person 66 and the mountains 64. Therefore, the closest subject among the subjects included in the overlap region H2 is the person 66. In this case, as shown in Part "a" of FIG. 20, the subject distance of the person 66 is smaller than the threshold value th1, and hence does not satisfy the above-mentioned Expression 13.

In this manner, in the case where the subject distance of the subject closest to the information processing apparatus 100 is smaller than the threshold value th1 and the subject is included in the overlap region H2, the user is notified of a warning indicating the fact. With this notification, the user is urged to change the arrangement of the subject included in the panoramic image or change a direction in which the information processing apparatus 100 is held. For example, a warning for urging to move the subject position such that the subject distance of the subject closest to the information processing apparatus 100 is equal to or larger than the threshold value th1 is issued. Otherwise, a warning for urging to move the subject position or change the direction in which the user holds the information processing apparatus 100 such that the subject closest to the information processing apparatus 100 is outside the overlap region H2 is issued. It is possible to obtain a suitable panoramic image by issuing such a warning and suitably changing the arrangement of the subject included in the panoramic image or the direction in which the user holds the information processing apparatus 100.

Next, a case where a subject is present in a part of the overlap region of the imaging area and a patterned background is seen in the back of the subject while a subject closer than the subject is present in the area other than the overlap region will be described.

[Example of Imaging Operation]

Figure 21:
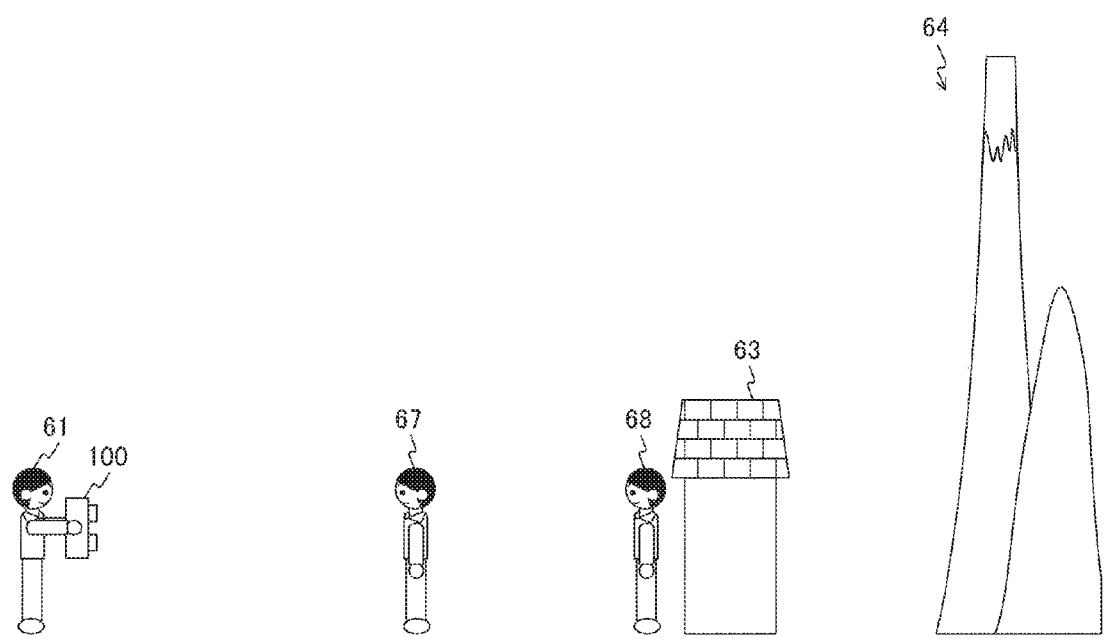
FIG. 21 is a diagram simply showing the imaging operation performed by the information processing apparatus 100 in the first embodiment of the present disclosure.

FIG. 21 is a diagram simply showing the imaging operation performed by the information processing apparatus 100 in the first embodiment of the present disclosure.

FIG. 21 shows a state of an imaging operation performed by the information processing apparatus 100 as viewed from a side thereof. Note that the photographer 61, the house 63, and the mountains 64 shown in FIG. 21 are similar to those in FIG. 13. That is, FIG. 21 shows an example in which a person 67 and a person 68 are arranged instead of the person 62 shown in FIG. 13. In this case, it is assumed that the person 67 is at a relatively short distance (subject distance) from the information processing apparatus 100, the mountains 64 are at a relatively longer subject distance from the information processing apparatus 100, and the house 63 and the person 68 are present between the person 67 and the mountains 64.

[Example of Relationship Between Overlap Region and Other Regions in Imaging Area]

Figure 22:
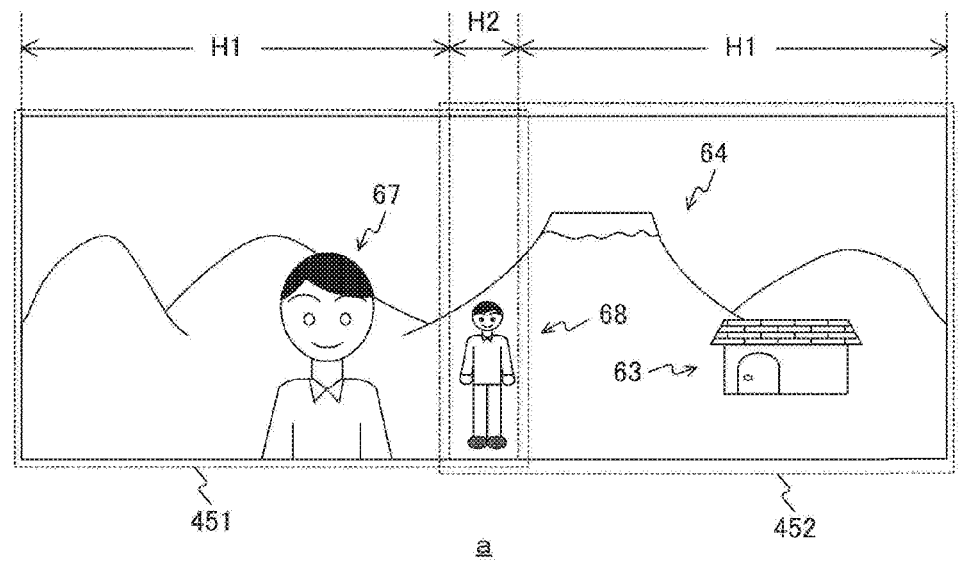
FIG. 22 is a diagram simply showing an example of a relationship between an overlap region and other regions in an imaging area as the imaging target of the imaging operation performed by the information processing apparatus 100 in the first embodiment of the present disclosure.
Figure 22:
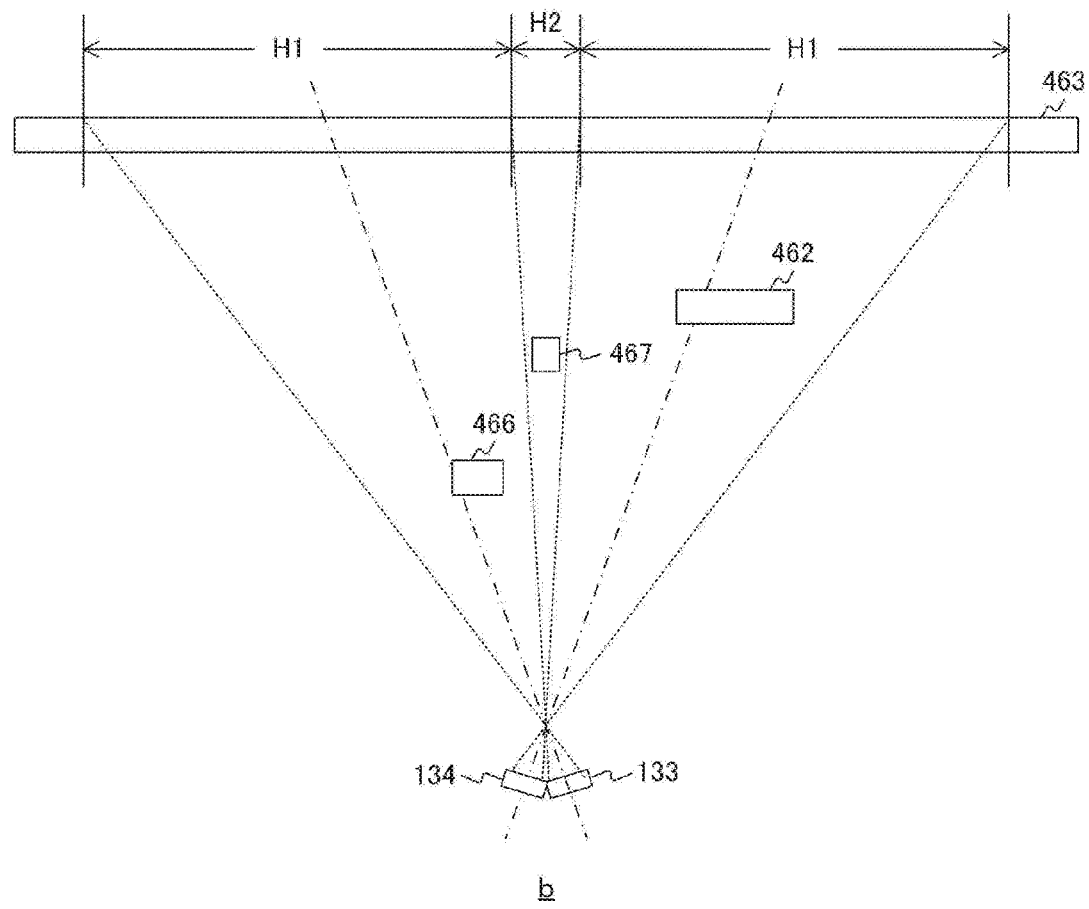

FIG. 22 is a diagram simply showing an example of a relationship between the overlap region and other regions in the imaging area as the imaging target of the imaging operation performed by the information processing apparatus 100 in the first embodiment of the present disclosure. Note that a relationship shown in Part "a" and "b" of FIG. 22 is the same as that in Part "a" and "b" of FIG. 15. Therefore, portions common to those in FIG. 15 are denoted by the same reference symbols and some descriptions thereof are omitted. Further, in FIG. 22, an example in the case of imaging in the state shown in FIG. 21 is shown.

A rectangle 466 shown in Part "b" of FIG. 22 indicates the position of the person 67 shown in Part "a" of FIG. 22. A rectangle 467 shown in Part "b" of FIG. 22 indicates a position of the person 68 shown in Part "a" of FIG. 22.

An example in the case where the subject (person 68) is present in the part of the overlap region H2 of the imaging area and the patterned background (mountains 64) is seen in the back of the subject in the back of the subject while the subject (person 67) closer than the subject is present in the region H1 other than the overlap region H2 in this manner is shown.

[Example of Evaluation Value in Imaging Area]

Figure 23:
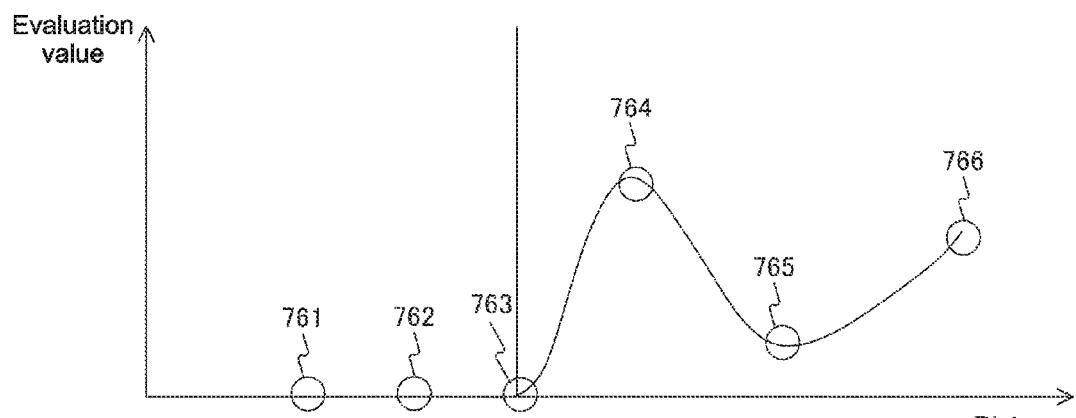
FIG. 23 is a diagram showing an example of an evaluation value in the imaging area as the imaging target of the imaging operation performed by the information processing apparatus 100 in the first embodiment of the present disclosure.
Figure 23:
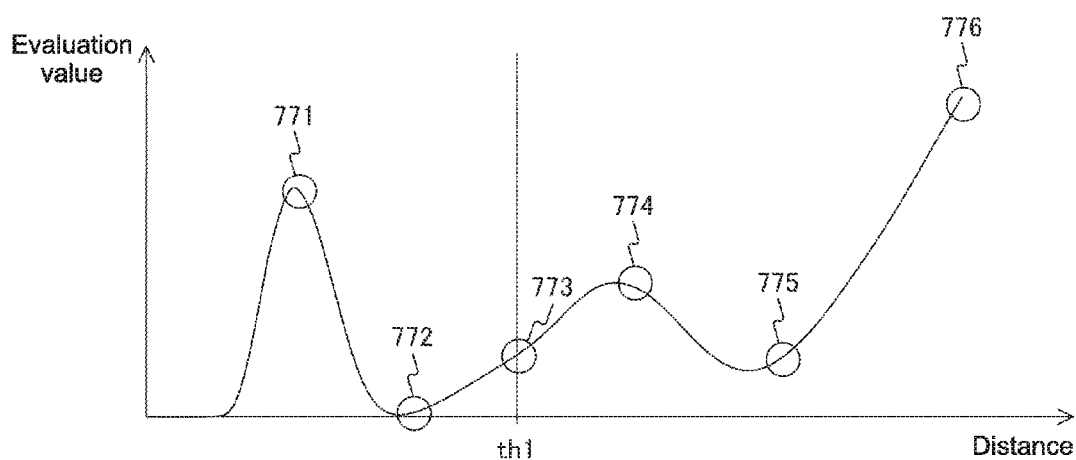

FIG. 23 is a diagram showing an example of the evaluation value in the imaging area as the imaging target of the imaging operation performed by the information processing apparatus 100 in the first embodiment of the present disclosure. Note that a graph shown in Part "a" and "b" of FIG. 23 is the same as the graph shown in Part "a" and "b" of FIG. 16. Further, the relationship shown in Part "a" and "b" of FIG. 23 is the same as Part "a" and "b" of FIG. 16. That is, circles 761 to 766 shown in Part "a" of FIG. 23 and the circles 771 to 776 shown in Part "b" of FIG. 23 indicate evaluation values at the same distance, respectively.

The circle 771 shown in Part "b" of FIG. 23 indicates the position of the person 67. That is, the circle 771 shown in Part "b" of FIG. 23 indicates the number of pixel data items of an image in which the person 67 is in focus. Further, the circle 764 shown in Part "a" of FIG. 23 indicates the position of the person 68. That is, the circle 764 shown in Part "a" of FIG. 23 indicates the number of pixel data items of an image in which the person 68 is in focus. Further, the circle 774 shown in Part "b" of FIG. 23 indicates the position of the house 63. That is, the circle 774 shown in Part "b" of FIG. 23 indicates the number of pixel data items of an image in which the house 63 is in focus. Further, the circle 766 shown in Part "a" of FIG. 23 and the circle 776 shown in Part "b" of FIG. 20 indicate the position of the mountains 64. That is, the circle 766 shown in Part "a" of FIG. 23 and the circle 776 shown in Part "b" of FIG. 20 indicate the number of pixel data items of an image in which the mountains 64 are in focus.

As shown in FIG. 22, the subjects included in the overlap region H2 are the person 68 and the mountains 64. Further, the person 67 is present on a front side with respect to the person 68 (side of information processing apparatus 100). Therefore, the subject on the front side among the subjects included in the imaging area is the person 67. In this case, as shown in Part "b" of FIG. 23, the subject distance (circle 771) of the person 67 is smaller than the threshold value th1 and the person 67 is the subject included in a region other than the overlap region H2. Further, the subject distance (circle 764) of the subject included in the overlap region H2 (person 68) is equal to or larger than the threshold value th1.

In this manner, even if a distance of the subject closest to the information processing apparatus 100 is smaller than the threshold value th1, when the subject is not included in the overlap region H2, that subject distance does not need to be used for correcting the left image and the right image forming the panoramic image. Therefore, in such a case, without changing the arrangement of the subject such that the distance of the subject included in the panoramic image is equal to or larger than the threshold value th1, the adjustment of the left and right images based on the distance L0 to the subject included in the overlap region H2 and Expression 3 is performed. In this manner, even without changing the arrangement of the subject, the panoramic image without the displacement of the image of the subject positioned at the distance L0 with the displacement amount of the image of the subject as the background being equal to or lower than the predetermined allowable range can be obtained.

[Notification Example]

FIGS. 24 to 26 are diagrams each showing an example of a notification to the user in the information processing apparatus 100 in the first embodiment of the present disclosure.

As described above, in the case where the subject positioned at a distance (subject distance) from the information processing apparatus 100 that is smaller than the threshold value th1 is present in the overlap region H2, there is a fear that the displacement of the panoramic image in the vertical direction increases. In view of this, when imaging is performed in such a state, it is possible to prevent the displacement of the recorded panoramic image in the vertical direction from increasing by notifying the user of the fact. For example, it is possible to warn the user such that the closest subject is outside the overlap region H2 or such that the subject distance of the closest subject is equal to or larger than the threshold value th1. Further, for example, it is possible to warn the user to change the direction in which the information processing apparatus 100 is held such that the closest subject is outside the overlap region H2. Those notification examples are shown in FIGS. 24 to 26.

FIG. 24 shows an example in which a warning is performed by notifying the user of the overlap region.

Part "a" of FIG. 24 shows a display example in which a warning is performed by displaying, on the live view image displayed on the display unit 140, the display information 581 indicating the overlap region. As shown in Part "a" of FIG. 24, display information 581 can be displayed by changing the color of the overlap region. Further, the display information 581 may be displayed by shading the overlap region, blinking the overlap region, or changing the luminance of the overlap region.

Part "b" of FIG. 24 shows a display example in which a warning is performed by displaying, on the live view image displayed on the display unit 140, display information 582 for indicating the overlap region. As shown in Part "b" of FIG. 24, a frame line indicating the overlap region can be displayed as the display information 582. Note that the display information 582 may be displayed by blinking the frame line or changing the color of the frame line or the luminescence.

FIG. 25 shows an example in which a warning is performed by notifying the user of the subject included in the overlap region.

Part "a" of FIG. 25 shows a display example in which a warning is performed by extracting, on the live view image displayed on the display unit 140, a contour of the closest subject among the subjects included in the overlap region and displaying a line indicating the contour as display information 583. Note that the display information 583 may be displayed by blinking the line indicating the contour or changing the color indicating the contour and the luminance.

Part "b" of FIG. 25 shows a display example in which a warning is performed by extracting, on the live view image displayed on the display unit 140, the contour of the closest subject among the subjects included in the overlap region and displaying display information 584 obtained by changing the color in the contour. Note that the display information 584 may be displayed by blinking the image in the contour or changing the image in the contour and the luminance.

FIG. 26 shows an example in which a warning is performed by message display or audio output.

Part "a" of FIG. 26 shows a display example in which a warning is performed by displaying the message information 585 on the live view image displayed on the display unit 140. Note that blinking the message information 585 or changing the color or the luminance of the message information 585 may be performed.

Part "b" of FIG. 26 shows an example in which a warning is performed by outputting the message 586 with sound. Note that, other than the message display and the sound output, a warning may be performed by alarming or by vibrating the information processing apparatus 100.

Alternatively, a mark indicating the message shown in Part "a" and "b" of FIG. 26 may be displayed on the live view image displayed on the display unit 140.

Further, a warning may be performed by lighting a particular lamp.

[Example of Operation of Information Processing Apparatus]

Figure 27:
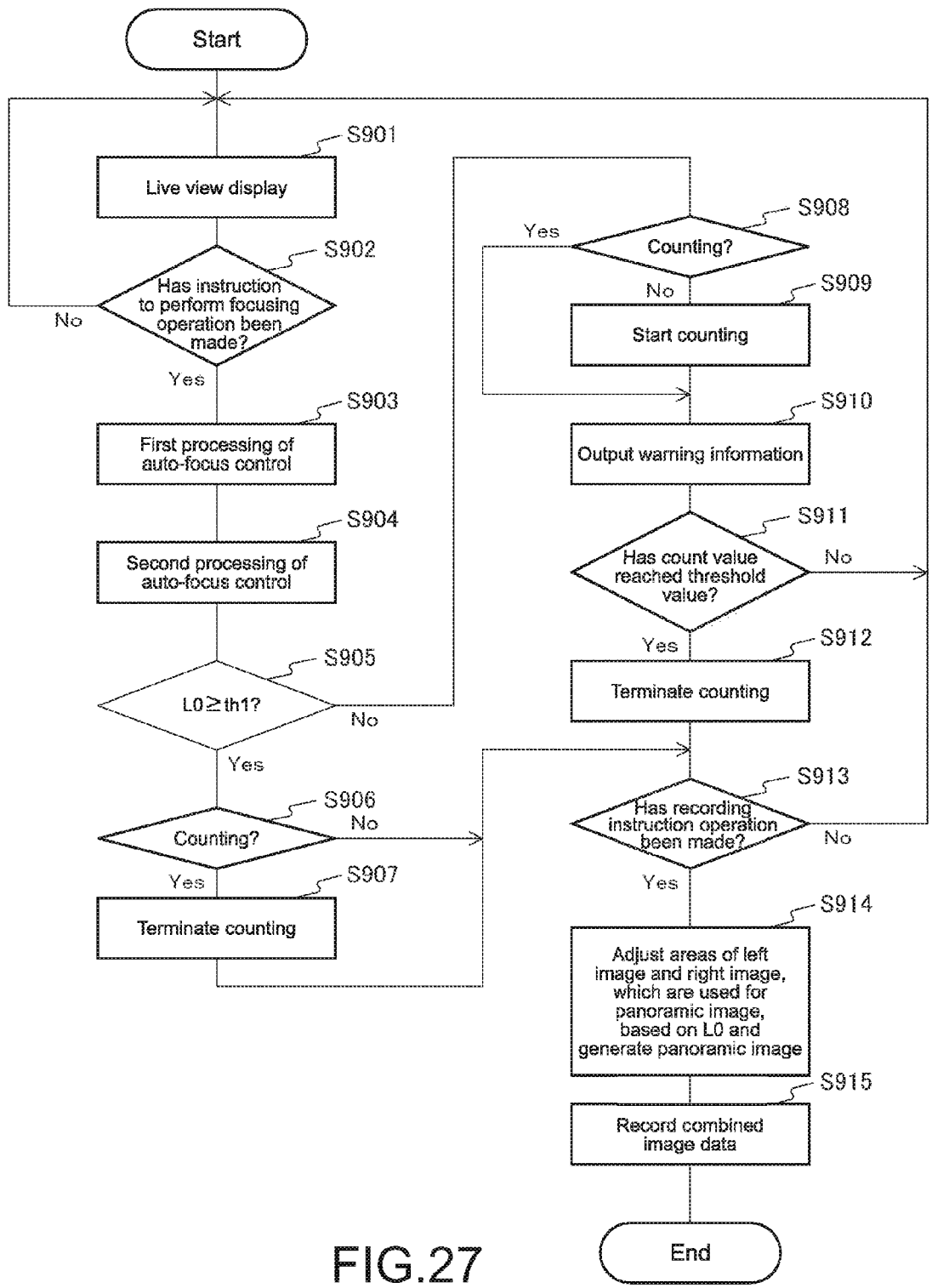
FIG. 27 is a flowchart showing an example of a processing procedure of a panoramic image recording control process by the information processing apparatus 100 in the first embodiment of the present disclosure.

FIG. 27 is a flowchart showing an example of a processing procedure of a panoramic image recording control process by the information processing apparatus 100 in the first embodiment of the present disclosure. Note that FIG. 27 shows a processing procedure example in the case where a still image is captured.

First, a so-called live view display is performed (Step S901). That is, the imaging area captured by the imaging unit 510 is a moving image and displayed on the display unit 140 in real time (Step S901).

Subsequently, the control unit 570 determines whether or not an instruction to perform a focusing operation has been made by the user of the information processing apparatus 100 (Step S902). For example, whether or not the shutter button has been half-pressed is determined (Step S902).

If it is determined in Step S902 that the shutter button has been half-pressed, the control unit 570 performs an auto-focus control on the imaging unit 510 (Steps S903 and S904). As the auto-focus control process, a first process (Step S903) and a second process (Step S904) are performed.

In this first process, the focus point of the imaging unit 510 is continuously changed from a close side to a far side to/from the imaging unit 510 while an image is captured at each focal distance. Further, in each image captured, spatial frequencies of images included therein are analyzed. With this, it is possible to obtain information on distances from the imaging unit 510 to the subjects and distribution thereof. Based on the information, a subject as a focus target is determined. Further, in the above-mentioned information on the distances to the subjects and the distribution, a value of the distance L0 from the imaging unit 510 to the closest subject in an overlap region in which the imaging areas of the left and right imaging units constituting the imaging unit 510 overlap with each other is obtained (Step S903). Note that Step S903 is an example of a calculation procedure described in the scope of claims.

Subsequently, in the second process of the auto-focus control, the control unit 570 controls the imaging unit 510 to be focused on the subject determined as the focus target in Step S903 (Step S904). Further, the imaging unit 510 adjusts the focal distance to be focused on the subject determined as the focus target (Step S904).

Subsequently, the judgment unit 530 determines whether or not the distance L0 to the closest subject obtained in Step S903 is equal to or larger than the threshold value th1 (shown in FIG. 16 and the like) (Step S905). Note that Step S905 is an example of a determination procedure described in the scope of claims.

If the distance L0 is equal to or larger than the threshold value th1 (Step S905), the control unit 570 determines whether or not counting is being performed (Step S906). Then, if counting is being performed (Step S906), counting is terminated (Step S907) and the process proceeds to Step S913. Otherwise, if counting is not being performed (Step S907), the process proceeds to Step S913.

Further, if the distance L0 is smaller than the threshold value th1 (Step S905), the control unit 570 determines whether or not counting is being performed (Step S908). If counting is not being performed (Step S908), the control unit 570 starts counting (Step S909) and the warning information is output (Step S910). Otherwise, if counting is being performed (Step S908), the process proceeds to Step S910.

The warning information corresponds to, for example, the display information 581 to 584, the message information 585, and the message 586 shown in FIGS. 24 to 26. Further, the warning information as an output target can be set by, for example, a user operation. That is, it is possible to output the warning information according to user preference.

Further, the warning information may continue to be output or may be output regularly or irregularly until a certain user operation is performed or until a count value reaches a threshold value.

Further, after the warning information is output (Step S910), the control unit 570 determines whether or not the count value has reached the threshold value (Step S911). If the count value has not yet reached the threshold value (Step S911), the process returns to Step S901. Otherwise, if the count value has reached the threshold value (Step S911), the control unit 570 terminates counting (Step S912).

The control unit 570 determines whether or not the recording instruction operation has been performed (Step S913). If the recording instruction operation is not performed, the process returns to Step S901. Otherwise, if the recording instruction operation has been performed (Step S913), the image combination unit 520 corrects and combines image data items of the left image and the right image based on the distance L0 (Step S914). That is, using Expression 3 and based on the distance L0, the image combination unit 520 combines the left image and the right image with each other by combining partial regions in the vertical direction of the left image and the right image with each other (Step S914). Subsequently, the recording control unit 540 records the combined image data items in the storage unit 550 (Step S915).

In this manner, the image combination unit 520 generates the combined image in which, with respect to a plurality of images obtained from the imaging devices 133 and 134, at least partial regions of the images are combined with each other in the specific direction. Further, the image combination unit 520 corrects a displacement in the orthogonal direction between the plurality of images obtained from the imaging devices 133 and 134, based on the subject distance of the subject included in the overlap region between the images. In other words, the image combination unit 520 corrects the displacement in the orthogonal direction between the plurality of images obtained from the imaging devices 133 and 134, based on the subject distance of the subject included in the combined image. Note that the displacement is caused due to the arrangement of the imaging devices 133 and 134 in the orthogonal direction. Further, the orthogonal direction is a direction almost orthogonal to the longitudinal direction (specific direction) of a surface in which the imaging devices 133 and 134 are arranged.

Further, the image combination unit 520 adjusts the areas used for the combined image, based on the subject distance of the subject included in the overlap region between the plurality of images. In other words, the image combination unit 520 adjusts the areas of the images that are used for the combined image, based on the subject distance of the subject included in the combined image.

Further, the control unit 570 performs a predetermined notification if the subject distance to a particular subject included in the overlap region between the plurality of images obtained from the imaging devices 133 and 134 is smaller than a threshold value. For example, the control unit 570 performs a notification for urging to change the arrangement of the subject included in the overlap region or a notification for indicating that the images are displaced in the combined image. Further, the control unit 570 performs a predetermined notification when the subject distance to the particular subject included in the combined image is smaller than the threshold. For example, the control unit 570 performs a notification for urging to change the arrangement of the subject included in the combined image or a notification for indicating that the images are displaced in the combined image. The particular subject can be at least one of a subject closest to the information processing apparatus 100, a subject set as the focus target by the focusing operation, a subject detected by a facial detection unit, and a subject detected by a moving object detection unit. Note that the moving object detection unit serves to detect a moving object included in an image. For example, a detection method of calculating a difference value of each pixel value of the image for each of the pixels and detecting a region in which the calculated difference value of each pixel is equal to or larger than a fixed value as a moving object region can be used. Note that the image combination unit 520 is an example of a correction unit and an adjustment unit described in the scope of claims.

Further, the judgment unit 530 calculates a subject distance of the subject included in the overlap region of the combined image generated by overlapping and combining end portions of images generated by the plurality of imaging units arranged in the specific direction with each other or in the combined image. Further, the judgment unit 530 performs, based on the subject distance, a judgment as to areas of images that are used for the combined image. Alternatively, the judgment unit 530 performs, based on the subject distance, a judgment as to the arrangement of the subject included in the combined image.

In this manner, if a subject positioned at a subject distance smaller than the threshold value th1 is present in the overlap region in the panoramic image, the user is notified of a warning indicating the fact and urged to change the arrangement of the subject included in the panoramic image. Further, if such a subject is present, the reception of the recording instruction operation is disabled for a predetermined period (period until count value reaches threshold value). With this, a panoramic image that causes a displacement in the vertical direction beyond the allowable range can be prevented from being recorded. That is, a suitable panoramic image can be generated and recorded.

Note that it is conceivable that there is a user who wishes to record the panoramic image having a composition in which the displacement caused in the vertical direction is beyond the allowable range (composition in which subject positioned at subject distance smaller than threshold value th1 is present in overlap region in panoramic image). In view of this, if the arrangement of the subject included in the panoramic image is not changed after the user is notified of a warning indicating the fact for a predetermined time, the reception of the recording instruction operation is allowed and the panoramic image having such a composition is recorded. With this, it is possible to generate a suitable panoramic image according to a preference of the user. In this case, the panoramic image subjected to the processing of eliminating the displacement amount in the upper and lower directions of the subject positioned at the distance L0 between the left and right images based on the distance L0 from the information processing apparatus 100 to the closest subject is recorded. It should be noted that the distance L0 is smaller than the threshold value th1, and hence a panoramic image in which the subject as the background has a displacement amount beyond the allowable range A in the upper and lower directions between the left and right images can be recorded.

In this manner, the information processing apparatus 100 is the information processing apparatus in which the two imaging systems (imaging devices 133 and 134 and optical systems 131 and 132) are arranged in the short-side direction of the panoramic image. That is, the information processing apparatus 100 is in a special arrangement in which positions in the "vertical direction" at which the two imaging systems (imaging devices 133 and 134 and optical systems 131 and 132) are arranged are different. Therefore, in a surface parallel to the short side of the panoramic image (so-called "vertical surface"), imaging areas in the vertical direction of the two imaging units are displaced in upper and lower directions.

In view of this, during the auto-focus process, the information processing apparatus 100 determines the distance L0 from the information processing apparatus 100 to the closest subject in the region in which the imaging areas of the two imaging systems overlap with each other. Then, the information processing apparatus 100 corrects, based on the distance L0, a displacement amount of an image such that subjects coincide with each other in the upper and lower directions between the left and right images. It should be noted that the information processing apparatus 100 determines whether or not images can be combined with each other to generate a suitable panoramic image by comparing the displacement amount of the background of the subject in the upper and lower directions between the left and right images with the allowable value. Then, the information processing apparatus 100 issues, based on a determination result thereof, a warning to the user if necessary. For example, if it is determined that the displacement amount of the background is large, the information processing apparatus 100 issues a warning to the user. Further, the information processing apparatus 100 notifies the user of a specific suggestion for improvement together with the warning. As the specific suggestion for improvement, for example, a notification for urging the user to increase a distance between the closest subject in the region (overlap region) in which the imaging areas overlap with each other and the information processing apparatus 100 is performed. Further, for example, a notification for urging to move the subject outside the overlap region or a notification for urging to change the direction in which the user (photographer) holds the information processing apparatus 100 such that the subject is outside the overlap region may be performed. By executing the suggestion for improvement according to such a notification, the user can capture a suitable panoramic image.

2. Second Embodiment

In the first embodiment of the present disclosure, the example in which the information processing apparatus including the two imaging systems is used to generate the panoramic image has been shown. The embodiment of the present disclosure is also applicable to an information processing apparatus including three or more imaging systems.

In view of this, in a second embodiment of the present disclosure, an example in which the information processing apparatus including the three imaging systems are used to generate the panoramic image is shown. Note that the information processing apparatus in the second embodiment of the present disclosure is obtained by modifying a part of the information processing apparatus 100 shown in FIG. 1 and the like. Therefore, portions common to those of the information processing apparatus 100 are denoted by the same reference symbols and some descriptions thereof are omitted.

[Outer-Appearance Configuration Example of Information Processing Apparatus]

Figure 28:
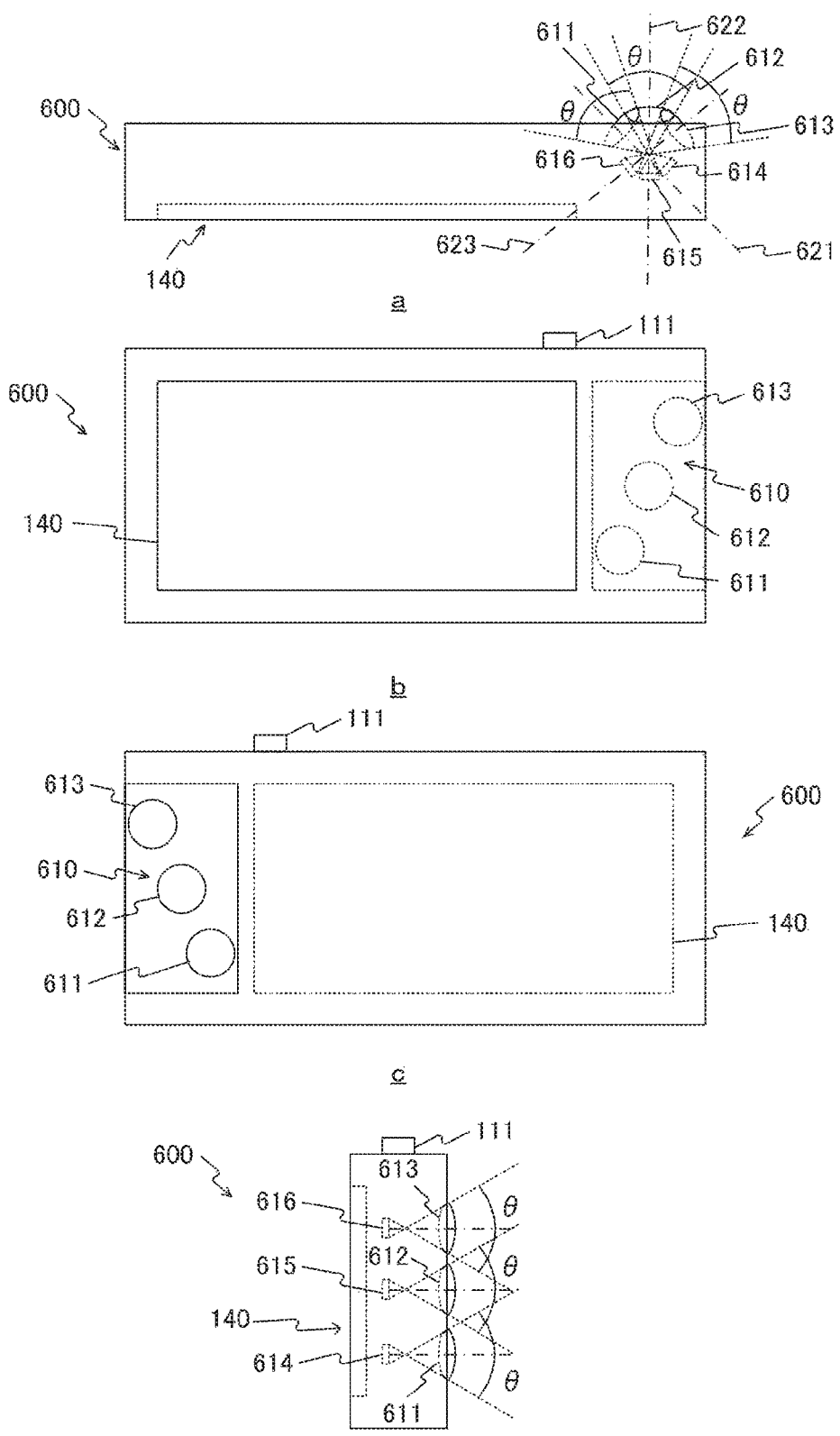
FIG. 28 is a diagram showing an outer-appearance configuration example of an information processing apparatus 600 in a second embodiment of the present disclosure.

FIG. 28 is a diagram showing an outer-appearance configuration example of an information processing apparatus 600 in the second embodiment of the present disclosure.

Part "a" of FIG. 28 shows a top view of the information processing apparatus 600. Part "b" of FIG. 28 shows a front view (surface in which display unit 140 is provided) of the information processing apparatus 600. Further, Part "c" of FIG. 28 shows a rear view of the information processing apparatus 600 (back surface as viewed from surface in which display unit 140 is provided). Part "d" of FIG. 28 shows a side view of the information processing apparatus 600. Note that Parts "a" to "d" of FIG. 28 correspond to Parts "a" to "d" of FIG. 1, respectively. Further, portions common to those of the information processing apparatus 100 shown in FIG. 1 are denoted by the same reference symbols.

The information processing apparatus 600 includes a determination key 111, a display unit 140, and an imaging unit 610. Note that the information processing apparatus 600 is almost the same as the information processing apparatus 100 shown in FIG. 1 except for a point that three imaging systems (optical systems 611 to 613 and imaging devices 614 to 616) constituting the imaging unit 610 are provided. Therefore, detailed descriptions thereof are omitted here.

As shown in Part "a" of FIG. 28, it is assumed that the optical axis (optical axis 622 that passes through the optical system 612 and enters the imaging device 615) in a middle lens group (optical system 612) among three lens groups is orthogonal (or almost orthogonal) to the display surface of the display unit 140. Further, as shown in Part "a" of FIG. 28, optical axes of two imaging systems (optical system 611 and 613 and imaging devices 614 and 616) constituting the imaging unit 610 will be referred to as optical axes 621 and 623. In this case, an angle formed by the optical axis 621 and the optical axis 622 is identical to an angle formed by the optical axis 623 and the optical axis 622. That is, the two imaging systems (optical system 611 and 613 and imaging devices 614 and 616) are arranged such that the optical axes 621 and 623 of the two imaging systems (optical system 611 and 613 and imaging devices 614 and 616) are axisymmetric with respect to the optical axis 622. Note that a position relationship among the three optical systems (lens group)

611 to 613 in the horizontal direction (long-side direction of display unit 140 and casing of information processing apparatus 600 shown in Part "b" of FIG. 28) are the same as the examples shown in FIGS. 2 to 5. That is, the position relationship among the three optical systems (lens groups) 611 to 613 in the horizontal direction depends on a position at which the three optical axes 621 to 623 of the three imaging systems cross. For example, in the case where the three optical axes cross at a position of the optical system (lens group), the positions of the three optical systems (lens groups) in the horizontal direction coincide with one another. This example is shown in Part "b" of FIG. 29. Further, as the position at which the three optical axes cross moves from the optical system (lens group) toward the imaging device, the position of the optical system (lens group) in the horizontal direction moves away. The example shown in FIG. 28 is an arrangement example in the case where the positions of the optical systems (lens groups) 611 to 613 in the horizontal direction are spaced apart from each other.

Further, the information processing apparatus 600 generates a panoramic image by combining images (left image, middle image, and right image) generated by the three imaging systems (optical systems 611 to 613 and imaging devices 614 to 616). In this case, each of the above-mentioned judgments is performed with the subject included in the overlap region of each of the generated images (left image, middle image, and right image) being a reference. Specifically, whether or not the subject distance of the subject closest to the information processing apparatus 100 among the subjects included in the overlap region of the left image and the middle image and the overlap region of the middle image and the right image is equal to or larger than the threshold value th1 is determined. Then, if the subject distance is smaller than the threshold value th1, the user is notified of a warning indicating the fact and urged to change the arrangement of the subject included in the panoramic image. That is, the user is urged to change the arrangement of the subject included in the panoramic image such that the subject distance of the subject included in the overlap region is larger than the threshold value th1.

In this manner, the optical system 612 and the optical systems 611 and 613 are arranged in one surface of the casing in the orthogonal direction almost orthogonal to the longitudinal direction (specific direction) of this one surface such that the optical axis of the optical system 612 is orthogonal to the display surface of the display unit 140.

In the second embodiment of the present disclosure, an image (middle image) generated by the middle imaging system (optical system 612 and imaging device 615) among the three imaging systems is an image in a middle portion of the panoramic image. Therefore, even if a subject relatively close to the information processing apparatus 600 is included in the middle portion of the panoramic image, it is possible to suitably generate the panoramic image.

3. Modified Example

In each of the first and second embodiments according to the present disclosure, the example in which the plurality of imaging systems are arranged such that the plurality of imaging systems are in an oblique direction with respect to the short-side direction of the casing of the information processing apparatus has been shown. The plurality of imaging systems may also be arranged in parallel with the short-side direction of the casing of the information processing apparatus. In view of this, hereinafter, an example in which the plurality of imaging systems are arranged in parallel with the short-side direction of the casing of the information processing apparatus is shown.

[Outer-Appearance Configuration Example of Information Processing Apparatus]

Figure 29:
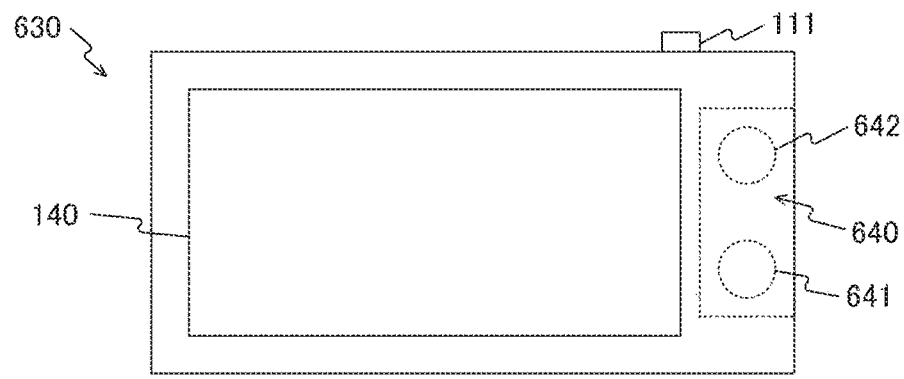
FIG. 29 is a diagram showing an outer-appearance configuration example of information processing apparatuses 630 and 650 in a modified example of the embodiment of the present disclosure.
Figure 29:
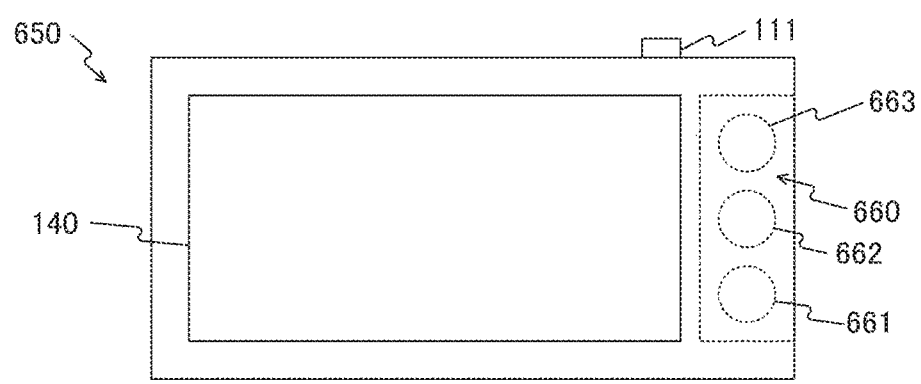

FIG. 29 is a diagram showing an outer-appearance configuration example of information processing apparatuses 630 and 650 in a modified example of the embodiment of the present disclosure.

Part "a" of FIG. 29 shows a front view of the information processing apparatus 630 (surface in which display unit 140 is provided). Further, Part "b" of FIG. 29 shows a front view of the information processing apparatus 650 (surface in which display unit 140 is provided). Note that Part "a" of FIG. 29 corresponds to Part "b" of FIG. 1. Further, Part "b" of FIG. 29 corresponds to Part "b" of FIG. 28. Further, portions common to those of the information processing apparatus 100 are denoted by the same reference symbols.

The information processing apparatus 630 includes a determination key 111 and an imaging unit 640. Note that the information processing apparatus 630 is also the same as the information processing apparatus 100 shown in FIG. 1 except for a point that imaging systems (optical systems 641 and 642) constituting the imaging unit 640 are arranged in parallel with the short-side direction of the casing of the information processing apparatus 630. Therefore, a detailed description thereof is omitted here. It should be noted that the imaging systems (optical systems 641 and 642) are arranged such that an overlap region is present with respect to each of the images (left image and right image) generated by imaging systems (optical systems 641 and 642) constituting the imaging unit 640.

The information processing apparatus 650 includes a determination key 111 and an imaging unit 660. Note that the information processing apparatus 650 is almost the same as the information processing apparatus 600 shown in FIG. 28 except for a point that imaging systems (optical systems 661 to 663) constituting the imaging unit 660 are arranged in parallel with the short-side direction of the casing of the information processing apparatus 650. Therefore, a detailed description thereof is omitted here. It should be noted that it is assumed that the imaging systems (optical systems 661 to 663) are arranged such that an overlap region is present between images with respect to the images (left image, middle image, and right image) generated by the imaging systems (optical systems 661 to 663) constituting the imaging unit 660.

In general, it is conceivable that, in the information processing apparatus, an optical center arrangement line (line that links optical centers of plurality of imaging systems) is parallel to the longitudinal direction of the casing and the optical center arrangement line is formed near a center of a short side of the casing (side of end portion of casing in longitudinal direction). However, when the imaging systems (optical systems) are arranged in this manner, there is a fear that the design of the electronic substrate having functions other than a photograph-taking function becomes difficult. For example, when the electronic substrate in the casing of the information processing apparatus is designed, it is necessary to form a cut-out in a part of the electronic substrate in order to place the electronic substrate avoiding the plurality of imaging systems. In this case, for example, if the cut-out is largely formed to extend toward a center of the electronic substrate, there is a fear that a degree of freedom in designing the electronic substrate is deteriorated.

Many imaging system components each formed of a lens and an imaging device have a large height among components of the information processing apparatus. Therefore, when the imaging system components are arranged such that the optical center arrangement line is formed in parallel with the longitudinal direction of the casing near the center of the short side of the casing (side of end portion in longitudinal direction of casing), there is a fear that the arrangement of the electronic substrate is interfered.

In view of this, in the embodiment of the present disclosure, the plurality of imaging units are arranged in the short-side direction of the display unit (or oblique direction thereof). With this, the cut-out of the electronic substrate of the information processing apparatus does not need to be largely formed toward the center of the electronic substrate, and hence it is possible to enhance the degree of freedom in designing the electronic substrate. That is, it is possible to increase space utilization of the information processing apparatus.

It should be noted that, if the plurality of imaging systems are arranged in this manner, when images are combined with each other to generate a panoramic image, there is a fear that a displacement is caused in the vertical direction in the image. In view of this, in the embodiment of the present disclosure, it is possible to suitably correct the displacement. For example, whether or not the subject positioned at the subject distance smaller than the threshold value th1 is present in the overlap region in the panoramic image is determined. Further, whether or not the displacement in the upper and lower directions of the subject as the background in the obtained panoramic image is equal to or smaller than an allowable value is determined. When the subject positioned at the subject distance smaller than the threshold value th1 is present or when the displacement in the upper and lower directions of the subject as the background is larger than the allowable value, the user is notified of the warning indicating the fact and urged to change the arrangement of the subject included in the panoramic image. That is, the user is urged to change the arrangement of the subject included in the panoramic image such that the subject distance positioned at the subject included in the overlap region is larger than the threshold value th1. With this, it is possible to generate the panoramic image with the displacement caused in the vertical direction falling within the allowable range.

That is, when the images generated by the plurality of imaging units are combined with each other to generate the combined image, it is important to suitably combine the images considering the arrangement of the subject included in the combined image. In the embodiment of the present disclosure, it is possible to suitably generate the combined image.

Note that, in the embodiment of the present disclosure, the example in which the analysis of the distance from the information processing apparatus to the closest subject is performed in the overlap region in which the imaging areas of the plurality of imaging units overlap with each other and each of the above-mentioned judgments is performed based on the distance information has been shown. It should be noted that the analysis of the distance from the information processing apparatus to the closest subject may be performed in an entire imaging area of the plurality of imaging units and each of the above-mentioned judgments may be performed based on this analysis result.

As described above, as the distance from the information processing apparatus to the subject as the background of the closest subject increases, the displacement amount of the background in the panoramic image increases. Therefore, in the embodiment of the present disclosure, the judgment as to whether or not the displacement amount of the background of the obtained panoramic image is equal to or smaller than the allowable value is performed provided that the distance to the subject as the background of the closest subject is infinity. Then, if the displacement amount is equal to or smaller than the allowable value, the displacement amount is equal to or smaller than the allowable value even when the distance from the information processing apparatus to the subject as the background thereof takes any value. By performing the judgment in this manner, it is possible to generate a suitable panoramic image. Further, in the embodiment of the present disclosure, as the distance used in the judgment (distance from information processing apparatus to subject), the distance of the closest subject is used. Therefore, in the embodiment of the present disclosure, the example in which the analysis of the distance used in the judgment (distance from information processing apparatus to subject) is performed only on the closest subject has been shown. It should be noted that a distance from the information processing apparatus to a farthest subject does not need to be infinity and the distance from the information processing apparatus to the farthest subject may be analyzed. In this case, using the distance from the information processing apparatus to the farthest subject and the distance from the information processing apparatus to the closest subject, based on Expression 11, whether or not the displacement amount of the background is equal to or smaller than the allowable value can be determined. In this case, in comparison with the case where the judgment is performed provided that the distance to the farthest subject is infinity, it is possible to reduce the possibility that the judgment of the displacement amount cannot be performed, and to enhance the degree of freedom in arranging subjects during imaging.

Further, in the embodiment of the present disclosure, the example in which the imaging area used in the panoramic image is changed depending on the distance from the information processing apparatus to the subject has been shown. It should be noted that, when panoramic images different in imaging area are recorded without changing the number of pixels, the recorded panoramic images do not have a fixed number of pixels and the images different in the number of pixels depending on the distance from the information processing apparatus to the subject are recorded. In view of this, the panoramic images having a fixed number of pixels irrespective of the distance from the information processing apparatus to the subject may be recorded. For example, the imaging area used for the panoramic image is changed depending on the distance from the information processing apparatus to the subject. After that, the resolution of the panoramic image is converted such that the number of pixels of the panoramic image as a recording target is fixed irrespective of the distance from the information processing apparatus to the subject. The conversion processing is performed, and then the panoramic image having the converted resolution is recorded. Alternatively, a shortest distance to a subject that enables the panoramic image to be captured may be set in advance and a panoramic image in an imaging area with a displacement amount allowed at this subject distance may be recorded. In this case, even if the distance from the information processing apparatus to the subject is larger than the shortest distance, the panoramic image in the imaging area is recorded. Thus, the panoramic images having a fixed number of pixels can be recorded irrespective of the distance from the information processing apparatus to the subject.

Further, in the embodiment of the present disclosure, the example in which the distance from the information processing apparatus to the closest subject is analyzed, to thereby determine whether or not the distance is equal to or smaller than the threshold value, and an adjustment of the left and right images in the upper and lower directions based on this distance is performed has been shown. It should be noted that, for example, not the distance from the information processing apparatus to the closest subject but a distance from the information processing apparatus to a particular subject may be analyzed, to thereby determine whether or not this distance is equal to or smaller than the threshold value, and an adjustment of the left and right images in the upper and lower directions based on this distance may be performed. Note that the particular subject can be, for example, a face of a person, a smile of a person, a face of a particular person (face of person registered in advance). For example, a detection circuit that detects the particular subject (e.g., face of person) (e.g., face detection circuit that detects face of person) is used to detect the particular subject in the imaging area and obtain a position of this particular subject (e.g., position of face of person). Then, whether or not the distance from the information processing apparatus to the detected particular subject is smaller than the threshold value th1 is determined, such that an adjustment of the left and right images in the upper and lower directions based on this distance can be performed.

Further, in the embodiment of the present disclosure, the example in which a still image of the panoramic image is generated and recorded has been described. It should be noted that the embodiment of the present disclosure is also applicable to the case where the moving image of the panoramic image is generated and recorded. For example, in the case of an information processing apparatus (e.g., digital video camera (e.g., camera-integrated recorder)) capable of capturing a moving image, a focusing operation to a subject being a part of an image is generally performed immediately after start of imaging. After this focusing operation, imaging is continued at a fixed focal distance and the image is continuously analyzed. Further, when the subject moves and the focus to the subject is displaced, then focusing is performed again in a direction in which the subject moves. At this time, information on the distance to a subject is obtained such that an adjustment of the left and right images in the upper and lower directions and a judgment as to whether or not the distance to the subject is equal to or smaller than the threshold value can be performed.

Note that the embodiment of the present disclosure may be applied to an information processing apparatus (electronic apparatus, image processing apparatus, display apparatus, or display control apparatus) capable of causing a display apparatus (built-in display apparatus or external display apparatus) to display a panoramic image. For example, the embodiment of the present disclosure may be applied to apparatuses such as a multi-eye imaging apparatus, a digital photo frame, a tablet terminal, a digital signage terminal (e.g., rotation type), a navigation apparatus, a personal computer, a portable medium player. Note that the multi-eye imaging apparatus is, for example, a multi-eye digital still camera or a multi-eye digital video camera (e.g., camera-integrated recorder).

For example, when the images generated by the plurality of imaging units are combined with each other to generate the combined image, it is important to suitably combine the images considering the arrangement of the subject included in the combined image.

In view of such circumstances, it is desirable to suitably generate the combined image.

Further, in order to overcome the above-mentioned problems, the present disclosure may take the following configurations (Configuration Examples 1 to 11).

Configuration Example 1

An information processing apparatus, including:
a plurality of imaging units that are arranged in a specific direction; and
a judgment unit configured to perform, based on a subject distance of a subject included in an overlap region of a combined image generated by overlapping and combining end portions of images generated by the plurality of imaging units, a judgment as to an arrangement of a subject included in the combined image.

Configuration Example 2

The information processing apparatus according to Configuration Example 1, in which
the judgment unit is configured to judge, if a subject distance of a subject closest to the information processing apparatus among subjects included in the overlap region is smaller than a threshold value, that the arrangement of the subject included in the combined image should be changed.

Configuration Example 3

The information processing apparatus according to Configuration Example 1, in which
the judgment unit is configured to perform the judgment based on a subject distance of a subject closest to the information processing apparatus among the subjects included in the combined image.

Configuration Example 4

The information processing apparatus according to Configuration Example 2 or 3, in which
the judgment unit is configured to judge, of the subject distance is smaller than the threshold value, that the arrangement of the subject included in the combined image should be changed.

Configuration Example 5

The information processing apparatus according to Configuration Example 2 or 3, further including
a control unit configured to perform, if the judgment unit judges that the arrangement of the subject included in the combined image should be changed, a control for notifying that the arrangement of the subject included in the combined image should be changed.

Configuration Example 6

The information processing apparatus according to Configuration Example 5, in which
the control unit is configured to perform a display indicating that the arrangement of the subject included in the combined image should be changed or perform the notification for indicating that the arrangement of the subject included in the combined image should be changed by an audio output.

Configuration Example 7

The information processing apparatus according to Configuration Example 5, in which
the control unit is configured to perform the notification by displaying display information for identifying the subject that should be changed in arrangement.

Configuration Example 8

The information processing apparatus according to any one of Configuration Examples 1 to 7,
the plurality of imaging units are arranged such that each of optical axes is offset by a predetermined angle in an orthogonal direction almost orthogonal to the specific direction, and are configured to generate images with the orthogonal direction being a longitudinal direction, further including
an image combination unit configured to generate the combined image by overlapping and combining end portions of the images in the orthogonal direction.

Configuration Example 9

The information processing apparatus according to Configuration Example 8, in which
the image combination unit is configured to correct, based on a subject distance of a subject closest to the information processing apparatus among the subjects included in the overlap region, a displacement of the images in the specific direction.

Configuration Example 10

An information processing method, including:
a calculation procedure of calculating a subject distance of a subject included in an overlap region of a combined image generated by overlapping and combining end potions of images generated by a plurality of imaging units that are arranged in a specific direction; and
a judgment procedure of performing, based on the subject distance, a judgment as to an arrangement of a subject included in the combined image.

Configuration Example 11

A program that causes a computer to execute:
a calculation procedure of calculating a subject distance of a subject included in an overlap region of a combined image generated by overlapping and combining end potions of images generated by a plurality of imaging units that are arranged in a specific direction; and
a judgment procedure of performing, based on the subject distance, a judgment as to an arrangement of a subject included in the combined image.

Note that the above-mentioned embodiments of the present disclosure have been shown as examples for embodying the present disclosure. The matters in the embodiments have corresponding relations to the invention specifying matters in the scope of claims. Similarly, the invention specifying matters in the scope of claims have corresponding relations to the matters in the embodiments of the present disclosure that are denoted by the same names. It should be noted that the present disclosure is not limited to the above-mentioned embodiments and can be embodied by variously modifying the embodiments without departing from the gist.

In addition, the processing procedures described in the above-mentioned embodiments may be construed as a method including the series of procedures. Moreover, the processing procedures may be construed as a program for causing a computer to execute the series of procedures, or a recording medium storing the program. A compact disc (CD), a mini-disc (MD), a digital versatile disc (DVD), a memory card, a Blu-ray (registered trademark) disc, or the like may be used as the recording medium.

Note that the present disclosure may also take the following configurations.

(1)
An information processing apparatus, including:
a first optical system configured to input light into a first imaging device;
a second optical system configured to input light into a second imaging device; and
a casing including one surface long in a specific direction with the first optical system and the second optical system being arranged in the one surface in an orthogonal direction almost orthogonal to the specific direction, the first optical system and the second optical system being arranged such that an optical axis of the first optical system and an optical axis of the second optical system form an angle in the specific direction.

(2)
The information processing apparatus according to (1), in which
the casing includes a display unit having a rectangular shape long in the specific direction,
with a projection onto a first face that is a face that includes a long side of the display unit and is perpendicular to a display surface of the display unit, which is a projection of a normal to the display surface onto the first face, being a symmetrical axis, a first projection of the optical axis of the first optical system onto the first face and a second projection of the optical axis of the second optical system onto the first face are axisymmetric.

(3)
The information processing apparatus according to (2), further including
a third optical system configured to input light into a third imaging device, the third optical system being arranged together with the first optical system and the second optical system in the one surface in the orthogonal direction such that an optical axis of the third optical system is orthogonal to the display surface.

(4)
An information processing apparatus, including:
a first imaging device configured to receive light passing through a first optical system;
a second imaging device configured to receive light passing through a second optical system; and
a casing including one surface long in a specific direction with the first optical system and the second optical system being arranged in the one surface in an orthogonal direction almost orthogonal to the specific direction, the first imaging device and the second imaging device being arranged such that an imaging target area formed of an area serving as an imaging target of the first imaging device and an area serving as an imaging target of the second imaging device is larger in the specific direction than the area serving as the imaging target of each of the first imaging device and the second imaging device.

(5)
An information processing apparatus, including:
a first imaging device configured to receive light passing through a first optical system;

a second imaging device configured to receive light passing through a second optical system; and a casing including one surface long in a specific direction with the first optical system and the second optical system being arranged in the one surface in an orthogonal direction almost orthogonal to the specific direction, the first imaging device and the second imaging device being arranged such that an area serving as an imaging target of the first imaging device and an area serving as an imaging target of the second imaging device are arranged in the specific direction.

(6)

An information processing apparatus, including:

a first imaging device configured to receive light passing through a first optical system;

a second imaging device configured to receive light passing through a second optical system; and a casing including one surface long in a specific direction with the first optical system and the second optical system being arranged in the one surface in an orthogonal direction almost orthogonal to the specific direction, the first imaging device and the second imaging device being arranged such that a long-side direction of the first imaging device and a long-side direction of the second imaging device almost coincide with each other in the specific direction and that an aspect ratio of an imaging target area formed of an area serving as an imaging target of the first imaging device and an area serving as an imaging target of the second imaging device is larger than an aspect ratio of the area serving as the imaging target of each of the first imaging device and the second imaging device.

(7)

The information processing apparatus according to any one of (1) to (6), in which the first imaging device and the second imaging device are arranged such that an end portion in the specific direction of an area serving as an imaging target of one imaging device of the first imaging device and the second imaging device and an end portion in the specific direction of an area serving as an imaging target of the other imaging device that is adjacent to the one imaging device overlap with each other.

(8)

The information processing apparatus according to (7), further including a correction unit configured to correct a displacement in the orthogonal direction between a plurality of images obtained from the first imaging device and the second imaging device, which is caused due to the arrangement of the first imaging device and the second imaging device in the orthogonal direction, based on a subject distance of a subject included in an overlap region between the plurality of images.

(9)

The information processing apparatus according to (7) or (8), further including an adjustment unit configured to adjust at least partial areas of a plurality of images obtained from the first imaging device and the second imaging device, based on a subject distance of a subject included in an overlap region between the plurality of images, the at least partial areas being used for generating a combined image by combining with each other in the specific direction.

(10)

The information processing apparatus according to any one of (7) to (9), further including a control unit configured to perform, if a subject distance from the information processing apparatus to a particular subject included in the overlap region between the plurality of images obtained from the first imaging device and the second imaging device is smaller than a threshold value, a notification for urging to change an arrangement of a subject included in the overlap region or a notification for indicating that the plurality of images are displaced in the combined image.

(11)

The information processing apparatus according to any one of (1) to (7), further including an image combination unit configured to generate a combined image by combining at least partial areas of a plurality of images obtained from the first imaging device and the second imaging device with each other in the specific direction.

(12)

The information processing apparatus according to (11), in which the image combination unit is configured to correct a displacement in the orthogonal direction between the plurality of images obtained from the first imaging device and the second imaging device, based on a subject distance of a subject included in the combined image.

(13)

The information processing apparatus according to (11) or (12), in which the image combination unit is configured to adjust the at least partial areas of the plurality of images obtained from the first imaging device and the second imaging device, which are used for the combined image, based on a subject distance of a subject included in the combined image.

(14)

The information processing apparatus according to any one of (11) to (13), further including a control unit configured to perform, if a subject distance from the information processing apparatus to a particular subject included in the combined image is smaller than a threshold value, a notification for urging to change an arrangement of a subject included in the combined image or a notification for indicating that the plurality of images are displaced in the combined image.

(15)

The information processing apparatus according to (10) or (14), in which the particular subject is at least one of a subject closest to the information processing apparatus, a subject set as a focus target by a focusing operation, a subject detected by a face detection unit, and a subject detected by a moving object detection unit.

(16)

The information processing apparatus according to (10) or (14), in which the control unit is configured to perform the notification by at least one of an audio output from an audio output unit and an information display on the display unit.

(17)

An information processing method, including:

a calculation procedure of calculating a subject distance of a subject included in an overlap region of a combined image generated by overlapping and combining end portions of images generated by a plurality of imaging units arranged in a specific direction with each other or in the combined image; and a judgment procedure of performing, based on the subject distance, a judgment as to areas of images that are used for the combined image.

(18)

An information processing method, including:

a calculation procedure of calculating a subject distance of a subject included in an overlap region of a combined image generated by overlapping and combining end portions of images generated by a plurality of imaging units arranged in a specific direction with each other or in the combined image; and a judgment procedure of performing, based on the subject distance, a judgment as to an arrangement of a subject included in the combined image.

(19)

A program that causes a computer to execute:

a calculation procedure of calculating a subject distance of a subject included in an overlap region of a combined image generated by overlapping and combining end portions of images generated by a plurality of imaging units arranged in a specific direction with each other or in the combined image; and a judgment procedure of performing, based on the subject distance, a judgment as to areas of images that are used for the combined image.

(20)

A program that causes a computer to execute:

a calculation procedure of calculating a subject distance of a subject included in an overlap region of a combined image generated by overlapping and combining end portions of images generated by a plurality of imaging units arranged in a specific direction with each other or in the combined image; and a judgment procedure of performing a judgment as to an arrangement of a subject included in the combined image based on the subject distance.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system, comprising:
   at least two imaging sections including a first imaging section and a second imaging section adjacent to each other in a first direction and laterally displaced with respect to each other in a second direction orthogonal to the first direction, the first direction and the second direction being substantially orthogonal to a third direction toward a subject;
   at least two optical sections respectively formed on corresponding ones of the at least two imaging sections; and
   control circuitry configured to control the at least two imaging sections,
   wherein the control circuitry is configured to generate an output image based on at least two image signals from the at least two imaging sections,
   wherein a first optical axis of the first optical section and a second optical axis of the second optical section are axisymmetric with respect to the third direction.

2. The image processing system according to claim 1, wherein
   the first imaging section and the second imaging section are arranged such that a first end portion in the second direction of a first area that is an imaging target of the first imaging section and a second end portion in the second direction of a second area that is an imaging target of the second imaging section overlap with each other.

3. The image processing system according to claim 2, further comprising:
   correction circuitry configured to correct a displacement in the first direction, the displacement being caused by an arrangement of the first imaging section and the second imaging section in the first direction, based on a subject distance of the subject included in the overlap.

4. The image processing system according to claim 2, further comprising:
   adjustment circuitry configured to adjust at least partial areas of a first image obtained from the first imaging section and a second image obtained from the second imaging section, based on a subject distance of the subject included in the overlap, the at least partial areas being used for generating a combined image by combining with each other in the second direction.

5. The image processing system according to claim 4, wherein
   the control circuitry is configured to generate a first notification for urging a change in an arrangement of the subject included in the overlap and/or a second notification for indicating that the first image and the second image are displaced in the combined image.

6. The image processing system according to claim 1, further comprising image combination circuitry configured to generate a combined image by combining at least partial areas of a first image obtained from the first imaging section and a second image obtained from the second imaging section with each other in the second direction.

7. The image processing system according to claim 6, wherein the image combination circuitry is configured to correct a displacement in the first direction, based on a subject distance of the subject included in the combined image.

8. The image processing system according to claim 1, wherein the first optical axis and the second optical axis form a non-zero angle with respect to each other.

9. The image processing system according to claim 1, wherein the at least one imaging section includes a third imaging section adjacent to the first imaging section and the second imaging section in the first direction, and laterally displaced with respect to the first imaging section and the second imaging section in the second direction.

10. The image processing system according to claim 9, wherein
    the first optical axis and a third optical axis of the third optical section form a first angle with respect to each other, and
    the second optical axis and the third optical axis of the third optical section form a second angle with respect to each other.

11. The image processing section according to claim 10, wherein the first optical axis and the second optical axis are axisymmetric with respect to the third optical axis.

12. An information processing apparatus, comprising:
    a display;
    at least two imaging sections including a first imaging section and a second imaging section adjacent to each other in a first direction and laterally displaced with respect to each other in a second direction orthogonal to the first direction, the first direction and the second direction being substantially orthogonal to a third direction toward a subject;
    at least two optical sections respectively formed on corresponding ones of the at least two imaging sections; and
    control circuitry configured to control the at least two imaging sections and the display, wherein the control circuitry is configured to generate an output image based on at least two image signals from the at least two imaging sections, wherein a first optical axis of the first optical section and a second optical axis of the second optical section are axisymmetric with respect to the third direction.

13. The information processing apparatus according to claim 12, wherein the first imaging section and the second imaging section are arranged such that a first end portion in the second direction of a first area that is an imaging target of the first imaging section and a second end portion in the second direction of a second area that is an imaging target of the second imaging section overlap with each other.

14. The information processing apparatus according to claim 13, further comprising:

correction circuitry configured to correct a displacement in the first direction, the displacement being caused by an arrangement of the first imaging section and the second imaging section in the first direction, based on a subject distance of the subject included in the overlap.

15. The information processing apparatus according to claim 13, further comprising:

adjustment circuitry configured to adjust at least partial areas of a first image obtained from the first imaging section and a second image obtained from the second imaging section, based on a subject distance of the subject included in the overlap, the at least partial areas being used for generating a combined image by combining with each other in the second direction.

16. The information processing apparatus according to claim 15, wherein the control circuitry is configured to generate a first notification for urging a change in an arrangement of the subject included in the overlap and/or a second notification for indicating that the first image and the second image are displaced in the combined image.

17. The information processing apparatus according to claim 12, further comprising image combination circuitry configured to generate a combined image by combining at least partial areas of a first image obtained from the first imaging section and a second image obtained from the second imaging section with each other in the second direction.

18. The information processing apparatus according to claim 17, wherein the image combination circuitry is configured to correct a displacement in the first direction, based on a subject distance of the subject included in the combined image.

* * * * *